(12) United States Patent
Shimizu et al.

(10) Patent No.: US 11,303,145 B2
(45) Date of Patent: *Apr. 12, 2022

(54) CHARGING SYSTEM

(71) Applicant: DENSO CORPORATION, Kariya (JP)

(72) Inventors: Hiroshi Shimizu, Nisshin (JP); Ryuji Omata, Kariya (JP); Daigo Nobe, Toyota (JP); Makoto Nakamura, Okazaki (JP)

(73) Assignee: DENSO CORPORATION, Kariya (JP)

( * ) Notice: Subject to any disclaimer, the term of this patent is extended or adjusted under 35 U.S.C. 154(b) by 187 days.

This patent is subject to a terminal disclaimer.

(21) Appl. No.: 16/710,124

(22) Filed: Dec. 11, 2019

(65) Prior Publication Data

US 2020/0195032 A1 Jun. 18, 2020

(30) Foreign Application Priority Data

Dec. 11, 2018 (JP) .............................. JP2018-232000
Dec. 2, 2019 (JP) .............................. JP2019-217848

(51) Int. Cl.
*H02J 7/00* (2006.01)
*H02J 7/34* (2006.01)

(52) U.S. Cl.
CPC .......... *H02J 7/0068* (2013.01); *H02J 7/0024* (2013.01); *H02J 7/342* (2020.01)

(58) Field of Classification Search
CPC .. H02J 2207/20; H02J 2310/48; H02J 7/1423; H02J 1/10; H02J 7/0024; H02J 7/02; H02J 1/12; H02J 2310/46; H02J 50/005; H02J 50/10; H02J 50/12; H02J 50/90; H02J 7/00712; H02J 7/022; H02J 7/345; H02J 7/0029; H02J 7/0031; H02J 7/0068; H02J 7/007; H02J 7/04;
(Continued)

(56) References Cited

U.S. PATENT DOCUMENTS

2009/0278492 A1* 11/2009 Shimizu ................ B60L 53/126
                                                              320/108
2013/0162208 A1*  6/2013 Ohnuki .................. B60L 53/31
                                                              320/109
(Continued)

FOREIGN PATENT DOCUMENTS

JP          2009-131077 A       6/2009
JP          2016-063702 A       4/2016

*Primary Examiner* — Binh C Tat
(74) *Attorney, Agent, or Firm* — Oliff PLC

(57) ABSTRACT

A charging system charges a first voltage source and a second voltage source through an external charger. The first voltage source and the second voltage source are capable of supplying electric power to a rotating electric machine that includes a coil group configured by multiphase coils. The charging system includes a first inverter, a second inverter, at least three switches, and a control unit. The first inverter includes a first switching element. The second inverter includes a second switching element. The control unit is capable of switching charging between individual charging in which either of the first voltage source and the second voltage source is charged, and simultaneous charging in which the first voltage source and the second voltage source are both simultaneously charged, by controlling operations of the first switching element, the second switching element, and the switches.

16 Claims, 32 Drawing Sheets

(58) Field of Classification Search
CPC ...... H02J 7/24; H02J 7/342; H01H 2071/006; H01H 2009/0292; H02P 6/006; H02P 5/685; H02M 3/07; B60L 2210/10; B60L 2220/10
USPC .................................................. 320/126–134
See application file for complete search history.

(56) References Cited

U.S. PATENT DOCUMENTS

2018/0041066 A1* 2/2018 Vijayan .................. H02J 50/40
2020/0185953 A1* 6/2020 Shimizu .............. H02M 3/1584

* cited by examiner (PARALLEL CHARGING AND INDIVIDUAL CHARGING OF VOLTAGE SOURCES 1 AND 2)

(SERIAL CHARGING OF VOLTAGE SOURCES 1 AND 2)

(SERIAL CHARGING OF VOLTAGE SOURCES 1 AND 2)

(PARALLEL CHARGING OF VOLTAGE SOURCES 1 AND 2)

(INDIVIDUAL CHARGING OF VOLTAGE SOURCE 1)

(INDIVIDUAL CHARGING OF VOLTAGE SOURCE 2)

(SERIAL CHARGING OF VOLTAGE SOURCES 1 AND 2)

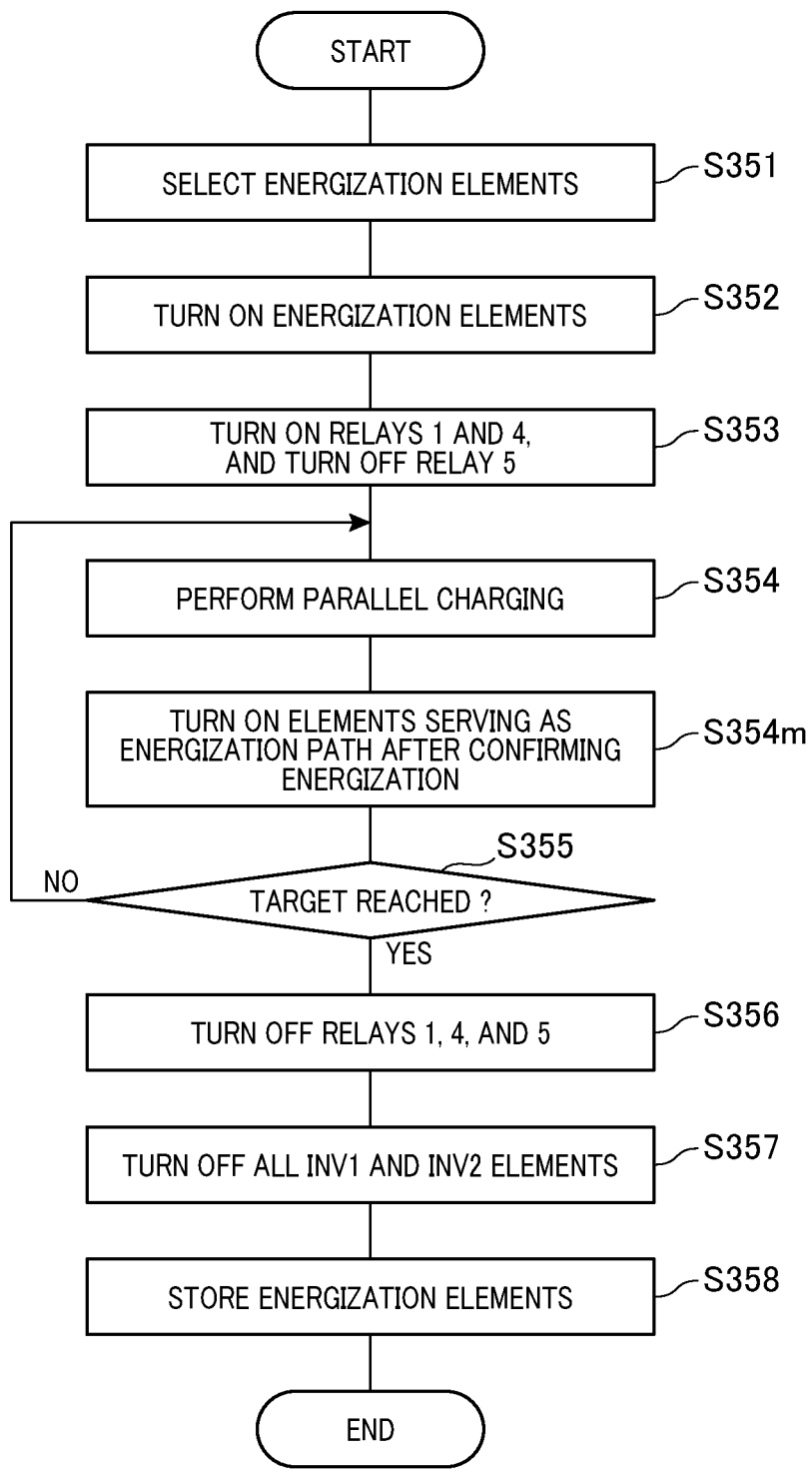

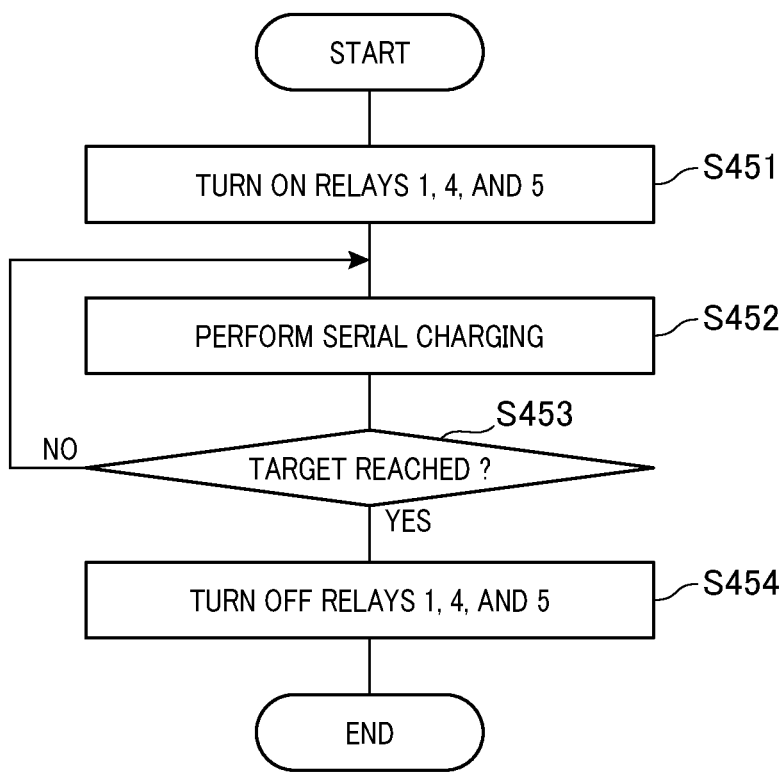

(ENERGIZATION ELEMENTS DURING PREVIOUS CHARGING)

(ENERGIZATION ELEMENTS DURING CURRENT CHARGING)

CHARGING SYSTEM

CROSS-REFERENCE OF RELATED APPLICATIONS

This application is based on and claims the benefit of priority from Japanese Patent Application No. 2018-23200, filed on Dec. 11, 2018, and Japanese Patent Application No. 2019-217848, filed on Dec. 2, 2019, the descriptions of which are incorporated herein by reference.

BACKGROUND

Technical Field

The present disclosure relates to a charging system.

Related Art

A known system drives an alternating-current electric motor that has open-end windings of multiple phases with separated neutral points. For example, this system includes a first inverter and a second inverter. The first inverter includes a first switch that is connected to first ends of the windings of the alternating-current electric motor. The second inverter includes a second switch that is connected to second ends of the windings of the alternating-current electric motor.

SUMMARY

The present disclosure provides a charging system that charges, through an external charger, a first voltage source and a second voltage source that are capable of supplying electric power to a rotating electric machine that includes a coil group configured by multiphase coils. The charging system includes a first inverter, a second inverter, and at least three switches. The first inverter includes a first switching element. The second inverter includes a second switching element. The charging system is capable of switching charging between individual charging and simultaneous charging by controlling operations of the first switching element, the second switching element, and the switches. In individual charging, either of the first voltage source and the second voltage source is charged. In simultaneous charging, the first voltage source and the second voltage source are both simultaneously charged.

BRIEF DESCRIPTION OF THE DRAWINGS

In the accompanying drawings:

FIG. 17 is a flowchart of a parallel charging mode in the charging system according to the second embodiment;

FIG. 18 is a flowchart of a serial charging mode in the charging system according to the second embodiment;

DESCRIPTION OF THE EMBODIMENTS

Figure 1:
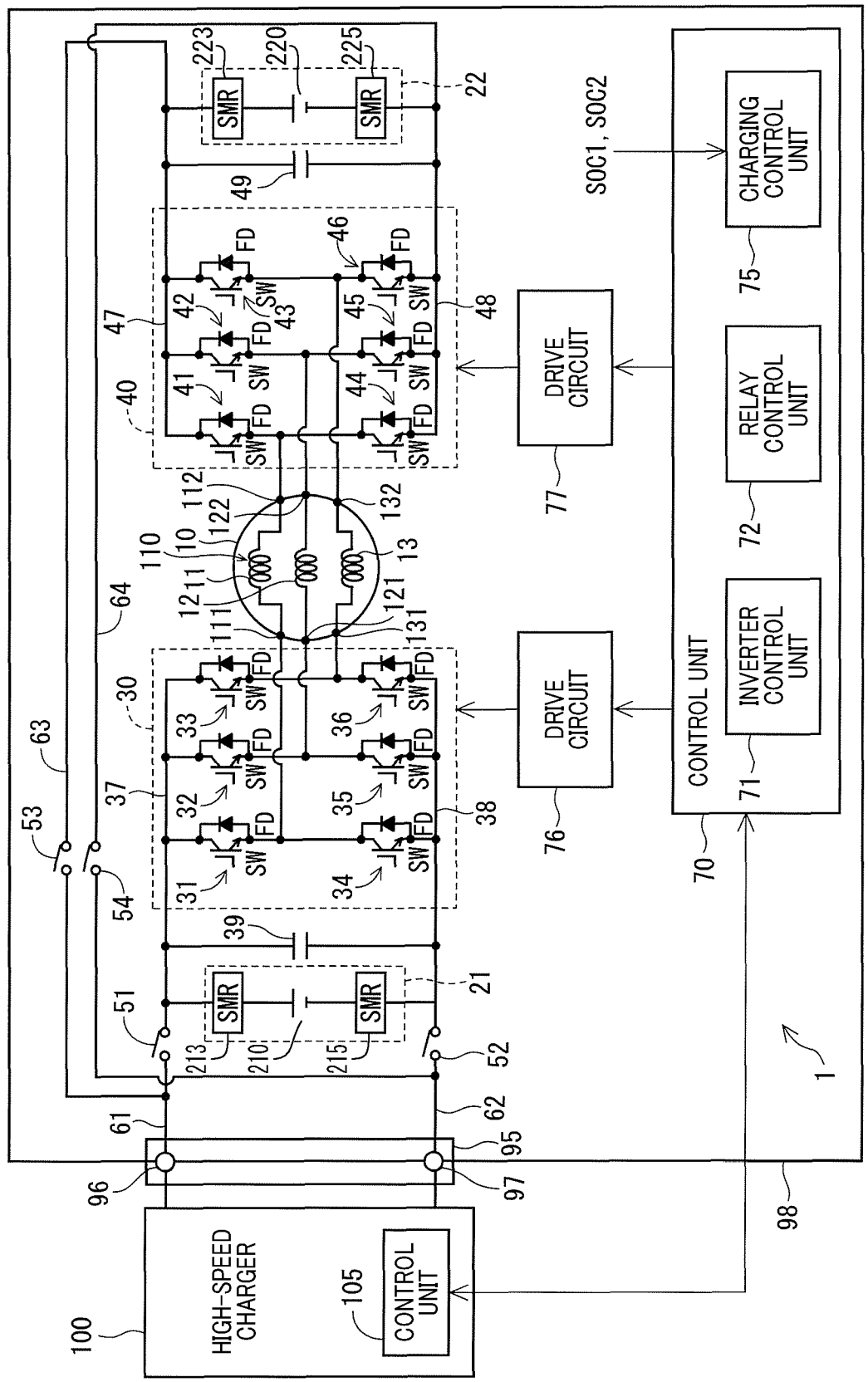
FIG. 1 is a circuit diagram of a charging system according to a first embodiment.

A known system drives an alternating-current electric motor that has open-end windings of multiple phases with separated neutral points. For example, JP-A-2016-063702 describes a system that drives an alternating-current electric motor and includes a first inverter and a second inverter. The first inverter includes a first switch that is connected to first ends of the windings of the alternating-current electric motor. The second inverter includes a second switch that is connected to another end of the windings of the alternating-current electric motor.

In the system in JP-A-2016-063702, a first battery that is connected to the first switch and a second battery that is connected to the second switch are charged by a single-phase alternating-current power supply. However, for example, the system in JP-A-2016-063702 is not applicable to a direct-current high-speed charger, such as CHAdeMO (registered trademark) or a combined charging system (CCS). Therefore, providing a charging system that is capable of appropriately charging two voltage sources is desired.

A charging system of the present disclosure charges a first voltage source and a second voltage source using an external charger. The first voltage source and the second voltage source are two voltage sources that supply electric power to a rotating electric machine that includes multiphase coils. The charging system includes a first inverter, a second inverter, at least three switches, and a control unit.

The first inverter includes a plurality of first switching elements that correspond to the multiphase coils. The second inverter includes a plurality of second switching elements that correspond to the multiphase coils.

The at least three switches include at least one high-potential-side switch and at least one low-potential-side switch. The high-potential-side switch is provided on a high-potential-side power supply line that connects a high-potential-side external connection terminal and a high potential side of the first voltage source or the second voltage source. The high-potential-side external connection terminal is capable of connecting to a high potential side of the external charger. The low-potential-side switch is provided on a low-potential-side power supply line that connects a low-potential-side external connection terminal and a low potential side of the first voltage source or the second voltage source. The low-potential-side external connection terminal is capable of connecting to a low potential side of the external charger. The control unit is capable of switching charging between individual charging and simultaneous charging by controlling operations of the plurality of first switching elements, the plurality of second switching elements, and the at least three switches. In individual charging, either of the first voltage source and the second voltage source is charged. In simultaneous charging, the first voltage source and the second voltage source are both simultaneously charged.

In the above-described configuration, as a result of the at least three switches including the high-potential-side switch that is provided on the high-potential-side power supply line and the low-potential-side switch that is provided on the low-potential-side power supply line being provided, simultaneous charging in which the two voltage sources are simultaneously charged can be performed. In addition, as a result, of the two inverters and the at least three switches being controlled, charging can be switched between individual charging in which either of the first voltage source and the second voltage source is charged, and simultaneous charging in which the first voltage source and the second voltage source are both simultaneously charged.

The charging system of the present disclosure will hereinafter be described with reference to the drawings. Hereafter, configurations that are essentially identical among a plurality of embodiments are given the same reference numbers. Descriptions thereof are omitted.

First Embodiment

A first embodiment is shown in FIG. 1 to FIG. 9.

As shown in FIG. 1, a charging system 1 is mounted in a vehicle 98. The vehicle 98 is provided with an inlet 95. The charging system 1 is provided so as to be capable of connecting to a high-speed charger 100 through the inlet 95. The high-speed charger 100 serves as an external charger. The inlet 95 is provided with a high-potential-side external connection terminal 96 and a low-potential-side external connection terminal 97. The high-speed charger 100 is a direct-current charger that has a higher voltage than commercial power supply. The high-speed charger 100 includes an external control unit 105 that is capable of communicating with a control unit 70 of the vehicle 98.

The charging system 1 includes a motor generator 10, a first voltage source 21, a second voltage source 22, a first inverter 30, a second inverter 40, a first high-potential-side switch 51, a first low-potential-side switch 52, a second high-potential-side switch 53, a second low-potential-side switch 54, a first high-potential-side power supply line 61, a first low-potential-side power supply line 62, a second high-potential-side power supply line 63, a second low-potential-side power supply line 64, the control unit 70, and the like. The motor generator 10 serves as the rotating electric machine.

For example, the motor generator 10 is a permanent-magnet-type synchronous three-phase alternating-current motor. The motor generator 10 includes multiphase coils (three phase coils), that is, a U-phase coil 11, a V-phase coil 12, and a W-phase coil 13 (simply referred to, hereafter, as coils 11 to 13, as appropriate), that configure a coil group 110. The motor generator 10 is a so-called main machine motor that generates torque for driving a driving wheel (not shown). The motor generator 10 provides a function as an electric motor for driving the driving wheel and a function as a power generator for generating power by being driven by an engine (not shown) and kinetic energy that is transmitted from the driving wheel. The motor generator is referred to, hereafter, as "MG", as appropriate.

Electric power is supplied from the first voltage source 21 and the second voltage source 22 to the MG 10. For example, each of the first voltage source 21 and the second voltage source 22 is a power storage apparatus that is capable of being charged and discharging power, such as a nickel-hydrogen battery or a lithium-ion battery. Instead of a secondary battery, an electric double-layer capacitor or the like may be used as each of the voltage sources 21 and 22. According to the present embodiment, for example, voltage sources that each have a rated voltage of 300 [V] and provide equal performance are used as the first voltage source 21 and the second voltage source 22. However, the first voltage source 21 and the second voltage source 22 may differ in battery performance and type. For example, an output-type voltage source may be used as one of the voltage sources 21 and 22, and a capacitive-type voltage source may be used as the other of the voltage sources 21 and 22. In the drawings and the like, the first voltage source 21 is referred to as a "voltage source 1" and the second voltage source 22 is referred to as a "voltage source 2", as appropriate.

Figure 2:
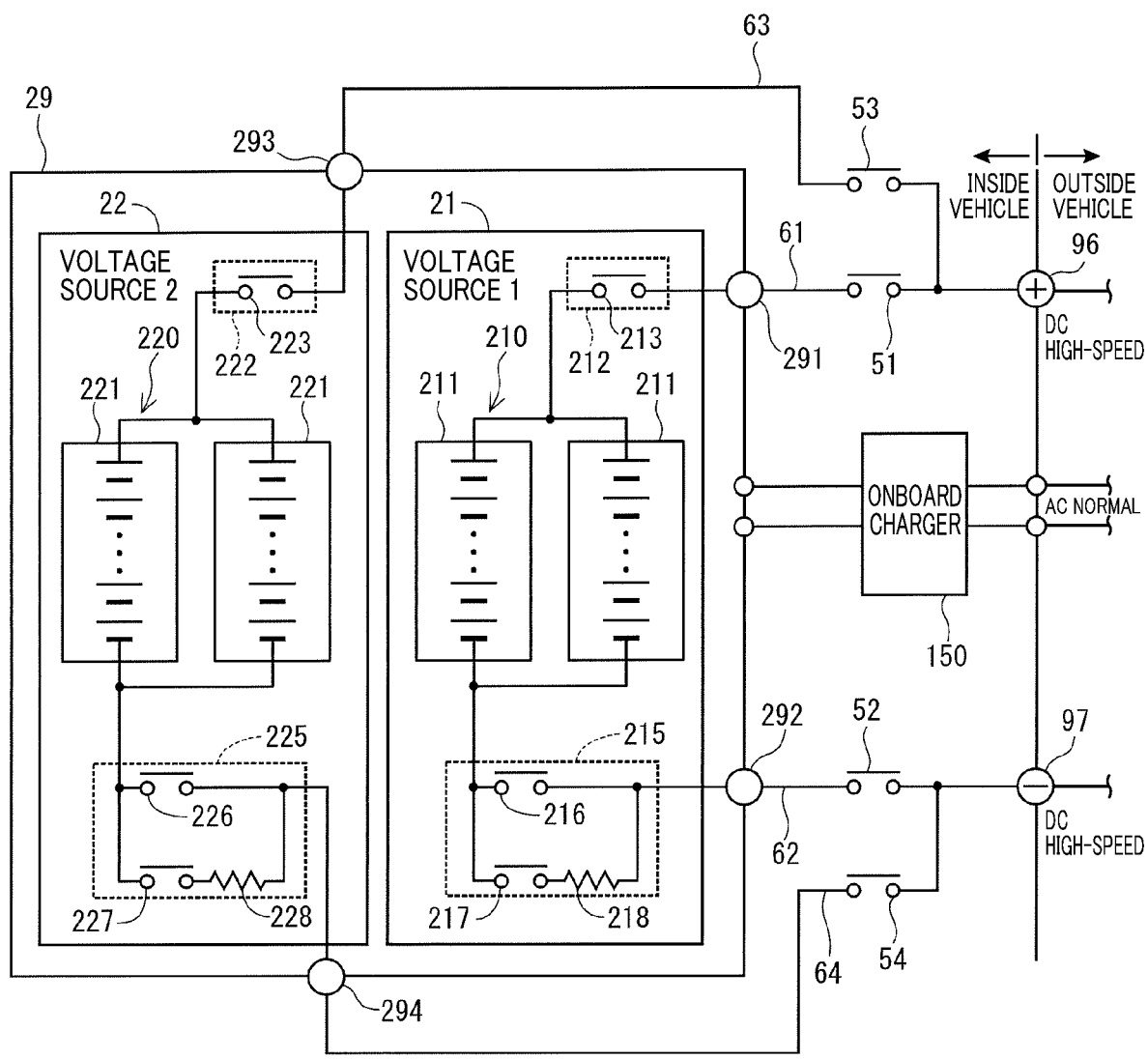
FIG. 2 is a circuit diagram of a battery pack in which a first voltage source and a second voltage source of the charging system according to the first embodiment are provided.

As shown in FIG. 2, the first voltage source 21 and the second voltage source 22 are provided in a single battery pack 29, so as to be insulated from each other. The battery pack 29 can be connected to the high-speed charger 100 by the external connection terminals 96 and 97. In addition, the battery pack 29 can be connected to an alternating-current power supply, such as commercial power supply, by an onboard charger 150. In FIG. 2, the direct-current high-speed charger 100 is denoted by "DC high-speed". An alternating-current power supply (not shown) that is connected via the onboard charger 150 is denoted by "AC normal".

The first voltage source 21 includes a battery cell module 210, a high-potential-side main relay unit 212, and a low-potential-side main relay unit 215. A plurality of battery cells 211 are connected in parallel to one another in the battery cell module 210.

The high-potential-side main relay unit 212 includes a single relay unit 213. The high-potential-side main relay unit 212 is connected to a high potential side of the battery cell module 210. The low-potential-side main relay unit 215 includes two relay units 216 and 217 that are connected in parallel, and a pre-charge resistor 218 that is connected in series to the relay unit 217. The low-potential-side main relay unit 215 is connected to a low potential side of the battery cell module 210. When the low-potential-side main relay unit 215 is turned on, as a result of a relay to be turned on being changed from the relay unit 217 to the relay unit 216 after the relay unit 217 connected to the pre-charge resistor 218 is turned on, inrush current to a capacitor 39 can be prevented. The control unit 70 controls the on/off switching of the main relay units 212 and 215.

The second voltage source 22 includes a battery cell module 220, a high-potential-side main relay unit 222, and a low-potential-side main relay unit 225. A plurality of battery cells 221 are connected in parallel to one another in the battery cell module 220. In FIG. 2, two battery cells are connected in parallel in each of the battery cell modules 210 and 220. However, the number of battery cells may be one, or three or more.

The high-potential-side main relay unit 222 includes a single relay unit 223. The high-potential-side main relay unit 222 is connected to a high potential side of the battery cell module 220. The low-potential-side main relay unit 225 includes two relay units 226 and 227 that are connected in parallel, and a pre-charge resistor 228 that is connected in series to the relay unit 227. The low-potential-side main relay unit 225 is connected to a low potential side of the battery cell module 220. When the low-potential-side main relay unit 225 is turned on, as a result of the relay to be turned on being changed from the relay unit 227 to the relay unit 226 after the relay unit 227 connected to the pre-charge resistor 228 is turned on, inrush current to a capacitor 49 can be prevented. The control unit 70 controls the on/off switching of the main relay units 222 and 225.

The battery pack 29 is provided with a first high-potential-side terminal 291 and a first low-potential-side terminal 292 that are connected to the first voltage source 21, and a second high-potential-side terminal 293 and a second low-potential-side terminal 294 that are connected to the second voltage source 22.

The first high-potential-side power supply line 61 connects the first high-potential-side terminal 291 and the high-potential-side external connection terminal 96. The first high-potential-side power supply line 61 is provided with the first high-potential-side switch 51. The second high-potential-side power supply line 63 is connected to the first high-potential-side power supply line 61, between the first high-potential-side switch 51 and the high-potential-side external connection terminal 96. The second high-potential-side power supply line 63 is provided with the second high-potential-side switch 53.

The first low-potential-side power supply line 62 connects the first low-potential-side terminal 292 and the low-potential-side external connection terminal 97. The first low-potential-side power supply line 62 is provided with the first low-potential-side switch 52. The second low-potential-side power supply line 64 is connected to the first low-potential-side power supply line 62, between the first low-potential-side switch 52 and the low-potential-side external connection terminal 97. The second low-potential-side power supply line 64 is provided with the second low-potential-side switch 54. Any type of switch may be used as the switches 51 to 54 as long as the switch is capable of conducting and blocking current. For example, a semiconductor relay or a mechanical relay is used. This similarly applies to a switch 55 according to a second embodiment.

In the drawings, the main relay unit is denoted by "SMR". In addition, the main relay units 212 and 215 of the first voltage source 21 are denoted by "SMR 1". The main relay units 222 and 225 of the second voltage source 22 are denoted by "SMR 2". The first high-potential-side switch 51 is denoted by "relay 1". The first low-potential-side switch 52 is denoted by "relay 2". The second high-potential-side switch 53 is denoted by "relay 3". The second low-potential-side switch 54 is denoted by "relay 4". Furthermore, a state in which an SMR or a switch is capable of conducting a current is denoted by "(relay) on". A state in which an SMR or a switch is not capable of conducting a current is denoted by "(relay) off".

As shown in FIG. 1, the first inverter 30 is a three-phase inverter that switches energization among the coils 11 to 13. The first inverter 30 includes a plurality (six) of switching elements (first switching elements) 31 to 36 that correspond to the coils 11 to 13 of a plurality of phases (three phases). The first inverter 30 is connected to the MG 10 and the first voltage source 21. The second inverter 40 is a three-phase inverter that switches energization among the coils 11 to 13. The second inverter 40 includes a plurality (six) of switching elements (second switching elements) 41 to 46 that correspond to the coils 11 to 13 of a plurality of phases (three phases). The second inverter 40 is connected to the MG 10 and the second voltage source 22. In the drawings and the like, the first inverter 30 is denoted by "INV1" and the second inverter 40 is denoted by "INV2", as appropriate.

Each of the switching elements 31 to 36 and 41 to 46 includes a switch unit SW and a freewheeling diode FD. The control unit 70 controls an on/off switching of the switch unit SW. The switch unit SW according to the present embodiment is an insulated-gate bipolar transistor (IGBT). However, other elements, such as a metal-oxide-semiconductor field-effect transistor (MOSFET), may be used. In addition, the elements that are used as the switching elements 31 to 36 and 41 to 46 may differ.

The freewheeling diode FD is connected in reverse parallel to the switch unit SW. The freewheeling diode FW allows a current to be circulated from the low potential side to the high potential side through the freewheeling diode FW. For example, the freewheeling diode FD may be provided inside the switching element in the form of a parasitic diode of a MOSFET, for example. Alternatively, the freewheeling diode FD may be provided outside the switching element. In addition, the freewheeling diode FD may be a switch such as an IGBT or a MOSFET that is connected so as to allow a current to be circulated through the switch.

In the first inverter 30, the U-phase, V-phase, and W-phase switching elements 31 to 33 are connected to the high potential side (upper arm side), and the U-phase, V-phase, and W-phase switching elements 34 to 36 are connected to the low potential side (lower arm side). Hereafter, the high-potential-side switching elements 31 to 33 of the first inverter 30 are referred to as "first upper arm elements". The low-potential-side switching elements 34 to 36 of the first inverter 30 are referred to as "first lower arm elements". A first high-potential-side wiring 37 that connects the high potential sides of the first upper arm elements 31 to 33 is connected to the high potential side of the first voltage source 21. A first low-potential-side wiring 38 that connects the low potential sides of the first lower arm elements 34 to 36 is connected to the low potential side of the first voltage source 21.

In the first inverter 30, a first end 111 of the U-phase coil 11 is connected to a connection point between the two switching elements 31 and 34 of the U-phase that are connected in series. A first end 121 of the V-phase coil 12 is connected to a connection point between the two switching elements 32 and 35 of the V-phase that are connected in series. A first end 131 of the W-phase coil 13 is connected to a connection point between the two switching elements 33 and 36 of the W-phase that are connected in series.

In the second inverter 40, the U-phase, V-phase, and W-phase switching elements 41 to 43 are connected to the high potential side (upper arm side), and the U-phase, V-phase, and W-phase switching elements 44 to 46 are connected to the low potential side (lower arm side). Hereafter, the high-potential-side switching elements 41 to 43 of the second inverter 40 are referred to as "second upper arm elements". The low-potential-side switching elements 44 to 46 of the second inverter 40 are referred to as "second lower arm elements". A second high-potential-side wiring 47 that connects the high potential sides of the second upper arm elements 41 to 43 is connected to the high potential side of the second voltage source 22. A second low-potential-side wiring 48 that connects the low potential sides of the second lower arm elements 44 to 46 is connected to the low potential side of the second voltage source 22.

In the second inverter 40, another end 112 of the U-phase coil 11 is connected to a connection point between the two switching elements 41 and 44 of the U-phase that are connected in series. Another end 122 of the V-phase coil 12 is connected to a connection point between the two switching elements 42 and 45 of the V-phase that are connected in series. Another end 132 of the W-phase coil 13 is connected to a connection point between the two switching elements 43 and 46 of the W-phase that are connected in series.

In this manner, according to the present embodiment, the coils 11 to 13 of the MG 10 are open windings. A "dual-power-supply dual-inverter" electric motor driving system in which the first inverter 30 and the second inverter 40 are connected to both ends of the coils 11 to 13 is formed.

The first capacitor 39 is connected to the high-potential-side wiring 37 and the low-potential-side wiring 38. The first capacitor 39 is provided in parallel with the first inverter 30. The second capacitor 49 is connected to the high-potential-side wiring 47 and the low-potential-side wiring 48. The second capacitor 49 is provided in parallel with the second inverter 40. The capacitors 39 and 49 are smoothing capacitors that smooth voltages applied to the inverters 30 and 40.

The high-potential-side power supply lines 61 and 63 are directly connected to the high potential side of the voltage sources 21 and 22 and the high-potential-side external connection terminal 96, without the MG 10 and the inverters 30 and 40 therebetween. In addition, the low-potential-side power supply lines 62 and 64 are directly connected to the low-potential side of the voltage sources 21 and 22 and the low-potential-side external connection terminal 97, without the MG 10 and the inverters 30 and 40 therebetween.

The control unit 70 is mainly configured by a microcomputer or the like. In any case, the control unit 70 includes therein a central processing unit (CPU), a read-only memory (ROM), a random access memory (RAM), an input/output (I/O), a bus line that connects these components, and the like. Processes that are performed by the control unit 70 may be software processes that are performed by the CPU running a program that is stored in advance in a tangible memory apparatus (that is, a non-transitory computer readable storage medium), such as the ROM. Alternatively, the processes may be hardware processes that are performed by an electronic circuit, such as a field-programmable gate array (FPGA).

The control unit 70 includes an inverter control unit 71, a relay control unit 72, and a charging control unit 75. The inverter control unit 71 controls the on/off switching of the switching elements 31 to 36 and 41 to 46. A control signal related to driving control of the first inverter 30 is outputted to the first inverter 30 through a first drive circuit 76. A control signal related to driving control of the second inverter 40 is outputted to the second inverter 40 through a second drive circuit 77. A single microcomputer may control the inverters 30 and 40. Alternatively, each of the inverters 30 and 40 may be provided with a microcomputer.

Here, driving modes of the MG 10 will be described. The driving modes include "single-side driving mode" and "dual-side driving mode". In the single-side driving mode, electric power from the first voltage source 21 or the second voltage source 22 is used. In the dual-side driving mode, electric power from the first voltage source 21 and electric power from the second voltage source 22 are used. The driving mode is switched between the single-side driving mode and the dual-side driving mode based on an operation point, driving conditions, and the like. Other driving modes may also be included.

In the single-side driving mode, the upper arm elements of all phases or the lower arm elements of all phases of one inverter are turned on, and a neutral point is formed. The other inverter is controlled by pulse width modulation (PWM) control, rectangular wave control, or the like, based on a driving request.

In the dual-side driving mode, a phase of a fundamental wave in the PWM control is inverted by the first inverter 30 and the second inverter 40. Modulation factors may differ between the first inverter 30 and the second inverter 40. In addition, if the modulation factor is infinite, the rectangular wave control may be performed. As a result, the voltage sources 21 and 22 can be connected in series. A voltage that corresponds to a sum of the voltages of the voltage sources 21 and 22 can be applied to the MG 10, and output can be increased.

The relay control unit 72 controls the first high-potential-side switch 51, the first low-potential-side switch 52, the second high-potential-side switch 53, and the second lowpotential-side switch 54. According to the present embodiment, the relay control unit 72 is capable of controlling open/close operations of the switches 51 to 54 without commands from the external control unit 105. That is, the open/close operations of the switches 51 to 54 can be controlled on the vehicle side.

The charging control unit 75 acquires information related to a charging state, such as a state of charge (SOC), of each of the first voltage source 21 and the second voltage source 22, and controls the states of charge of the voltage sources 21 and 22. Hereafter, the SOC of the first voltage source 21 is referred to as SOC1 and the SOC of the second voltage source 22 is referred to as SOC2. The charging control unit 75 may be provided as a separate electronic control unit (ECU).

Here, a plurality of charging standards have been established regarding the high-speed charger 100, such as CHAdeMO with a voltage specification of 500 V, and CCS with a voltage specification of 1000 V. In addition, for example, if a rated voltage of each of the voltage sources 21 and 22 is 300 V, when the high-speed charger 100 has a voltage specification of 500 V, the sum of the rated voltages of the two voltage sources 21 and 22 exceed 500 V and the two voltage sources 21 and 22 cannot be charged in series. Thus, the two voltage sources 21 and 22 are required to be charged in parallel. Meanwhile, when the high-speed charger 100 has a voltage specification of 1000 V, serial charging of the two voltage sources 21 and 22 becomes possible. Furthermore, in cases in which a difference in SOCs is significant, or charging of either of the voltage sources 21 and 22 is unnecessary, individual charging of one of the voltage sources 21 and 22 is necessary. According to the present embodiment, to actualize high output in the dual-side driving mode, depletion of either of the voltage sources 21 and 22 is preferably prevented, and the SOCs of both voltage sources 21 and 22 are preferably maintained to a degree that dual-side driving can be performed.

Therefore, according to the present embodiment, the MG 10 and the inverters 30 and 40 are used as power paths for charging power. As a result, single-side individual charging in which either of the voltage sources 21 and 22 is charged and dual-side simultaneous charging in which both voltage sources 21 and 22 are simultaneously charged are performed without a separate charger or the like being provided. Dual-side simultaneous charging includes parallel charging in which both voltage sources 21 and 22 are charged in parallel and serial charging in which both voltage sources 21 and 22 are charged in series. Here, the MG 10 according to the present embodiment is the main machine motor. The MG 10 and the inverters 30 and 40 are designed for large output and are capable of sufficiently withstanding even charging by the high-speed charger 100 of which supplied power is large.

Figure 3:
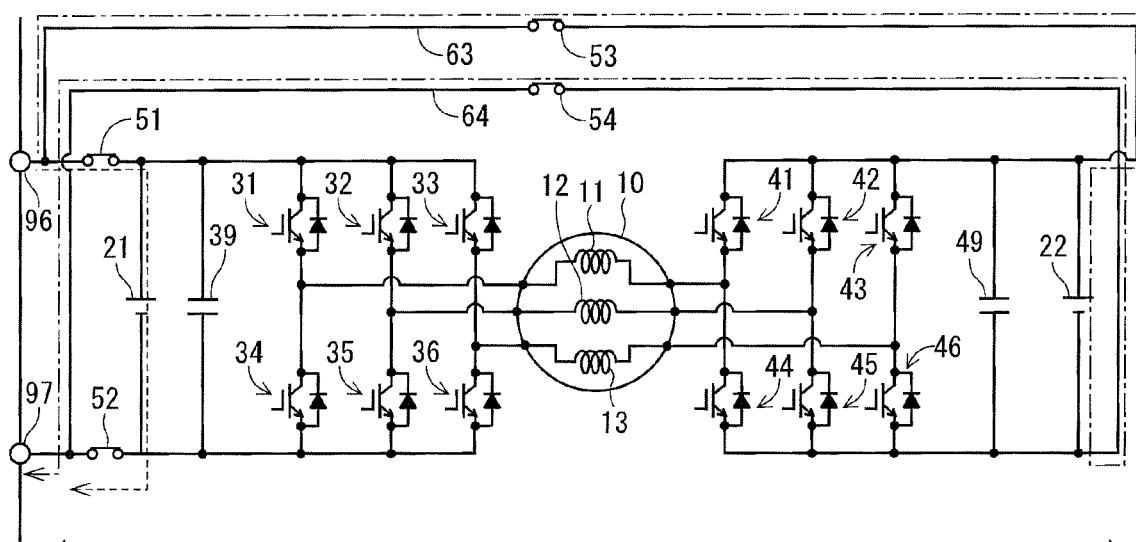
FIG. 3 is an explanatory diagram for explaining parallel charging and individual charging of the first voltage source and the second voltage source in the charging system according to the first embodiment.
Figure 4:
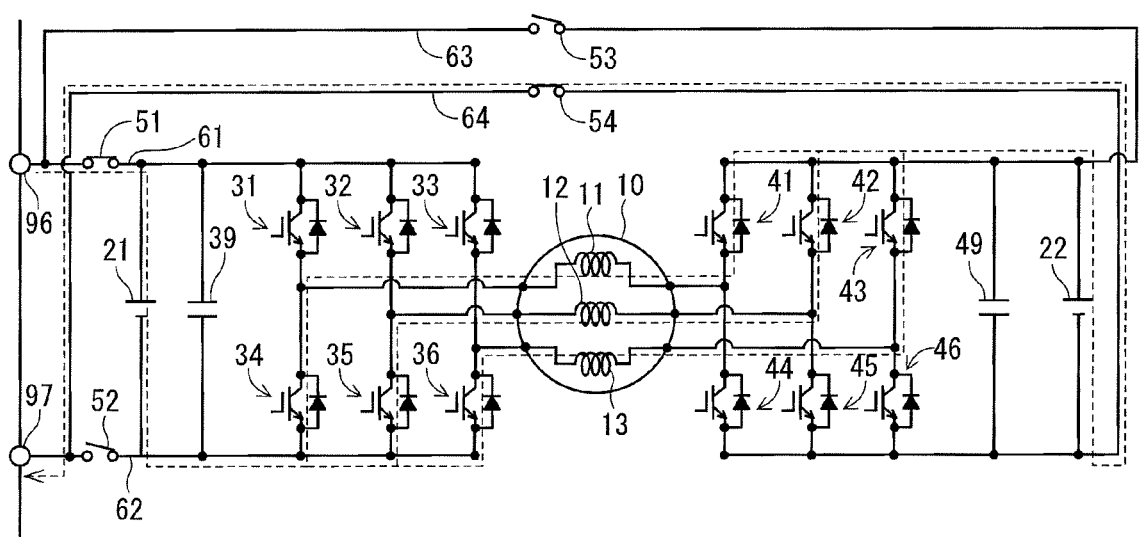
FIG. 4 is an explanatory diagram for explaining serial charging of the first voltage source and the second voltage source in the charging system according to the first embodiment.
Figure 5:
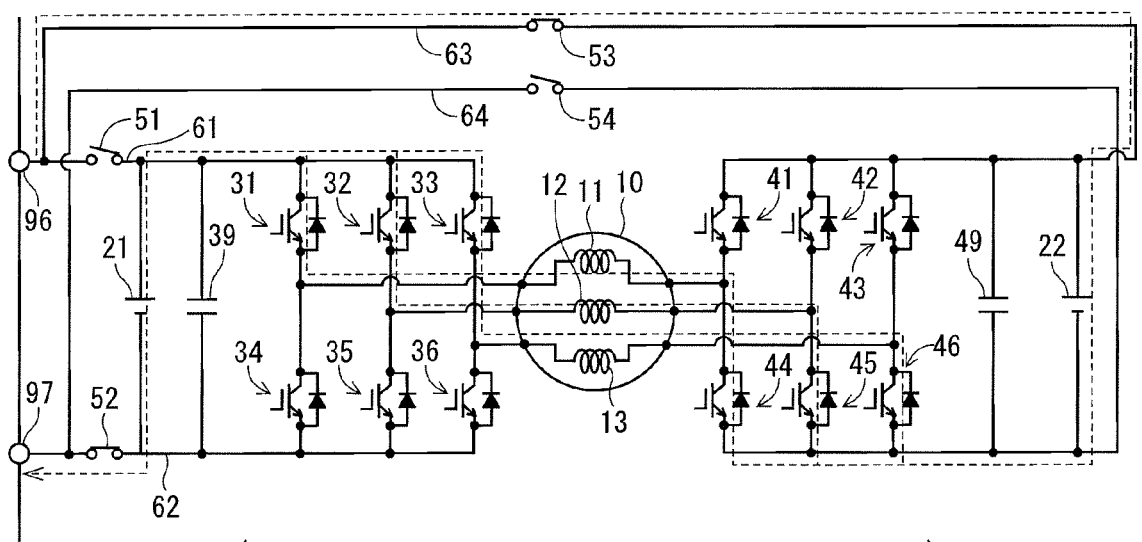
FIG. 5 is an explanatory diagram for explaining serial charging of the first voltage source and the second voltage source in the charging system according to the first embodiment.

Next, parallel charging, individual charging, and serial charging of the voltage sources 21 and 22 will be described with reference to FIG. 3 to FIG. 5. In FIG. 3 to FIG. 5, the voltage sources 21 and 22 are each denoted by a single battery symbol. Some of the configurations, such as the control unit 70, and reference numbers are omitted.

As shown in FIG. 3, when parallel charging of the voltage sources 21 and 22 is performed, the relay control unit 72 closes the switches 51 to 54. As a result, the first voltage source 21 is charged over an energization path that is indicated by a broken-line arrow. The second voltage source 22 is charged over an energization path that is indicated by a single-dot-chain-line arrow.

In FIG. 3, when individual charging of the first voltage source 21 is performed, the relay control unit 72 closes the switches 51 and 52 and closes the two switches 53 and 54, As a result, individual charging of the first voltage source 21 can be performed over a path that is indicated by the broken-line arrow. In addition, in FIG. 3, when individual charging of the second voltage source 22 is performed, the relay control unit 72 closes the switches 53 and 54 and opens the switches 51 and 52. As a result, individual charging of the second voltage source 22 can be performed over the energization path that is indicated by the single-dot-chain-line arrow.

As shown in FIG. 4, when serial charging of the voltage sources 21 and 22 is performed, the relay control unit 72 closes the switches 51 and 54, and opens the switches 52 and 53. As a result, as indicated by a broken-line arrow, a current flows through the first high-potential-side power supply line 61, the first voltage source 21, the first lower arm elements 34 to 36, the coils 11 to 13, the second upper arm elements 41 to 43, the second voltage source 22, and the second low-potential-side power supply line 64. Consequently, the voltage sources 21 and 22 can be simultaneously charged in series.

In addition, as shown in FIG. 5, when serial charging of the voltage sources 21 and 22 is performed, the relay control unit 72 closes the switches 52 and 53, and opens the switches 51 and 54. As a result, as indicated by a broken-line arrow, a current flows through the second high-potential-side power supply line 63, the second voltage source 22, the second lower arm elements 44 to 46, the coils 11 to 13, the first upper arm elements 31 to 33, the first voltage source 21, and the first low-potential-side power supply line 62. Consequently, the voltage sources 21 and 22 can be simultaneously charged in series. In the examples in FIG. 4 and FIG. 5, the current flows through the freewheeling diodes FD of the switching elements 31 to 36 and 41 to 46. The present disclosure is not limited to this configuration. For example, when the switching elements 31 to 36 and 41 to 46 are MOSFETs, the configuration may be such that, after the start of charging is confirmed, the elements on the energization path are turned on and synchronous rectification is performed.

Next, a charging control process according to the present embodiment will be described with reference to a flowchart in FIG. 6.

The charging control process can be performed by the control unit 70 while the vehicle is stopped. Hereafter, "step" of step S101 is omitted and simply denoted by symbol "S". This similarly applies to other steps.

When a charging connector of the high-speed charger 100 is connected to the inlet 95 at S101, at S102, the charging control unit 75 acquires battery states, such as electric potentials and SOCs, of the voltage sources 21 and 22. At S103, the charging control unit 75 determines whether charging of both voltage sources 21 and 22 is required. Here, when the SOC is equal to or greater than a completion determination threshold Fth (such as 80%), the charging control unit 75 determines that charging is completed and unnecessary. When determined that charging of at least either of the voltage sources 21 and 22 is unnecessary (NO at S103), the control unit 70 proceeds to S109. When determined that charging of both voltage sources 21 and 22 is necessary (Yes at S103), the control unit 70 proceeds to S104.

At S104, the charging control unit 75 determines whether a potential difference ΔV between the first voltage source 21 and the second voltage source 22 is greater than a potential difference determination threshold Vth. The potential difference determination threshold Vth is set to a value at about which the voltage sources 21 and 22 can be simultaneously charged either in parallel or in series. According to the present embodiment, a short circuit occurs when the switches 51 to 54 are closed and the two voltage sources 21 and 22 are connected in parallel, in a state in which a potential difference is present. Therefore, the potential difference determination threshold Vth is set to substantially zero. As a result, when determined that the potential difference $\Delta V$ is greater than the potential difference determination threshold Vth (YES at S104), the control unit 70 proceeds to S105. The control unit 70 sets the charging mode to individual charging mode in which individual charging of the voltage source 21 or 22 is performed. When determined that the potential difference $\Delta V$ has become equal to or less than the potential difference determination threshold Vth, the control unit 70 ends the individual charging mode and proceeds to S106. Meanwhile, when determined that the potential difference $\Delta V$ is equal to or less than the potential difference determination value Vth (NO at S104), the control unit 70 proceeds to S106. Details of each charging mode will be described hereafter.

At S106, the charging control unit 75 determines whether serial charging of the voltage sources 21 and 22 can be performed. Here, the charging control unit 75 determines that serial charging of the voltage sources 21 and 22 can be performed when the voltage that can be applied by the high-speed charger 100 is greater than a sum of the rated voltages of the voltage sources 21 and 22. Alternatively, the charging control unit 75 may perform the determination based on the standard and the like of the charger that is connected. For example, the charging control unit 75 may determine that serial charging of the voltage sources 21 and 22 can be performed when the high-speed charger 100 that is connected is CCS. The charging control unit 75 may determine that serial charging of the voltage sources 21 and 22 cannot be performed when the high-speed charger 100 is CHAdeMO. As a result, when determined that serial charging of the voltage sources 21 and 22 can be performed (YES at S106), the control unit 70 proceeds to S107 and sets the charging mode to serial charging mode in which serial charging of the voltage sources 21 and 22 is performed. Meanwhile, when determined that serial charging of the voltage sources 21 and 22 cannot be performed (NO at S106), the control unit 70 proceeds to S108 and sets the charging mode to parallel charging mode in which parallel charging of the voltage sources 21 and 22 is performed. When charging of at least either of the voltage sources 21 and 22 is completed in the serial charging mode or the parallel charging mode, the control unit 70 ends the serial charging mode or the parallel charging mode and proceeds to S109.

At S109, the charging control unit 75 determines whether charging of both voltage sources 21 and 22 is completed. As a result, when determined that charging of one of the voltage sources 21 and 22 is not completed (NO at S109), the control unit 70 proceeds to S110 and sets the charging mode to the individual charging mode in which individual charging of the voltage source of which charging is not completed is performed. Meanwhile, when determined that charging of both voltage sources 21 and 22 is completed (YES at S109) or charging in the individual charging mode is completed, the control unit 70 notifies the external control unit 105 of information indicating that charging is completed and stops power supply from the high-speed charger 100.

Here, the charging connector may be detached during charging, and charging may be interrupted. According to the present embodiment, when the potential difference $\Delta V$ is large, a state in which dual-side driving can be performed is ensured to the greatest extent possible by the voltage source that has the lower electric potential being preferentially charged.

Next, a charging process in the individual charging mode will be described with reference to a flowchart in FIG. 7.

At S201, the charging control unit 75 determines whether the voltage source that requires charging is the first voltage source 21 (voltage source 1). In the individual charging mode at S105, the voltage source of which the voltage is lower is selected as the voltage source that requires charging. In addition, in the individual charging mode at S110, the voltage source of which charging is not completed is selected as the voltage source that requires charging. When determined that the voltage source that requires charging is not the first voltage source 21 (NO at S201), that is, when determined that the voltage source that requires charging is the second voltage source 22, the control unit 70 proceeds to S205. When determined that the voltage source that requires charging is the first voltage source 21 (YES at S201), the control unit 70 proceeds to S202.

At S202, the relay control unit 72 closes (turns on) the switches 51 and 52 (relays 1 and 2) and opens (turns off) the switches 53 and 54 (relays 3 and 4). At S203, the control unit 70 performs individual charging of the first voltage source 21. When individual charging is started, the control unit 70 transmits information indicating that preparation for power reception is completed to the external control unit 105. Upon receiving the notification of completion of preparation for power reception, the external control unit 105 starts power supply from the high-speed charger 100. This similarly applies to when parallel charging is started, when serial charging is started, and embodiments described hereafter.

At S204, the charging control unit 75 determines whether the charging state of the first voltage source 21 has reached a target. In the individual charging mode at S105, the charging control unit 75 determines that the target has been reached when the potential difference $\Delta V$ is equal to or less than the potential difference determination threshold Vth. In addition, in the individual charging mode at S110, the charging control unit 75 determines that the target has been reached when the SOC of the first voltage source 21 is equal to or greater than the completion determination threshold Fth. When determined that the charging state of the first voltage source 21 has not reached the target (NO at S204), the control unit 70 returns to S203 and continues individual charging of the first voltage source 21. When determined that the charging state of the first voltage source 21 has reached the target (YES at S204), the control unit 70 proceeds to S208.

At S205 to which the control unit 70 proceeds after determining NO at S201, the relay control unit 72 opens (turns off) the switches 51 and 52 (relays 1 and 2), and closes (turns on) the switches 53 and 54 (relays 3 and 4). At S206, the control unit 70 performs individual charging of the second voltage source 22.

At S207, the charging control unit 75 determines whether the charging state of the second voltage source 22 has reached a target. Here, in a manner similar to that at S204, in the individual charging mode at S105, the charging control unit 75 determines that the target has been reached when the potential difference $\Delta V$ is equal to or less than the potential difference determination threshold Vth. In addition, in the individual charging mode at S110, the charging control unit 75 determines that the target has been reached when the SOC of the second voltage source 22 is equal to or greater than the completion determination threshold Fth. When determined that the charging state of the second voltage source 22 has not reached the target (NO at S207), the control unit 70 returns to S206 and continues individual charging of the second voltage source 22. When determined that the charging state of the second voltage source 22 has reached the target (YES at S207), the control unit 70 proceeds to S208. At S208, the relay control unit 72 opens (turns off) all switches 51 to 54 (relays 1 to 4) and ends the individual charging mode. At this time, a command to stop power supply may be transmitted to the external control unit 105. Power supply from the high-speed charger 100 may be temporarily stopped. This similarly applies to when parallel charging is completed, when serial charging is completed, and embodiments described hereafter.

Next, a charging process in the parallel charging mode will be described with reference to a flowchart in FIG. 8.

At S301, the relay control unit 72 closes (turns on) all switches 51 to 54 (relays 1 to 4). At S302, in a state in which the voltage sources 21 and 22 are connected in parallel, the control unit 70 performs simultaneous charging of the voltage sources 21 and 22

At S303, the charging control unit 75 determines whether the states of charge of the voltage sources 21 and 22 have reached the target. According to the present embodiment, when at least either of the SOC1 and the SOC2 is equal to or greater than the completion determination threshold Fth, the charging control unit 75 determines that the target has been reached. When determined that the states of charge of the voltage sources 21 and 22 have not reached the target (NO at S303), that is, when the SOC1 and the SOC2 are both less than the completion determination threshold Fth, the control unit 70 returns to S302 and continues parallel charging of the voltage sources 21 and 22. When determined that the states of charge of the voltage sources 21 and 22 have reached the target (YES at S303), that is, when determined that at least either of the SOC1 and the SOC2 is equal to or greater than the completion determination threshold Fth, the control unit 70 proceeds to S304. The relay control unit 72 opens (turns off) all switches 51 to 54 (relays 1 to 4) and ends the parallel charging mode.

Next, a charging process in the serial charging mode will be described with reference to the flowchart in FIG. 10.

At S401, the charging control unit 75 selects the energization path. When the switches 51 and 54 were closed, and the first lower arm elements 34 to 36 and the second upper arm elements 41 to 43 were energized during a previous serial charging (see FIG. 4), during a current serial charging, the energization path is a path in which that the switches 52 and 53 are closed, and the second lower arm elements 44 to 46 and the first upper arm elements 31 to 33 are energized (see FIG. 5). In addition, when the switches 52 and 53 were closed, and the second lower arm elements 44 to 46 and the first upper arm elements 31 to 33 were energized during the previous serial charging (see FIG. 5), during the current serial charging, the energization path is a path in which the switches 51 and 54 are closed, and the first lower arm elements 34 to 36 and the second upper arm elements 41 to 43 are energized (see FIG. 4). As a result, imbalance in element deterioration can be reduced.

At S402, the relay control unit 72 closes (turns on) the switches (relays) that serve as the selected energization path. At S403, in a state in which the voltage sources 21 and 22 are connected in series, the control unit 70 performs simultaneous charging of the voltage sources 21 and 22.

At S403*m*, when the switching elements are MOSFETs or the like, and capable of enabling energization from the low potential side to the high potential side through the switch units SW by being turned on, after confirmation of energization, the inverter control unit 71 turns on the elements of which the freewheeling diodes FD serve as the energization path. For example, as shown in FIG. 4, when the switches 51 and 54 are closed, the inverter control unit 71 turns on the first lower arm elements 34 to 36 and the second upper arm elements 41 to 43. In addition, for example, as shown in FIG. 5, when the switches 52 and 53 are closed, the inverter control unit 71 turns on the first upper arm elements 31 to 33 and the second lower arm elements 44 to 46. Furthermore, if the elements are already turned on, the on-state is maintained. Consequently, conduction loss can be reduced.

Here, when the switching elements are IGBTs or the like, and incapable of enabling energization from the low potential side to the high potential side, S403*m* is omitted. Furthermore, depending on conduction loss in the switch unit SW and the freewheeling diode FD, S403*m* can be omitted. This similarly applies to steps in which "m" is attached to the end of the step number.

Figure 8:
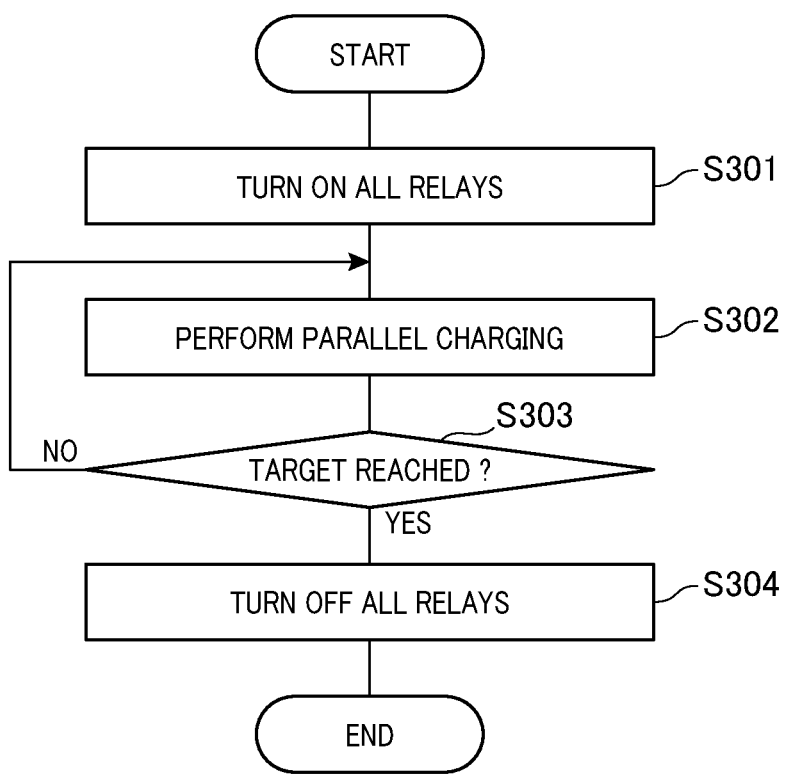
FIG. 8 is a flowchart of a parallel charging mode in the charging system according to the first embodiment.
Figure 9:
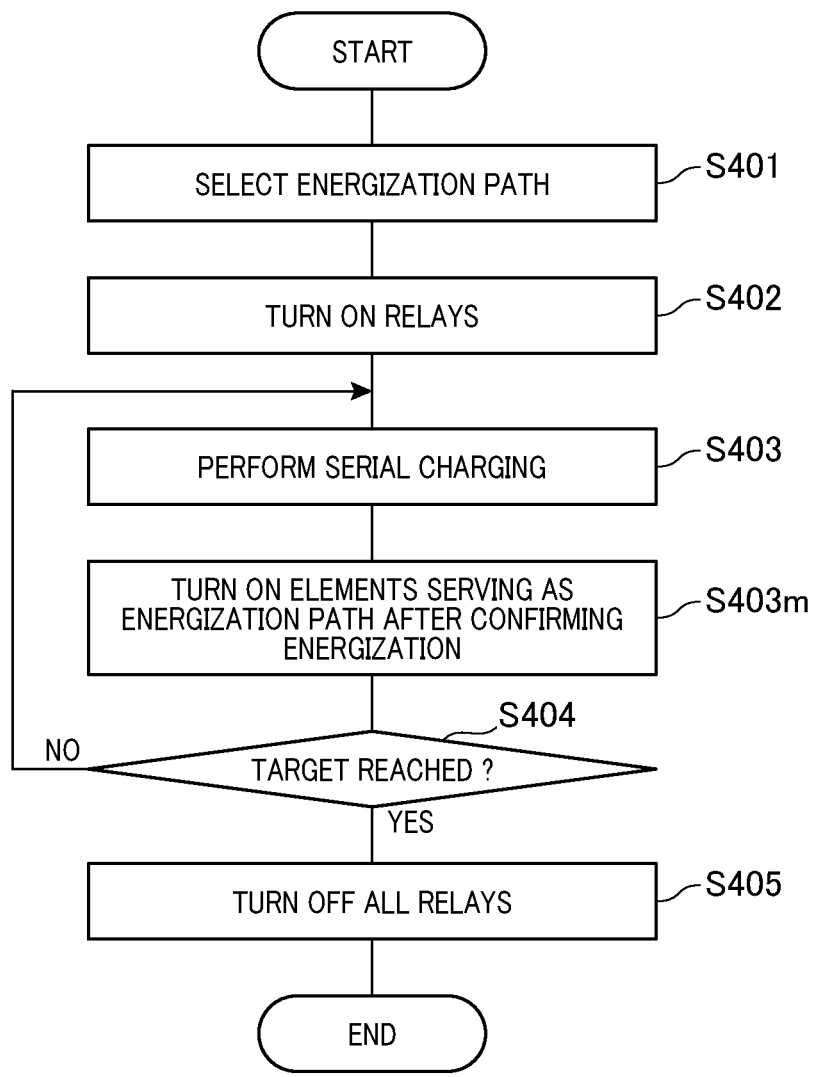
FIG. 9 is a flowchart of a serial charging mode in the charging system according to the first embodiment.

At S404, in a manner similar to that at S303 in FIG. 8, the charging control unit 75 determines whether the states of charge of the voltage sources 21 and 22 have reached the target. As a result, when determined that the states of charge of the voltage sources 21 and 22 have not reached the target (NO at S404), the control unit 70 returns to S403 and continues serial charging of the voltage sources 21 and 22. Meanwhile, when determined that the states of charge of the voltage sources 21 and 22 have reached the target (YES at S404), the control unit 70 proceeds to S405. The relay control unit 72 opens (turns off) all switches 51 to 54 (relays 1 to 4) and ends the serial charging mode.

According to the present embodiment, parallel charging of the voltage sources 21 and 22 can be performed without charging being performed through the inverters 30 and 40. Therefore, this configuration is suitably applied to cases in which the frequency of use of a charger that has a voltage specification of 500 V, such as CHAdeMO, is high. In addition, when a charger that has a voltage specification of 1000 V, such as CCS, is connected, serial charging in which the inverters 30 and 40 serve as the energization path can be performed. Therefore, the voltage sources 21 and 22 can be charged with high efficiency according to both charging standards. Furthermore, individual charging can also be performed. Consequently, the two voltage sources 21 and 22 can be appropriately charged such that the desired SOCs are achieved.

As described above, the charging system 1 charges the first voltage source 21 and the second voltage source 2. The first voltage source 21 and the second voltage source 2 are two voltage sources that are capable of supplying electric power to the MG 10. The MG 10 includes the coil group 110 that is configured by the coils 11 to 13 of a plurality of phases. The charging system 1 includes the first inverter 30, the second inverter 40, at least three switches, and the control unit 70.

The first inverter 30 includes the first switching elements 31 to 36. The second inverter 40 includes the second switching elements 41 to 46.

The at least three switches include the high-potential-side switches 51 and 53 and the low-potential-side switches 52 and 54. The high-potential-side switches 51 and 53 are provided on the high-potential-side power supply lines 61 and 63 that connect the high-potential-side external connection terminal 96 and the high potential side of the first voltage source 21 or the second voltage source 22. The high-potential-side external connection terminal 96 can be connected to the high potential side of the high-speed charger 100. The low-potential-side switches 52 and 54 are provided on the high-potential-side power supply lines 62 and 64 that connect the low-potential-side external connection terminal 97 and the low potential side of the first voltage source 21 or the second voltage source 22. The low-potential-side external connection terminal 97 can be connected to the low potential side of the high-speed charger 100. The control unit 70 is capable of switching charging between individual charging and simultaneous charging by controlling the operations of the first switching elements 31 to 36, the second switching elements 41 to 46, and the switches 51 to 54. In individual charging, either of the first voltage source 21 and the second voltage source 22 is charged. In simultaneous charging, the first voltage source 21 and the second voltage source 22 are charged.

As a result of the at least three switches being provided, and the inverters 30 and 40 and the switches 51 to 54 being controlled, charging can be appropriately switched between individual charging and simultaneous charging of the voltage sources 21 and 22. Here, the concept of "control the operations of the first switching elements" includes all of the first switching elements 31 to 36 being turned off. This similarly applies to the second switching elements 41 to 46 as well.

Respective first ends 111, 121, and 131 of the coils 11, 12, and 13 are connected to the first voltage source 21 with the first inverter 30 therebetween. Respective second ends 112, 122, and 132 of the coils 11, 12, and 13 are connected to the second voltage source 22 with the second inverter 40 therebetween. According to the present embodiment, the high-potential-side power supply lines include the first high-potential-side power supply line 61 that connects the high-potential-side external connection terminal 96 and the high potential side of the first voltage source 21, and the second high-potential-side power supply line 63 that connects the high-potential-side external connection terminal 96 and the high potential side of the second voltage source 22. The low-potential-side power supply lines include the first low-potential-side power supply line 62 that connects the low-potential-side external connection terminal 97 and the low potential side of the first voltage source 21, and the second low-potential-side power supply line 64 that connects the low-potential-side external connection terminal 97 and the low potential side of the second voltage source 22. That is, the "switches" according to the present embodiment are four switches.

According to the present embodiment, in the dual-power-supply dual-inverter configuration in which the inverters 30 and 40 and the voltage sources 21 and 22 are provided on both sides of the coils 11 to 13 of the MG 10 that are open windings, the two voltage sources that are insulated from each other can be simultaneously charged as a result of the high-potential-side power supply lines 61 and 63 and the low-potential-side power supply lines 62 and 64 being provided, and the inverters 30 and 40 and the coils 11 to 13 being used as power paths. In addition, through control of the inverters 30 and 40 and the switches 51 to 54, charging can be switched among individual charging, parallel charging, and serial charging of the voltage sources 21 and 22. In particular, in cases in which the MG 10 and the inverters 30 and 40 are designed for large output, the configuration is applicable to high-speed charging in which the supplied power is large.

When parallel charging of the first voltage source 21 and the second voltage source 22 is performed, the control unit 70 closes the first high potential switch 51, the first low-potential-side switch 52, the second high-potential-side switch 53, and the second low-potential-side switch 54. As a result, parallel charging of the voltage sources 21 and 22 can be performed without charging being performed through the MG 10 and the inverters 30 and 40. Charging can be appropriately performed by the high-speed charger 100 of which the voltage specification is a voltage that is lower than the sum of the rated voltages of the voltage sources 21 and 22.

When individual charging of the first voltage source 21 is performed, the control unit 70 closes the first high-potential-side switch 51 and the first low-potential-side switch 52, and opens the second high-potential-side switch 53 and the second low-potential-side switch 54. In addition, when individual charging of the second voltage source 22 is performed, the control unit 70 opens the first high-potential-side switch 51 and the first low-potential-side switch 52, and closes the second high-potential-side switch 53 and the second low-potential-side switch 54. Consequently, individual charging of the voltage source 21 or 22 can be performed without charging being performed through the MG 10 and the inverters 30 and 40.

Each of the first switching elements 31 to 36 and second switching elements 41 to 46 includes the switch unit SW and the freewheeling diode FD. The switch unit SW is capable of switching between conducting and blocking a current based on a command from the control unit 70. The freewheeling diode FD allows a current to be circulated from the low potential side to the high potential side through the freewheeling diode FD.

When serial charging of the first voltage source 21 and the second voltage source 22 is performed, the control unit 70 closes the first high-potential-side switch 51 and the second low-potential-side switch 54, and opens the first low-potential-side switch 52 and the second high-potential-side switch 53. Alternatively, when serial charging of the first voltage source 21 and the second voltage source 22 is performed, the control unit 70 opens the first high-potential-side switch 51 and the second low-potential-side switch 54, and closes the first low-potential-side switch 52 and the second high-potential-side switch 53. Consequently, serial charging of the voltage sources 21 and 22 can be performed with the MG 10 and the inverters 30 and 40 serving as the power paths. Charging can be performed with high efficiency by the high-speed charger 100 of which the voltage specification is a voltage that is higher than the sum of the rated voltages of the voltage sources 21 and 22.

The control unit 70 is capable of switching between individual charging of the first voltage source 21 or the second voltage source 22, and simultaneous charging of the first voltage source 21 and the second voltage source 22, based on the states of charge of the first voltage source 21 and the second voltage source 22. Consequently, the voltage sources 21 and 22 can be appropriately charged.

Second Embodiment

Figure 10:
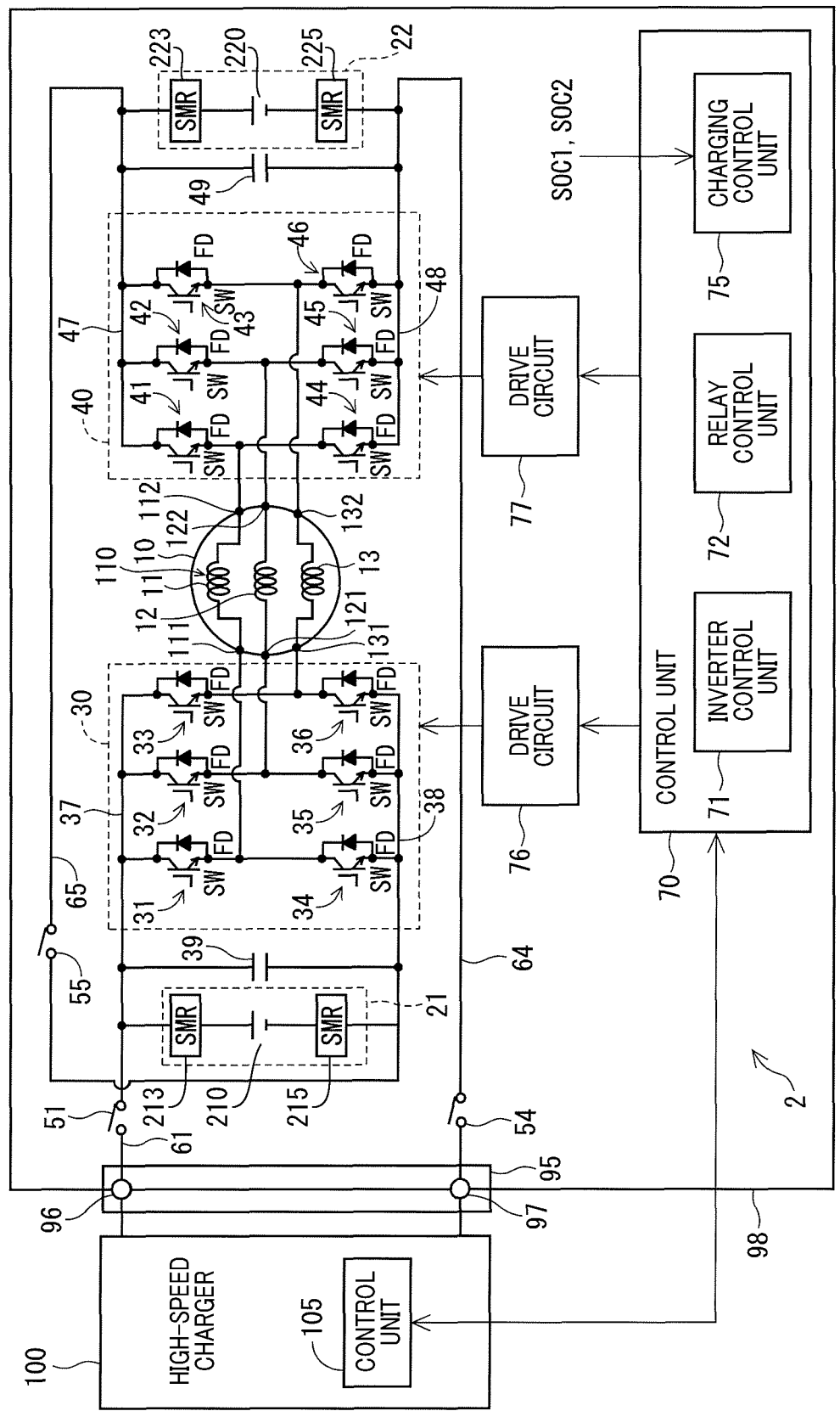
FIG. 10 is a circuit diagram of a charging system according to a second embodiment.
Figure 11:
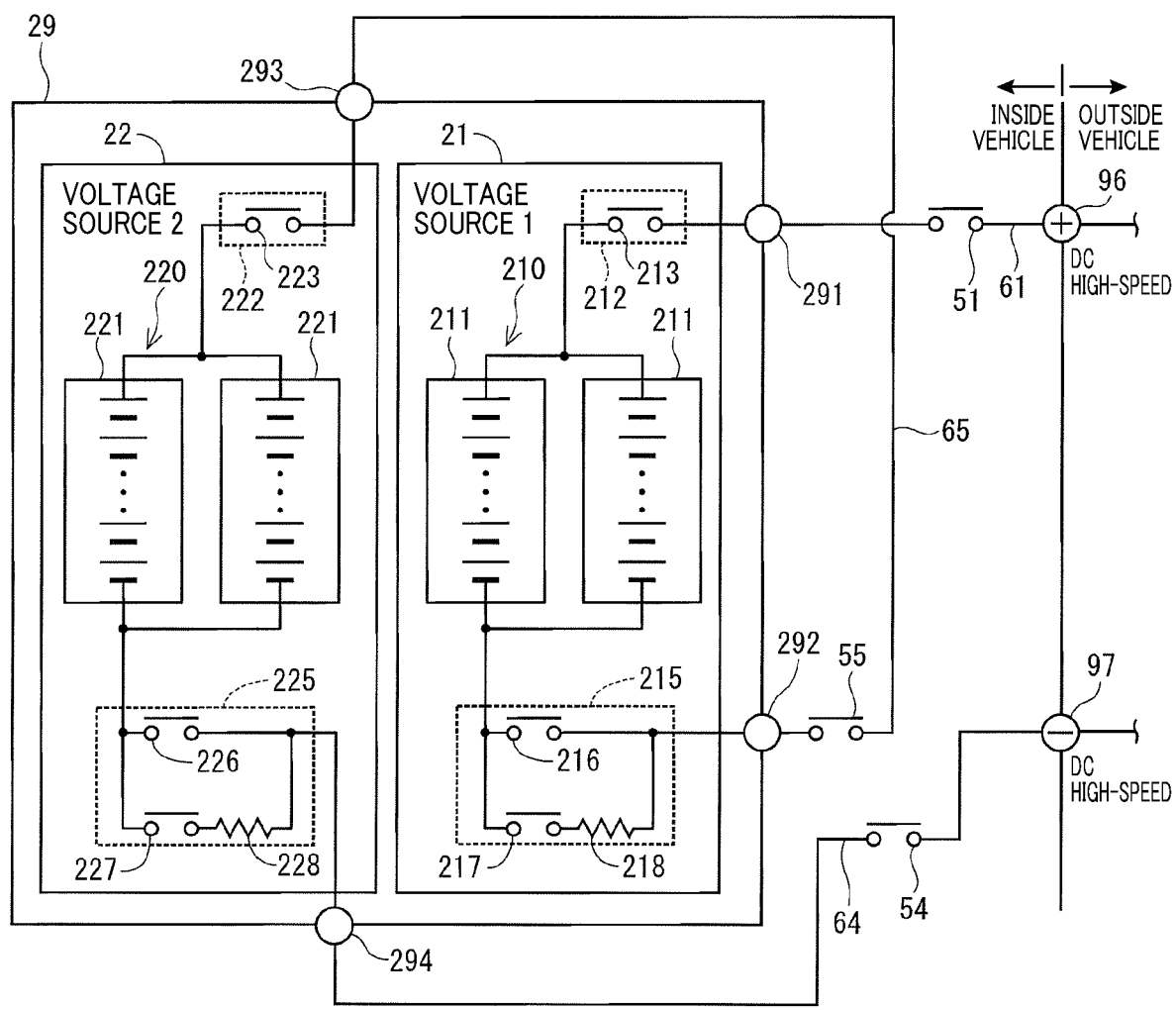
FIG. 11 is a circuit diagram of a battery pack in which a first voltage source and a second voltage source of the charging system according to the second embodiment are provided.

A second embodiment is shown in FIG. 10 to FIG. 19. As shown in FIG. 10 and FIG. 11, a charging system 2 according to the present embodiment includes the motor generator 10, the first voltage source 21, the second voltage source 22, the first inverter 30, the second inverter 40, the first high-potential-side switch 51, the second low-potential-side switch 54, an inter-power-supply switch 55, the first highpotential-side power supply line 61, the second low-potential-side power supply line 64, an inter-power-supply connection line 65, the control unit 70, and the like.

That is, according to the present embodiment, the first low-potential-side switch 52, the second high-potential-side switch 53, the first low-potential-side power supply line 55, and the second high-potential-side power supply line 65 according to the above-described embodiment are omitted. Instead, the inter-power-supply switch 55 and the inter power supply connection line 65 are provided. Here, configurations that are identical to one another among the embodiments are given the same names. Therefore, depending on the embodiment, cases in which a "second" is present without a "first" being present may occur. That is, for example, a "second low-potential-side switch 54" is present without a "first low-potential-side switch 52" being present. This similarly applies to embodiments described hereafter.

The inter power supply line 65 directly connects the low potential side of the first voltage source 21 and the high potential side of the second voltage source 22 without the MG 10 and the inverters 30 and 40 therebetween. The inter power supply connection line 65 is provided with the inter-power-supply switch 55. The relay control unit 72 controls open/close operations of the inter-power-supply switch 55. In a manner similar to the switches 51 to 54, any type of switch may be used as the inter-power-supply switch 55 as long as the inter-power-supply switch 55 is capable of switching between conducting and blocking a current. For example, a semiconductor relay or a mechanical relay is used. This similarly applies to switches 56 to 58 and 81 to 84 according to the embodiments described hereafter. In the drawings, the inter-power-supply switch 55 is denoted by "relay 5". Here, according to the present embodiment, a description of the onboard charger 150 is omitted.

In a manner similar to that according to the above-described embodiment, even according to the present embodiment, charging can be switched among individual charging, parallel charging, and serial charging, without a separate charger or the like being provided. Hereafter, parallel charging, individual charging, and serial charging of the voltage sources 21 and 22 will be described with reference to FIG. 12 to FIG. 15.

Figure 12:
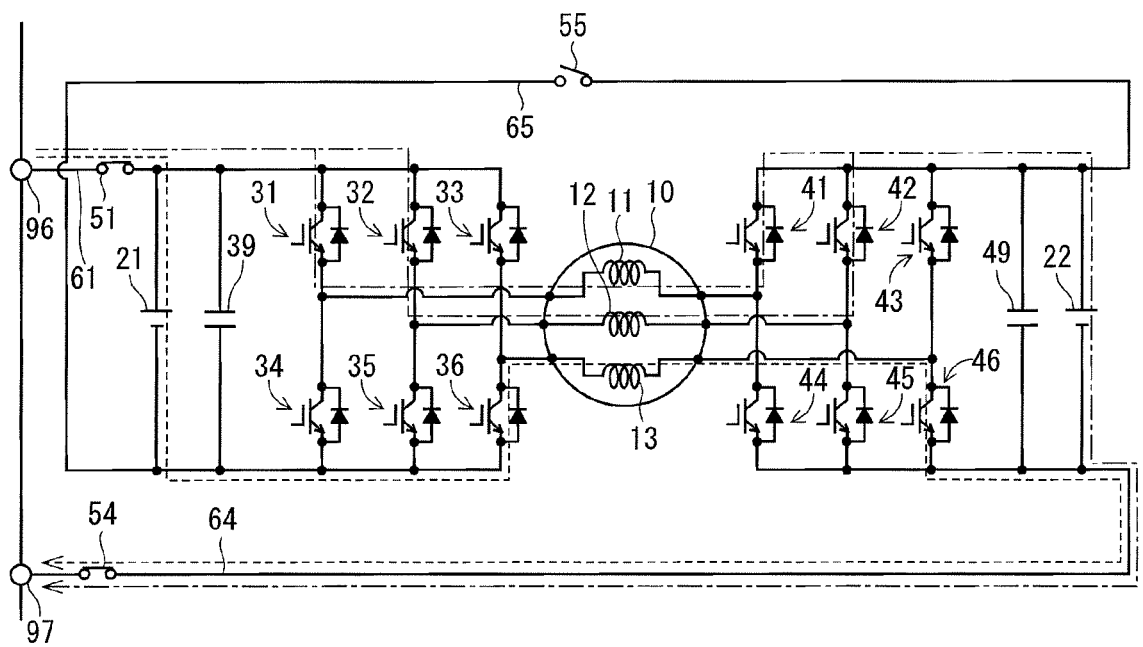
FIG. 12 is an explanatory diagram for explaining parallel charging of the first voltage source and the second voltage source in the charging system according to the second embodiment.

As shown in FIG. 12, when parallel charging of the voltage sources 21 and 22 is performed, the control unit 70 turns on the main relay units 212, 215, 222, and 225, closes the switches 51 and 54, and opens the switch 55. In addition, the control unit 70 turns on at least the first upper arm element of a first phase, and at least the second lower arm element of a second phase that differs from the first phase of which the first upper arm element is turned on is turned on. In an example in FIG. 12, the control unit 70 turns on the U-phase and V-phase first upper arm elements 31 and 32, and the W-phase second lower arm element 46.

In FIG. 12, as indicated by a broken-line arrow, the first voltage source 21 is charged as a result of a current flowing through the freewheeling diode FD of the W-phase first lower arm element 36, the W-phase coil 13, and the switch unit SW of the W-phase second lower arm element 46. In addition, as indicated by a single-dot-chain-line arrow, the second voltage source 22 is charged as a result of a current flowing through the switch units SW of the U-phase and V-phase first upper arm elements 31 and 32, the coils 11 and 12, and the freewheeling diodes FD of the second upper arm elements 41 and 42. Consequently, the voltage sources 21 and 22 can be simultaneously charged in parallel.

When the SOC2 is lower than the SOC1, as shown in FIG. 12, the second voltage source 22 is charged by two phases, the U-phase and the V-phase. The first voltage source 21 is charged by one phase, the W-phase. Here, when the SOC1 is equal to or lower than the SOC2, the first voltage source 21 is charged by two phases and the second voltage source 22 is charged by one phase. The elements to be energized (energization elements) among all elements 31 to 36 and 41 to 46 of the three phases can be arbitrarily selected. For example, elements other than the elements that had been turned on when charging was previously performed are turned on.

In addition, when the switching elements 31 to 36 and 41 to 46 are MOSFETs, after the start of charging is confirmed, synchronous rectification may be performed by the W-phase first lower arm element 36, the U-phase second upper arm element 41, and the V-phase second upper arm element 42 that are on an energization path from the low potential side to the high potential side being turned on. This similarly applies to when individual charging is performed.

Figure 13:
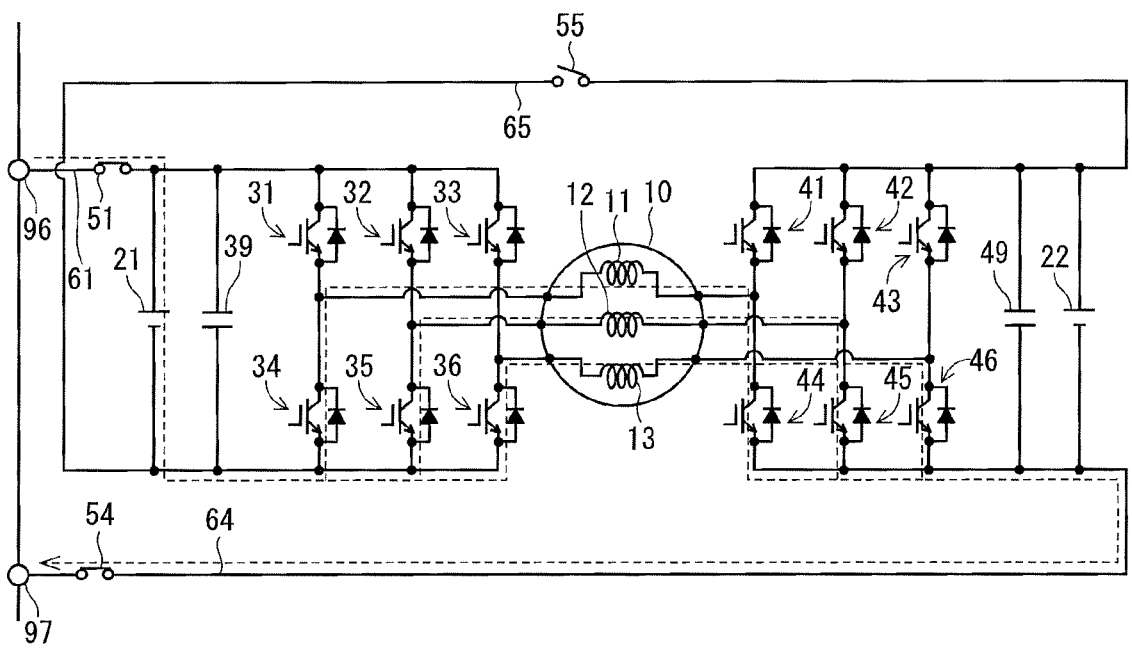
FIG. 13 is an explanatory diagram for explaining individual charging of the first voltage source in the charging system according to the second embodiment.

As shown in FIG. 13, when individual charging of the voltage source 21 is performed, the control unit 70 turns on the main relay units 212, 215, 222, and 225, closes the switches 51 and 54, and opens the switch 55. In addition, the control unit 70 turns on the second lower arm elements 44 to 46. As indicated by a broken-line arrow, the first voltage source 21 is charged by a current flowing through the freewheeling diodes FD of the first lower arm elements 34 to 36, the coils 11 to 13, and the switch units SW of the second lower arm elements 44 to 46.

Figure 14:
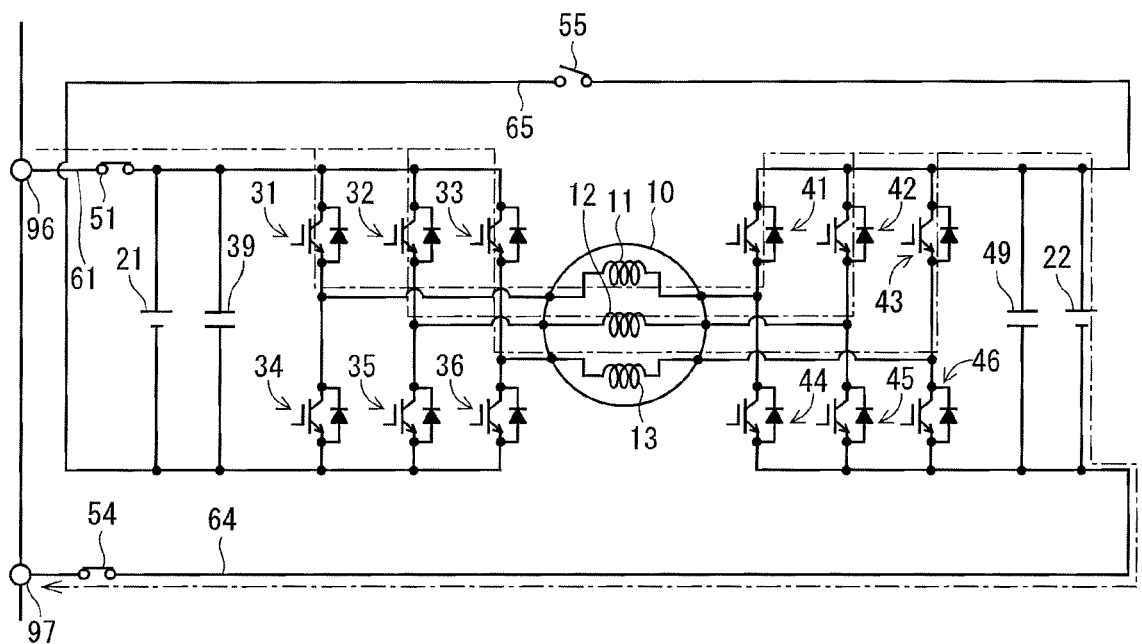
FIG. 14 is an explanatory diagram for explaining individual charging of the second voltage source in the charging system according to the second embodiment.

As shown in FIG. 14, when individual charging of the second voltage source 22 is performed, the control unit 70 turns on the main relay units 212, 215, 222, and 225, closes the switches 51 and 54, and opens the switch 55. In addition, the control unit 70 turns on the first upper arm elements 31 to 33. As indicated by a single-dot-chain-line arrow, the second voltage source 22 is charged by a current flowing through the switch units SW of the first upper arm elements 31 to 33, the coils 11 to 13, and the freewheeling diodes FD of the second upper arm elements 41 to 43. When individual charging of the voltage source 21 or 22 is performed, the switching elements of the three phases by which energization from the high potential side to the low potential side is performed are turned on. However, the number of phases of the switching elements to be turned on may be one phase or two phases.

Figure 15:
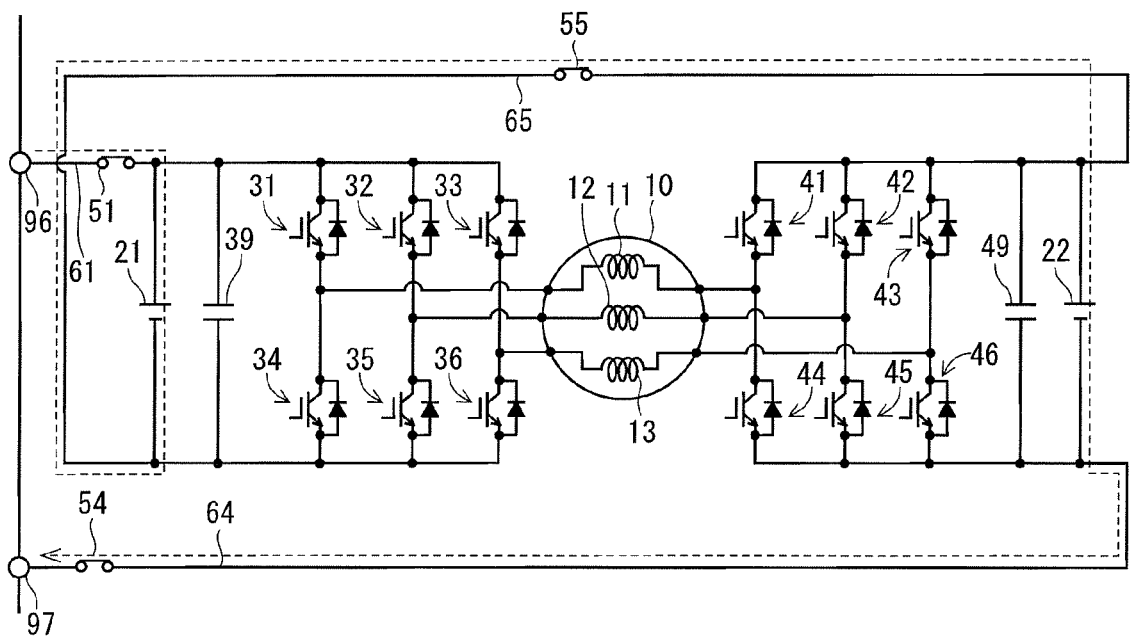
FIG. 15 is an explanatory diagram for explaining serial charging of the first voltage source and the second voltage source in the charging system according to the second embodiment.

As shown in FIG. 15, when serial charging of the voltage sources 21 and 22 is performed, the control unit 70 closes the switches 51, 54, and 55, turns on the main relay units 212, 215, 222, and 225, and turns off all switching elements 31 to 36 and 41 to 46. As indicated by a broken-line arrow, the voltage sources 21 and 22 can be simultaneously charged in series by a current flowing through the high-potential-side power supply line 61, the inter power supply connection line 65, and the low-potential-side power supply line 64.

Figure 6:
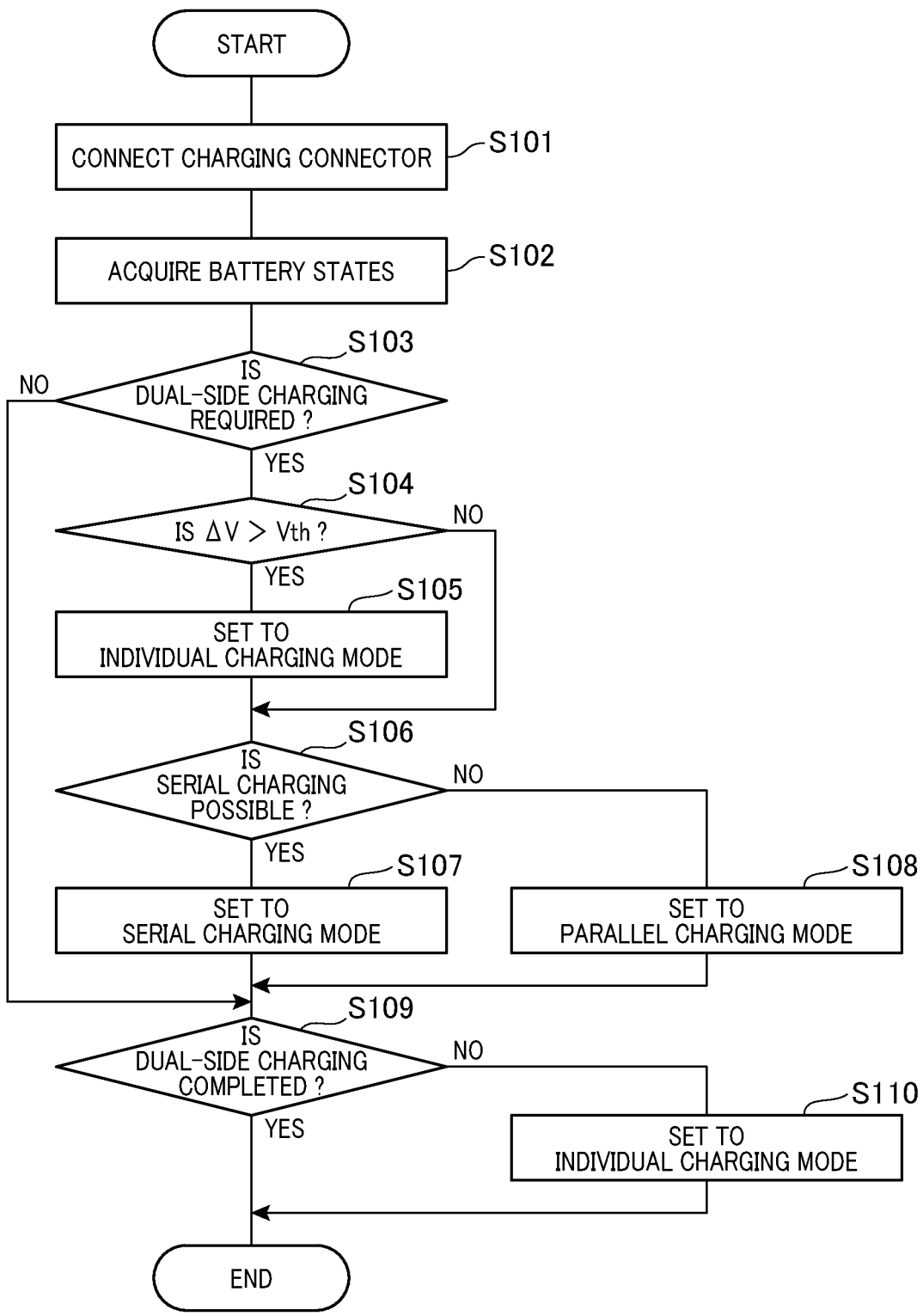
FIG. 6 is a flowchart of a charging control process in the charging system according to the first embodiment.

A charging control process related to selection of the charging mode is substantially similar to that in FIG. 6, described according to the above-described embodiment. Here, according to the present embodiment, when parallel charging is performed, the inverters 30 and 40 serve as the energization path. As a result, even when a potential difference is present between the voltage sources 21 and 22, a short-circuit current is inhibited by the freewheeling diodes FD of the switching elements 31 to 36 and 41 to 46. Therefore, the potential difference determination threshold Vth at S105 can be set to an arbitrary value that is greater than zero. In addition, when the potential difference ΔV is large, transfer of electric power between the voltage sources 21 and 22 occurs. Charging efficiency decreases. Therefore, the potential difference determination threshold Vth is preferably set taking charging efficiency into consideration.

Figure 16:
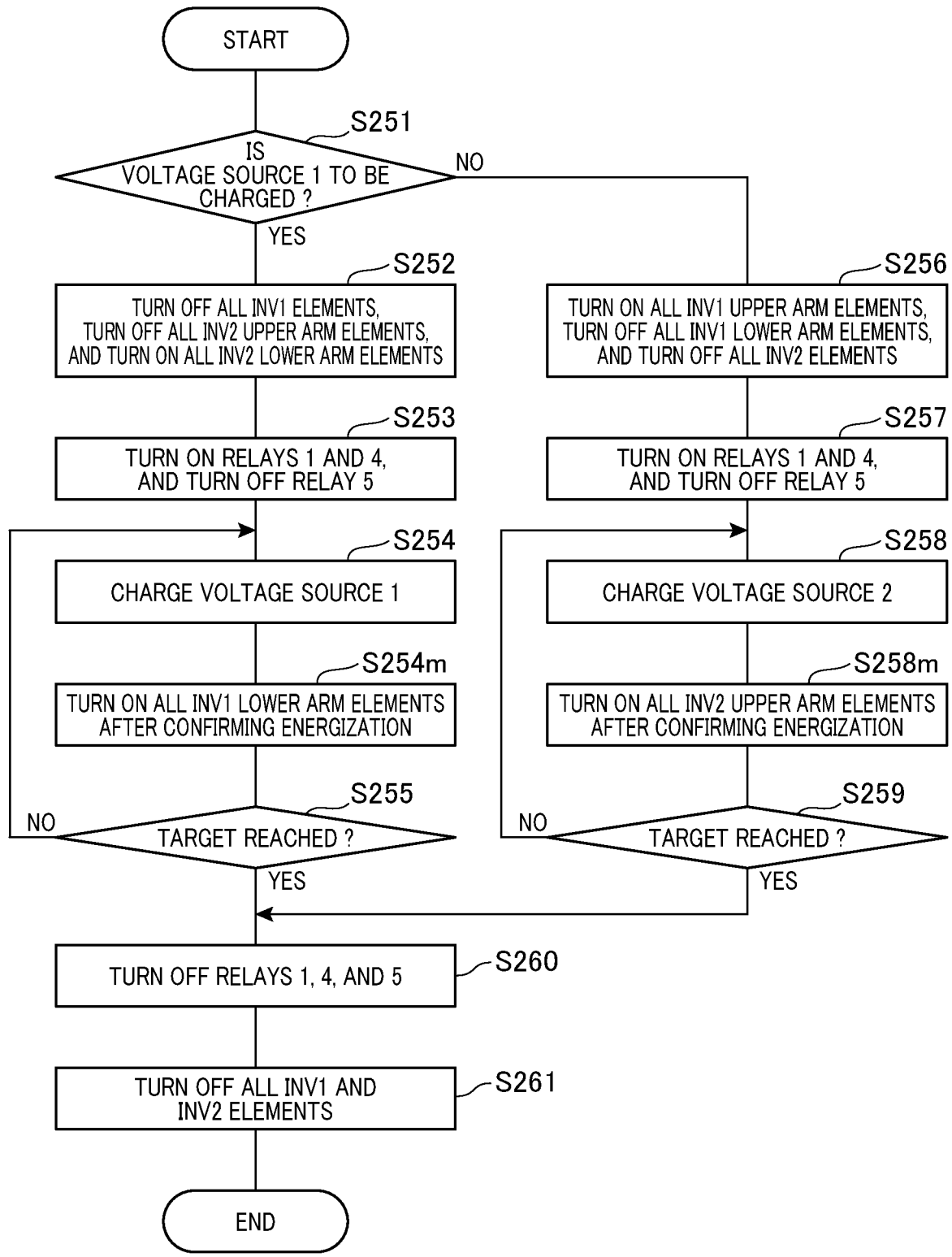
FIG. 16 is a flowchart of an individual charging mode in the charging system according to the second embodiment.

Next, a charging process in an individual charging mode according to the present embodiment will be described with reference to a flowchart in FIG. 16.

Figure 7:
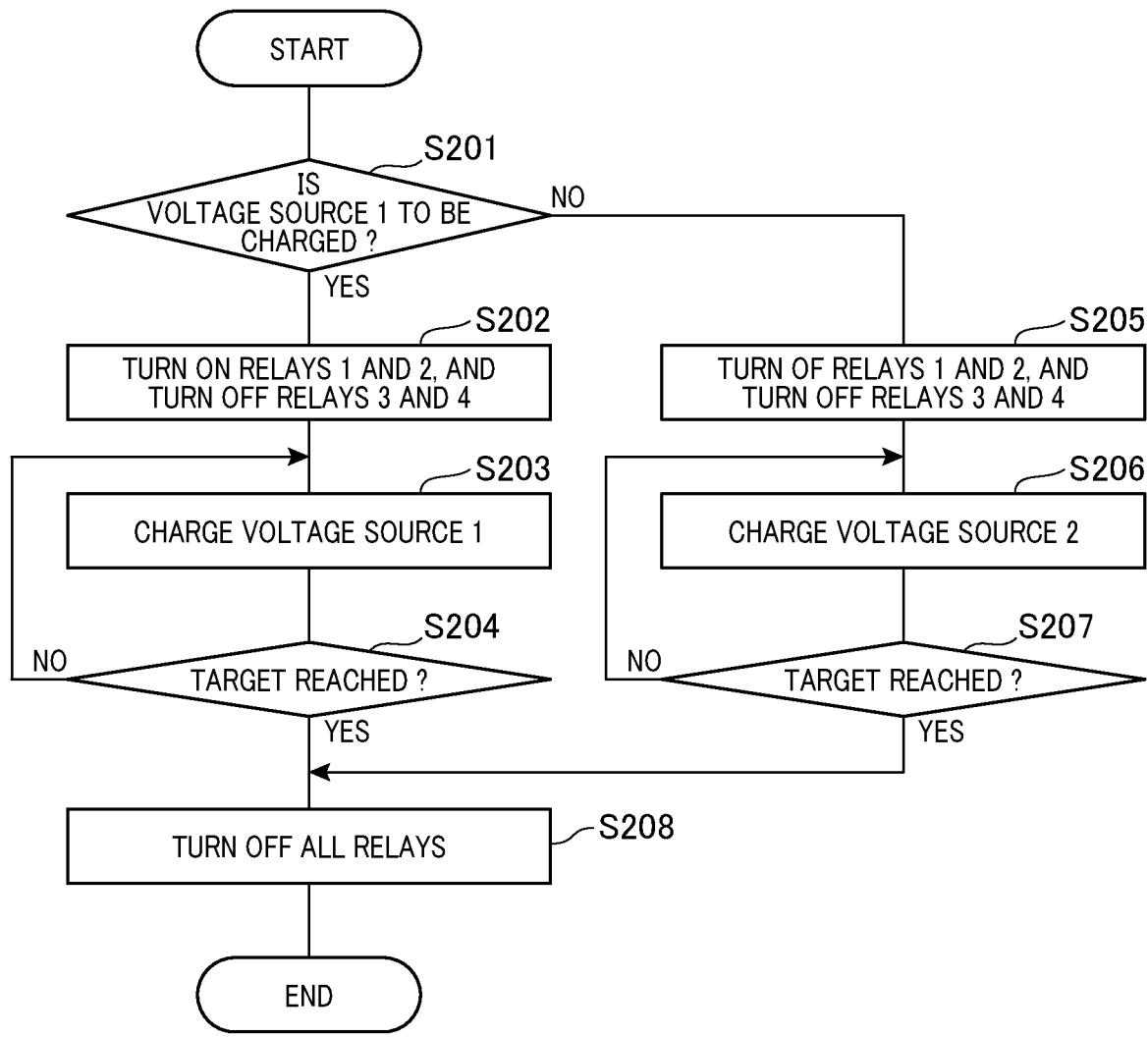
FIG. 7 is a flowchart of an individual charging mode in the charging system according to the first embodiment.

S251 is similar to S201 in FIG. 7. When determined that the power supply that requires charging is the second voltage source 22 (voltage source 2) (NO at S251), the control unit 70 proceeds to S256. When determined that the power supply that requires charging is the first voltage source 1 (voltage source 1) (YES at S251), the control unit 70 proceeds to S252.

At S252, the inverter control unit 71 turns off all elements 31 to 36 of the first inverter 30 and the second upper arm elements 41 to 43. The inverter control unit 71 turns on the second lower arm element 44 to 46. At S253, the relay control unit 72 closes (turns on) the switches 51 and 54 (relays 1 and 4), and opens (turns off) the inter-power-supply switch 55 (relay 5). At S254, the control unit 70 performs individual charging of the first voltage source 21 (voltage source 1).

At S254m, when the switching elements are MOSFETs or the like, and capable of enabling energization from the low potential side to the high potential side through the switch units SW by being turned on, after confirmation of energization, the inverter control unit 71 turns on the first lower arm elements 34 to 36 of the inverter 30 (INV1). In addition, if the elements are already turned on, the on-state is maintained.

The process at S255 is similar to that at S204 in FIG. 7. When determined that the charging state of the first voltage source 21 has not reached the target (NO at S255), the control unit 70 returns to S254 and continues individual charging of the first voltage source 21. When determined that the charging state of the first voltage source 21 has reached the target (YES at S255), the control unit 70 proceeds to S260.

At S256 to which the control unit 70 proceeds after determining NO at S251, the inverter control unit 71 turns on the first upper arm elements 31 to 33 of the first inverter 30 (INV1), turns off the first lower arm elements 34 to 36 of the first inverter 30 (INV1), and turns off all elements 41 to 46 of the second inverter 40 (INV2). At S257, the relay control unit 72 closes (turns on) the switches 51 and 54 (relays 1 and 4), and opens (turns off) the inter-power-supply switch 55 (relay 5). At S258, the control unit 70 performs individual charging of the second voltage source 22 (voltage source 2).

At S258m, when the switching elements are MOSFETs or the like, and capable of enabling energization from the low potential side to the high potential side through the switch units SW by being turned on, after confirmation of energization, the inverter control unit 71 turns on the second upper arm elements 41 to 43 of the second inverter 40 (INV2). In addition, if the elements are already turned on, the on-state is maintained.

The process at S259 is similar to that at S207. When determined that the charging state of the second voltage source 22 has not reached the target (NO at S259), the control unit 70 returns to S258 and continues individual charging of the second voltage source 22. When determined that the charging state of the second voltage source 22 has reached the target (YES at S259), the control unit 70 proceeds to S260.

At S260, the relay control unit 72 opens (turns off) the switches 51, 54, and 55 (relays 1, 4, and 5). At S261, the inverter control unit 71 turns off all elements 31 to 36 and 41 to 46 of the inverters 30 and 40 (INV1 and INV2).

Next, a charging process in a parallel charging mode will be described with reference to a flowchart in FIG. 17.

At S351, the charging control unit 75 selects the energization elements to serve as the energization path, among all elements 31 to 36 and 41 to 46 of the inverters 30 and 40. According to the present embodiment, the charging control unit 75 selects the energization elements, among all elements 31 to 36 and 41 to 46 of the inverters 30 and 40, such that an element that was not energized during a previous charging is preferentially selected as the energization element. As a result, imbalance in element deterioration can be reduced.

Figure 19A:
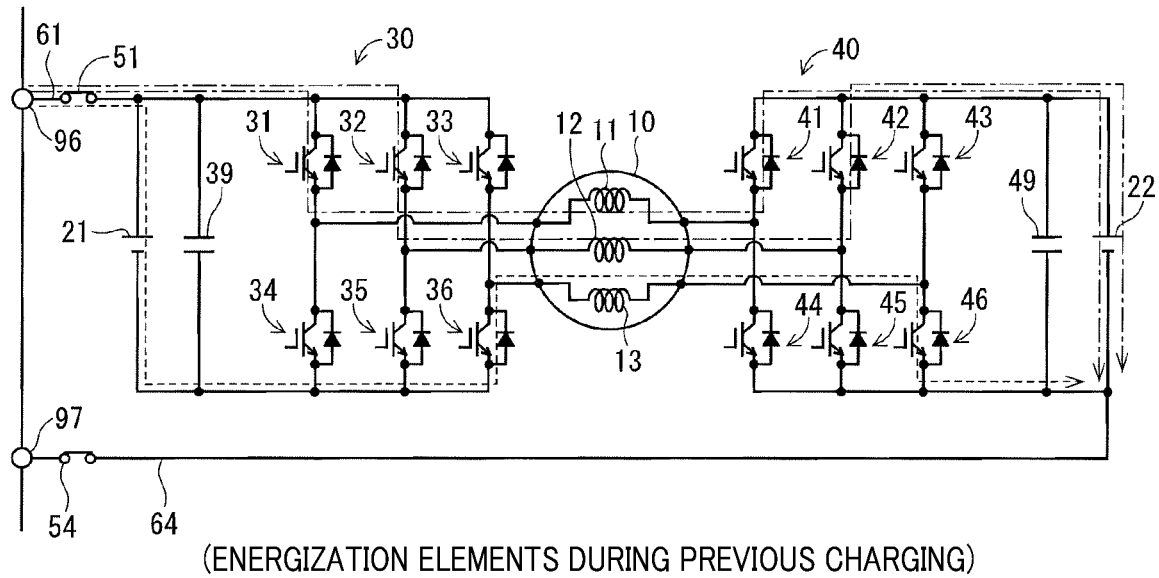
FIG. 19A and FIG. 19B are explanatory diagrams for explaining selection of energization elements in the charging system according to the second embodiment.
Figure 19B:
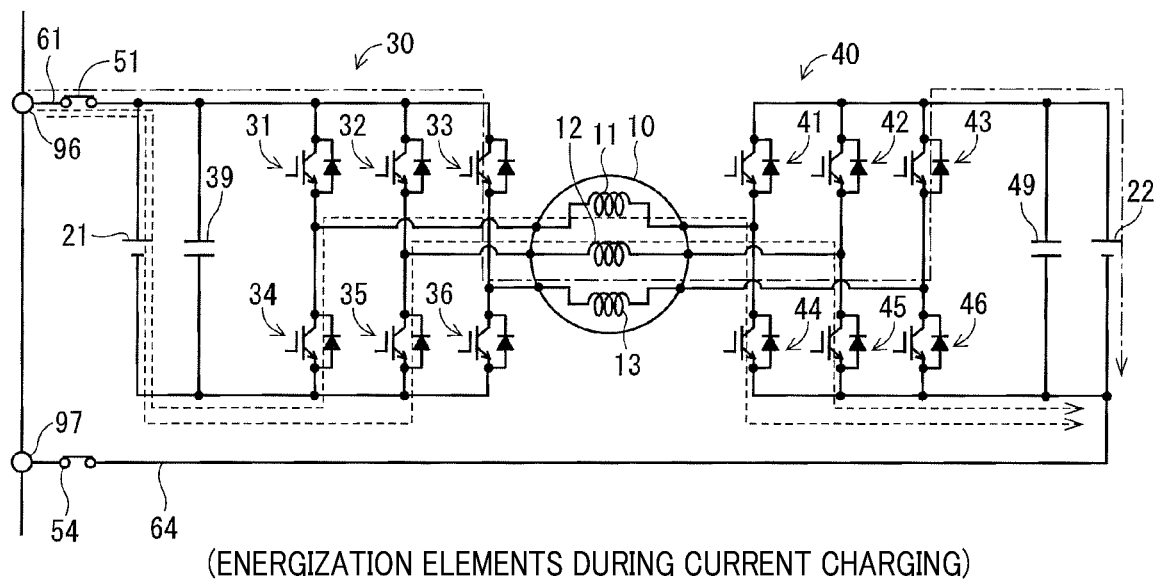

For example, as shown in FIG. 19A, when parallel charging was performed using the upper arm elements 31, 32, 41, and 42 of the U-phase and the V-phase, and the lower arm elements 36 and 46 of the W-phase as the energization elements during the previous charging, as shown in FIG. 19B, at the current charging, the lower arm elements 34, 35, 44, and 45 of the U-phase and V-phase, and the upper arm elements 33 and 34 of the W-phase are selected as the energization elements. In addition, the current energization elements may be selected based on the energization elements used in the most recent parallel charging. That is, for example, when the previous charging was individual charging or serial charging, and parallel charging was not performed, and parallel charging had been performed in the charging before the previous charging, the elements that had not been energized during the parallel charging that had been performed before the previous charging are selected as the energization elements. Moreover, if imbalance in the state of element deterioration is not present, arbitrary elements may be selected as the energization elements. Here, in FIG. 19, the inter power supply connection line 65 and the inter-power-supply switch 55 that do not serve as the energization path during parallel charging are omitted.

Returning to FIG. 17, at S352, the inverter control unit 71 turns on the selected energization elements. At S353, the relay control unit 72 closes (turns on) the switches 51 and 54 (relays 1 and 4), and opens (turns off) the inter-power-supply switch 55 (relay 5). At S354, in a state in which the voltage sources 21 and 22 are connected in parallel, the control unit 70 performs simultaneous charging of the voltage sources 21 and 22.

At S354m, when the switching elements are MOSFETs or the like, and capable of enabling energization from the low potential side to the high potential side through the switch units SW by being turned on, after confirmation of energization, the inverter control unit 71 turns on the elements of which the freewheeling diodes FD serve as the energization path. For example, in the example in FIG. 19A, the inverter control unit 71 turns on the first lower arm element 36, and the second upper arm elements 41 and 42. In addition, for example, in the example in FIG. 19B, the inverter control unit 71 turns on the first lower arm elements 34 and 35, and the second upper arm element 43. Furthermore, if the elements are already turned on, the on-state is maintained.

At S355, in a manner similar to that at S303, the charging control unit 75 determines whether the states of charge of the voltage sources 21 and 22 have reached the target. When determined that the states of charge of the voltage sources 21 and 22 have not reached the target (NO at S355), the control unit 70 returns to S354 and continues parallel charging of the voltage sources 21 and 22. When determined that the states of charge of the voltage sources 21 and 22 have reached the target (YES at S355), the control unit 70 proceeds to S356.

At S356, the relay control unit 72 opens (turns off) the switches 51, 54, and 55 (relays 1, 4, and 5). At S357, the inverter control unit 71 turns off all elements 31 to 36 and 41 to 46 of the inverters 30 and 40 (INV1 and INV2). At S358, the control unit 70 stores the current energization elements in a storage unit or the like (not shown) and ends the parallel charging mode Next, a charging process in a serial charging mode will be described with reference to the flowchart in FIG. 18

At S451, the relay control unit 72 closes (turns on) the switches 51, 54, and 55 (relays 1, 4, and 5). At S452, the control unit 70 performs serial charging of the voltage sources 21 and 22.

The process at S453 is similar to that at S303. The charging control unit 75 determines whether the states of charge of the voltage sources 21 and 22 have reached the target. When determined that the states of charge of the voltage sources 21 and 22 have not reached the target (NO at S453), the control unit 70 returns to S452 and continues serial charging of the voltage sources 21 and 22. When determined that the states of charge of the voltage sources 21 and 22 have reached the target (YES at S453), the control unit 70 proceeds to S454. At S454, the relay control unit 72 opens (turns off) the switches 51, 54, and 55 (relays 1, 4, and 5).

According to the present embodiment, serial charging of the voltage sources 21 and 22 can be performed without charging being performed through the inverters 30 and 40. Therefore, this configuration is suitably applied to cases in which the frequency of use of a charger that has a voltage specification of 1000 V, such as CCS, is high. In addition, when a charger that has a voltage specification of 500 V, such as CHAdeMO, is connected, parallel charging in which the inverters 30 and 40 serve as the energization path can be performed. Therefore, the voltage sources 21 and 22 can be charged with high efficiency in both charging standards. Furthermore, individual charging can also be performed. Consequently, the two voltage sources 21 and 22 can be appropriately charged such that the desired SOCs are achieved.

According to the present embodiment, the switches include the first high-potential-side switch 51 that is the high-potential-side switch, the second high-potential-side switch 54 that is the low-potential-side switch, and the inter-power-supply switch 55. That is, the "switches" according to the present embodiment are three switches. The inter-power-supply switch 55 is provided on the inter power supply connection line 65 that connects the low potential side of the first voltage source 21 and the high potential side of the second voltage source 22. Consequently, charging can be appropriately switched among individual charging, parallel charging, and serial charging of the voltage sources 21 and 22.

When serial charging of the first voltage source 21 and the second voltage source 22 is performed, the control unit 70 closes the high-potential-side switch 51, the low-potential-side switch 54, and the inter-power-supply switch 55. Consequently, serial charging of the voltage sources 21 and 22 can be performed without charging being performed through the MG 10 and the inverters 30 and 40. Charging can be performed with high efficiency by the high-speed charger 100 of which the voltage specification is a voltage that is higher than the sum of the rated voltages of the voltage sources 21 and 22.

Each of the switching elements 31 to 36 and 41 to 46 includes the switch unit SW and the freewheeling diode FD. The switch unit SW is capable of switching between conducting and blocking a current based on a command from the control unit 70. The freewheeling diode FD allows a current to be circulated from the low potential side to the high potential side through the freewheeling diode FD. The first switching elements 31 to 36 include the first upper arm elements 31 to 33 that are connected to the high potential side and the first lower arm elements 34 to 36 that are connected to the low potential side of the first upper arm elements 31 to 33.

When parallel charging of the first voltage source 21 and the second voltage source 22 is performed, the control unit 70 closes the high-potential-side switch 51 and the low-potential-side switch 54, and opens the inter-power-supply switch 55. The control unit 70 also turns on at least the first upper arm element 31, 32, or 33 of one phase, and turns on at least the second lower arm element 44, 45, or 46 of one phase that differs from the phase of which the first upper arm element 31, 32, or 33 is turned on. Consequently, parallel charging of the first voltage source 21 and the second voltage source 22 can be performed with the MG 10 and the inverters 30 and 40 serving as the power paths. Charging can be appropriately performed by the high-speed charger 100 of which the voltage specification is a voltage that is lower than the sum of the rated voltages of the voltage sources 21 and 22.

When individual charging of the first voltage source 21 is performed, the control unit 70 closes the high-potential-side switch 51 and the low-potential-side switch 54, and opens the inter-power-supply switch 55. The control unit 70 also turns on at least the second lower arm element 44, 45, or 46 of one phase. In addition, when individual charging of the second voltage source 22 is performed, the control unit 70 closes the high-potential-side switch 51 and the low-potential-side switch 54, and opens the inter-power-supply switch 55. The control unit 70 also turns on at least the first upper arm element 31, 32 or 33 of one phase. Consequently, individual charging of the first voltage source 21 or the second voltage source 22 can be performed with the MG 10 and the inverters 30 and 40 serving as the power paths. Furthermore, effects similar to those according to the above-described embodiment are achieved.

Third Embodiment

Figure 20:
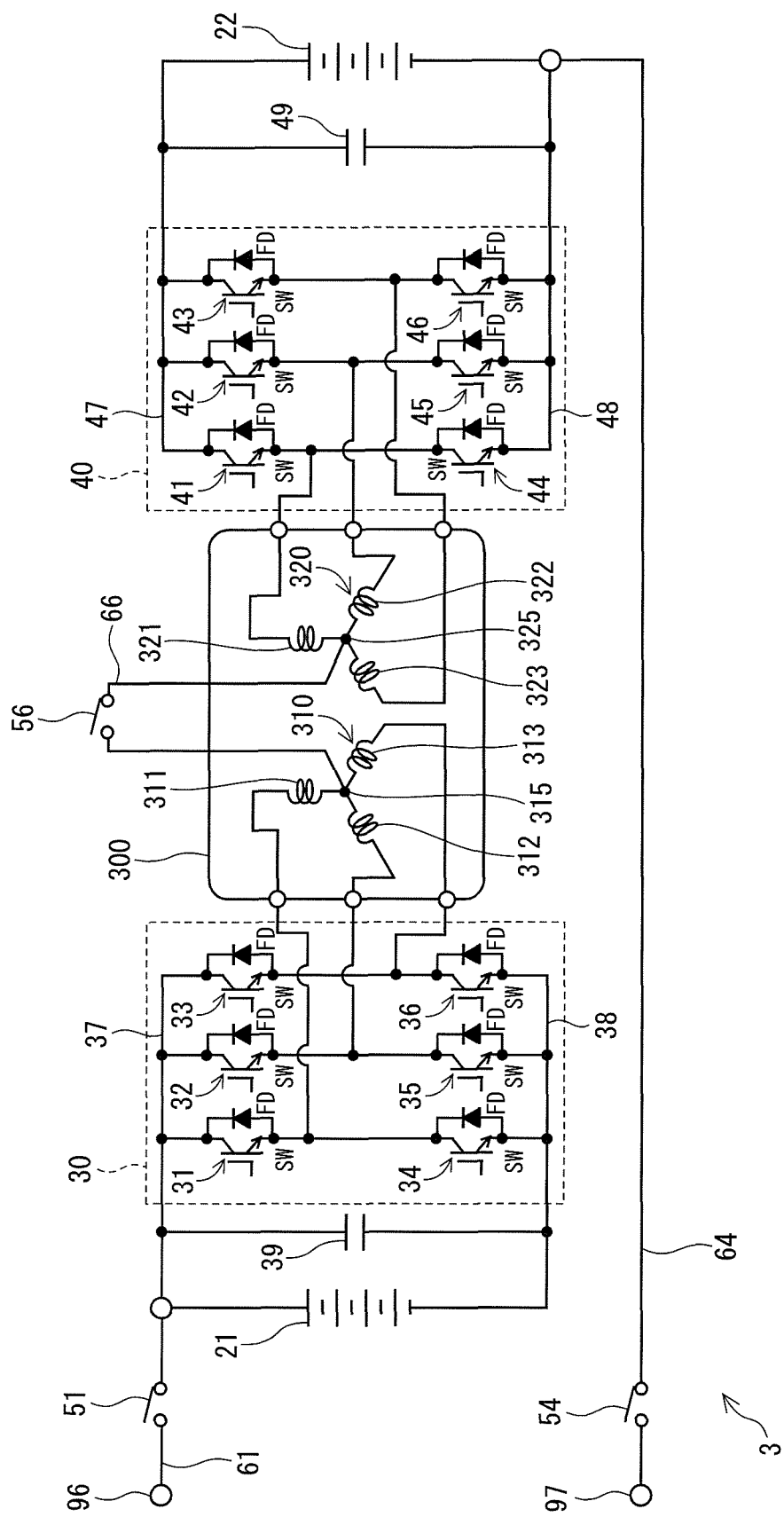
FIG. 20 is a circuit diagram of a charging system according to a third embodiment.

A third embodiment is shown in FIG. 20 to FIG. 24. As shown in FIG. 20, a charging system 3 according to the present embodiment includes a motor generator 300, the voltage sources 21 and 22, the inverters 30 and 40, the first high-potential-side switch 51, the second low-potential-side switch 54, an inter-coil switch 56, the first high-potential-side power supply line 61, the second low-potential-side power supply line 64, an inter coil connection line 66, the control unit 70, and the like. In FIG. 20, the control unit 70, the high-speed charger 100, and the like are omitted. In addition, the labelling of SMR is also omitted. However, in a manner similar to that according to the above-described embodiments, the SMRs may be provided on both sides of the voltage sources 21 and 22. This similarly applies to FIG. 25, FIG. 29, FIG. 31, and FIG. 33 according to the embodiments described hereafter.

In the MG 10 according to the above-described embodiments, the coils 11 to 13 are open windings. The first inverter 30 and the second inverter 40 are connected to both ends of the coils 11 to 13. The MG 300 according to the present embodiment includes two coil groups 310 and 320 that are independently connected.

The first coil group 310 includes a U1 coil 311, a V1 coil 312, and a W1 coil 313. A first end of the U1 coil 311 is connected to a connection point between the switching elements 31 and 34 of the first inverter 30. A first end of the V1 coil 312 is connected to a connection point between the switching elements 32 and 35. A first end of the W1 coil 313 is connected to a connection point between the switching elements 33 and 36. Second ends of the coils 311 to 313 are connected by a connecting portion 315.

The second coil group 320 includes a U2 coil 321, a V2 coil 322, and a W2 coil 323. A first end of the U2 coil 321 is connected to a connection point between the switching elements 41 and 44 of the second inverter 40. A first end of the V2 coil 322 is connected to a connection point between the switching elements 42 and 45. A first end of the W2 coil 323 is connected to a connection point between the switching elements 43 and 46. Second ends of the coils 321 to 323 are connected by a connecting portion 325. The coil groups 310 and 320 according to the present embodiment are each connected by a star connection. However, the method of connection may differ.

Electric power from the first voltage source 21 is supplied to the first coil group 310 through the first inverter 30. Electric power from the second voltage source 22 is supplied to the second coil group 320 through the second inverter 40. The inter coil connection line 66 connects the connecting portions 315 and 325. The inter coil connection line 66 is provided with the inter-coil switch 56. Single-side Individual charging and dual-side simultaneous charging of the voltage sources 21 and 22 can be performed through the high-speed charger 100 by the inter-coil switch 56 being closed, and the MG 300 and the inverters 30 and 40 being used as the power path. Here, when the MG 300 is driven, the inter-coil switch 56 is open.

Specifically, when individual charging of the first voltage source 21 is performed, the control unit 70 closes the switches 51, 54, and 55. As a result, the energization path is configured by the first high-potential-side switch 51, the first voltage source 21, the first lower arm elements 34 to 36, the first coil group 310, the switch 56, the second coil group 320, the second lower arm elements 44 to 46, and the switch 54. At this time, in the first lower arm elements 34 to 36, the IGBTs of the switch units SW are preferably turned off and the freewheeling diodes FD are preferably energized to prevent a current from being circulated inside the first inverter 30. In addition, the IGBTs of the switch units SW of the second lower arm elements 44 to 46 are made conductive such that a current is not sent to the second voltage source 22. At this time, the second lower arm elements 44 to 46 of all three phases are preferably turned on.

When individual charging of the second voltage source 22 is performed, the control unit 70 closes the switches 51, 54, and 56. As a result, the energization path is configured by the switch 51, the first upper arm elements 31 to 33, the first coil group 310, the switch 56, the second coil group 320, the second upper arm elements 41 to 43, the second voltage source 22, and the switch 54. At this time, the IGBTs of the switch units SW of the first upper arm elements 31 to 33 are made conductive such that a current is not sent to the first voltage source 21. The first upper arm elements 31 to 33 of all phases are preferably turned on. In addition, in the second upper arm elements 41 to 43, the IGBTs of the switch units SW are preferably turned off and the freewheeling diodes FD are preferably energized to prevent a current from being circulated inside the second inverter 40.

When simultaneous charging of the voltage sources 21 and 22 is performed, the control unit 70 closes the switches 51, 54, and 56. The control unit 70 performs serial charging of the voltage sources 21 and 22 with the switch 51, the first voltage source 21, the first lower arm elements 34 to 36, the first coil group 310, the switch 56, the second upper arm elements 41 to 43, the second voltage source 22, and the switch 54 serving as the energization path. In the first lower arm elements 34 to 36 and the second upper arm elements 41 to 43, because the freewheeling diodes FD are made conductive, the IGBTs of the switch units SW are turned off.

Here, for example, when the MOSFETs are used as the switching elements, synchronous rectification may be performed by the elements of which the freewheeling diodes FD are energized being turned on. This similarly applies to embodiments described hereafter. Details of synchronous rectification control are similar to those at S403m in FIG. 9. Therefore, steps related to synchronous rectification are omitted from the flowchart in FIG. 22 and the like.

Figure 21:
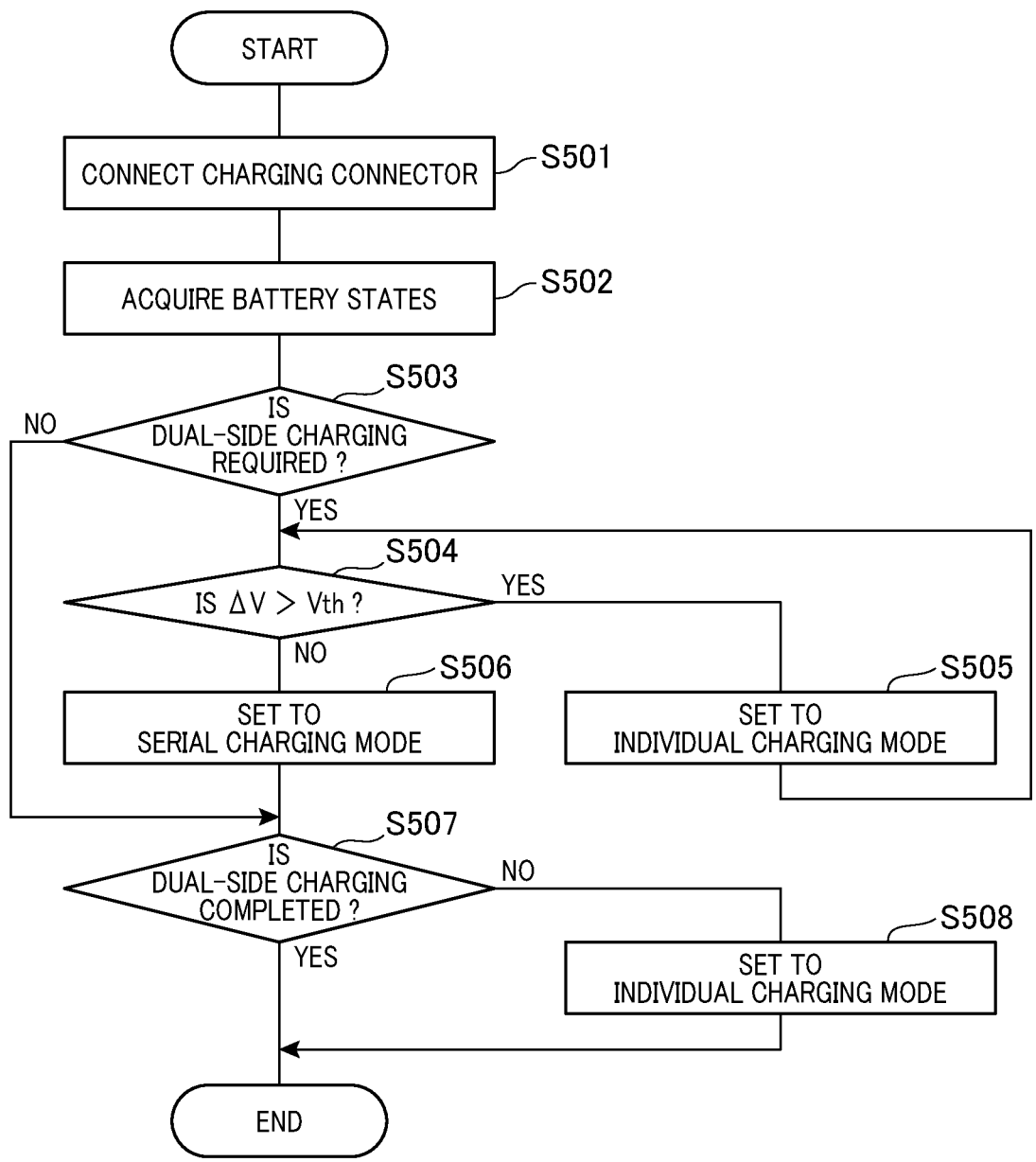
FIG. 21 is a flowchart of a charging control process in the charging system according to the third embodiment.

FIG. 21 is a flowchart of a charging control process according to the present embodiment.

The processes at S501 to S504 are similar to those at S101 to S104 in FIG. 6. When determined YES at S504, that is, the potential difference ΔV is greater than the potential difference determination threshold Vth, the control unit 70 proceeds to S505. The control unit 70 sets the charging mode to individual charging mode and returns to S504. When determined NO at S504, that is, the potential difference ΔV is equal to or less than the potential difference determination threshold Vth, the control unit 70 proceeds to S506. The control unit 70 sets the charging mode to serial charging mode. When determined that charging of at least either of the voltage sources 21 and 22 is completed, the control unit 70 ends serial charging and proceeds to S507. The processes at S507 and S508 are similar to those at S109 and S110 in FIG. 6.

Figure 22:
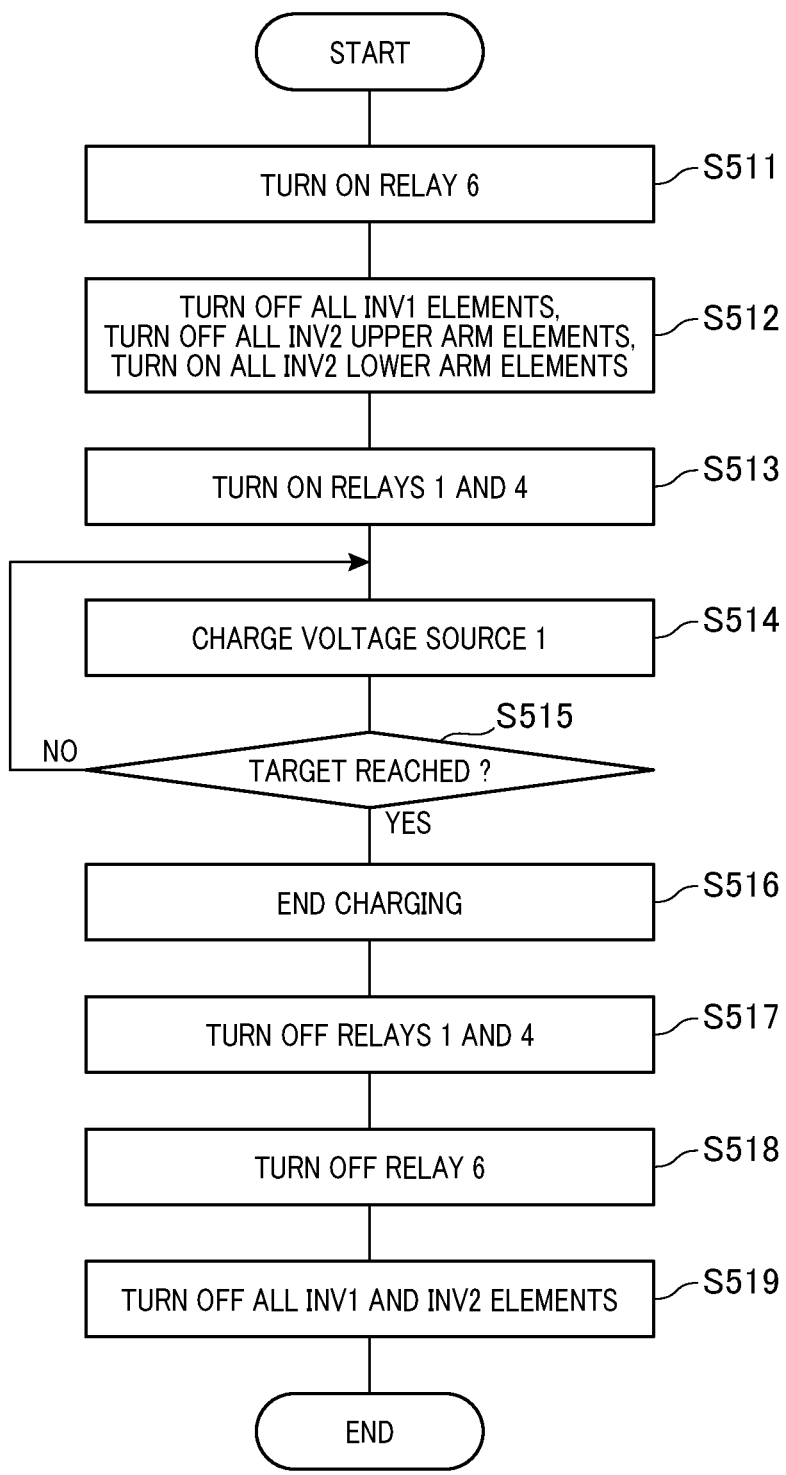
FIG. 22 is a flowchart of an individual charging process for a first voltage source in the charging system according to the third embodiment.

FIG. 22 is a flowchart of an individual charging process for the first voltage source 21 in the individual charging mode. In the flowchart in FIG. 11, the switch 56 is denoted by "relay 6".

At S511, the relay control unit 72 closes (turns on) the switch 56 (relay 6). At S512, the inverter control unit 71 turns off all elements 31 to 36 of the first inverter (INV1) and the second upper arm elements 41 to 43 of the second inverter 40 (INV2), and turns on the second lower arm elements 44 to 46 of the second inverter 40 (INV2). At S513, the relay control unit 72 closes (turns on) the switches 51 and 54 (relays 1 and 4). At S514, the control unit 70 performs individual charging of the first voltage source 21 (voltage source 1).

The process at S515 is similar to that at S204 in FIG. 7. When determined that the charging state of the first voltage source 21 has not reached the target (NO at S515), the control unit 70 returns to S514 and continues individual charging of the first voltage source 21. When determined that the charging state of the first voltage source 21 has reached the target (YES at S515), the control unit 70 proceeds to S516 and ends the individual charging mode of the first voltage source 21. Here, in the individual charging mode at S505, the control unit 70 performs the determination based on the potential difference ΔV. In the individual charging mode at S508, the control unit 70 performs the determination based on the SOC. This similarly applies to S525.

At S517, the relay control unit 72 opens (turns off) the switches 51 and 54 (relays 1 and 4). At S518, the relay control unit 72 opens (turns off) the switch 56 (relay 6). At S519, the inverter control unit 71 turns off all elements 31 to 36 and 41 to 46 of the inverters 30 and 40 (INV1 and INV2).

Figure 23:
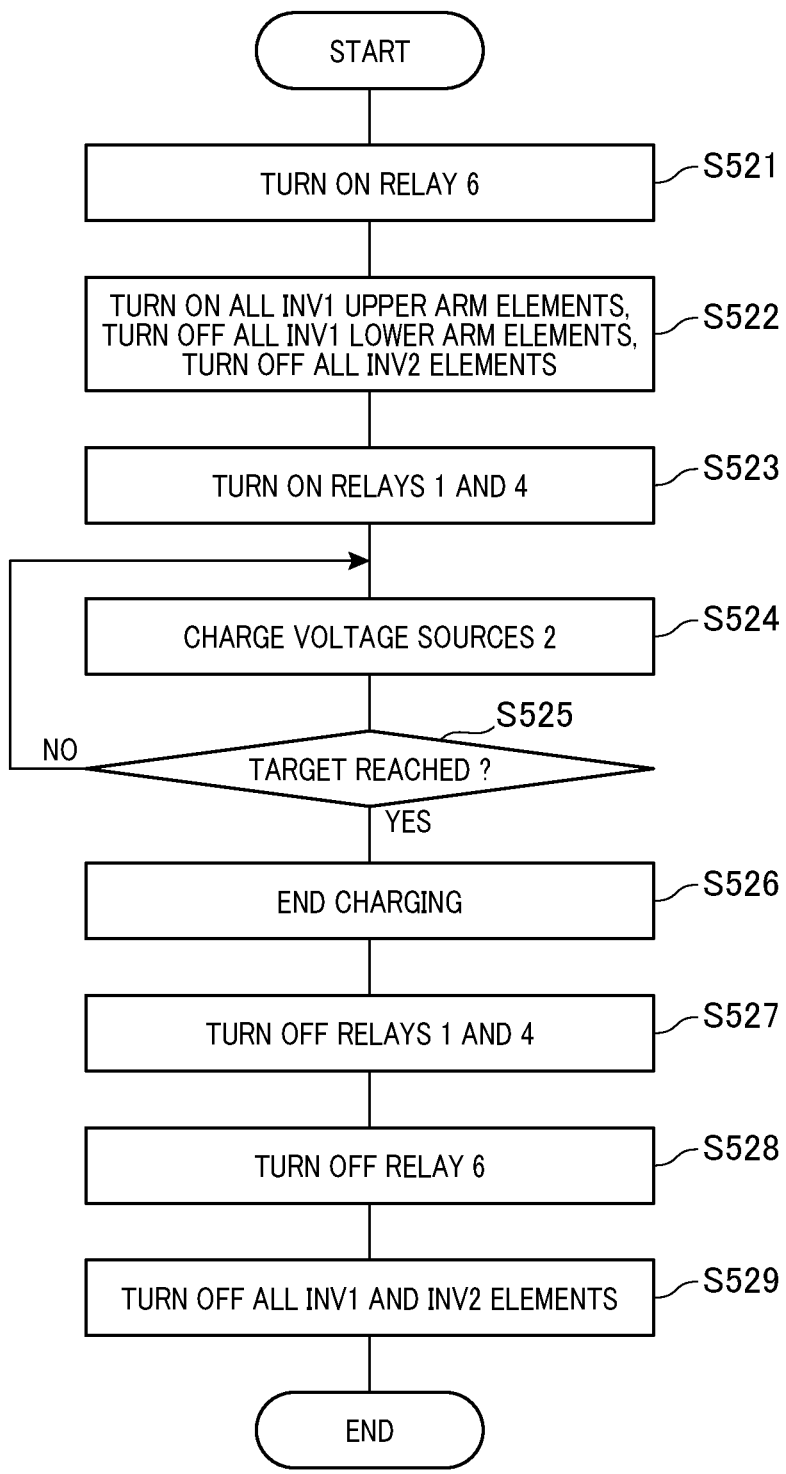
FIG. 23 is a flowchart of an individual charging process for a second voltage source in the charging system according to the third embodiment.

FIG. 23 is a flowchart of an individual charging process for the second voltage source 22 in the individual charging mode.

The process at S521 is similar to that at S511 in FIG. 22. At S512, the inverter control unit 71 turns on the first upper arm elements 31 to 33 of the first inverter 30 (INV1), and turns off the first lower arm elements 34 to 36 of the first inverter 30 (INV1) and all elements 41 to 46 of the second inverter 40 (INV2). The process at S523 is similar to that at S513 in FIG. 22. At S524, the control unit 70 performs individual charging of the second voltage source 22 (voltage source 2).

The process at S525 is similar to that at S207 in FIG. 7. When determined that the charging state of the second voltage source 22 has not reached the target (NO at S525), the control unit 70 returns to S524 and continues individual charging of the second voltage source 22. When determined that the charging state of the second voltage source 22 has reached the target (YES at S525), the control unit 70 proceeds to 5S26 and ends charging. The processes at S527 to S529 are similar to those at S517 to S519 in FIG. 22.

Figure 24:
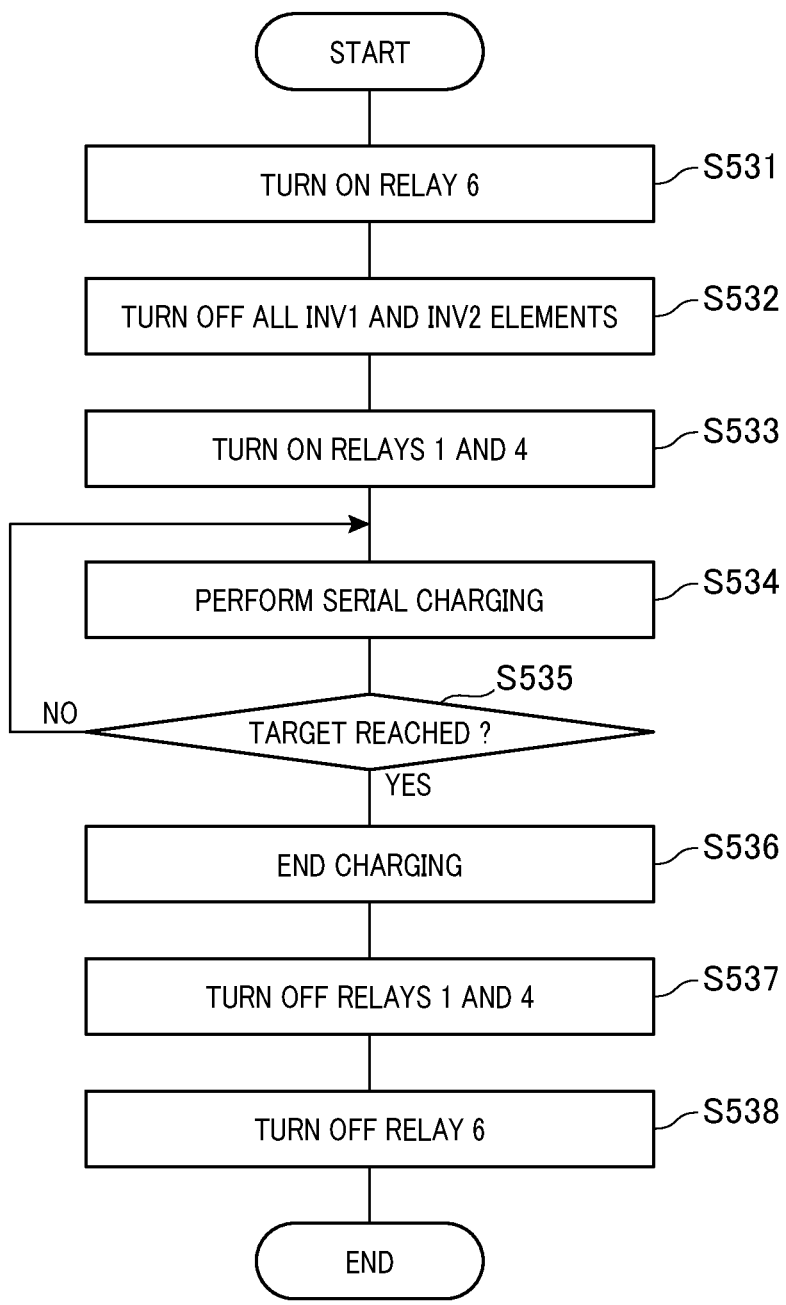
FIG. 24 is a flowchart of a serial charging process in the charging system according to the third embodiment.

FIG. 24 is a flowchart of a serial charging process.

The process at S531 is similar to that at S511 in FIG. 22. At S532, the inverter control unit 71 turns off all elements 31 to 36 and 41 to 46 of the inverters 30 and 40 (INV1 and INV2). The process at S533 is similar to that at S513 in FIG. 22.

At S534, the control unit 70 simultaneously charges the voltage sources 21 and 22 by serial charging. At 5S35, in a manner similar to that at S303 in FIG. 8, the charging control unit 75 determines whether the states of charge of the voltage sources 21 and 22 have reached the target. When determined that the states of charge of the voltage sources 21 and 22 have not reached the target (NO at S535), the control unit 70 returns to S534 and continues serial charging. When determined that the states of charge of the voltage sources 21 and 22 have reached the target (YES at S535), the control unit 70 proceeds to S536 and ends serial charging. The processes at S537 and S538 are similar to those at S517 and S518 in FIG. 22.

According to the present embodiment, the coil groups include the first coil group 310 that is connected to the first voltage source 21 with the first inverter 30 therebetween, and the second coil group 320 that is connected to the second voltage source 22 with the second inverter 40 therebetween. According to the present embodiment, the switches include the first high-potential-side switch 51, the second low-potential-side switch 54, and the inter-coil switch 56. The inter-coil switch 56 is provided on the inter coil connection line 66 that connects the connecting portion 315 of the first coil group 310 and the connecting portion 325 of the second coil group 320.

When individual charging of the first voltage source 21 is performed, the control unit 70 closes the first high-potential-side switch 51, the second low-potential-side switch 54, and the inter-coil switch 56, and turns on at least the second lower arm element 44, 45, or 46 of one phase. When individual charging of the second voltage source 22 is performed, the control unit 70 closes the first high-potential-side switch 51, the second low-potential-side switch 54, and the inter-coil switch 56, and turns on at least the first upper arm element 31, 32, or 33 of one phase. In addition, when serial charging of the first voltage source 21 and the second voltage source 22 is performed, the control unit 70 closes the first high-potential-side switch 51, the second low-potential-side switch 54, and the inter-coil switch 56. As a result, even in a configuration in which the coil groups 310 and 320 are independently provided for the voltage sources 21 and 22, charging can be appropriately switched between individual charging and simultaneous charging of the voltage sources 21 and 22. In addition, effects similar to those according to the above-described embodiments are achieved.

Fourth Embodiment

Figure 25:
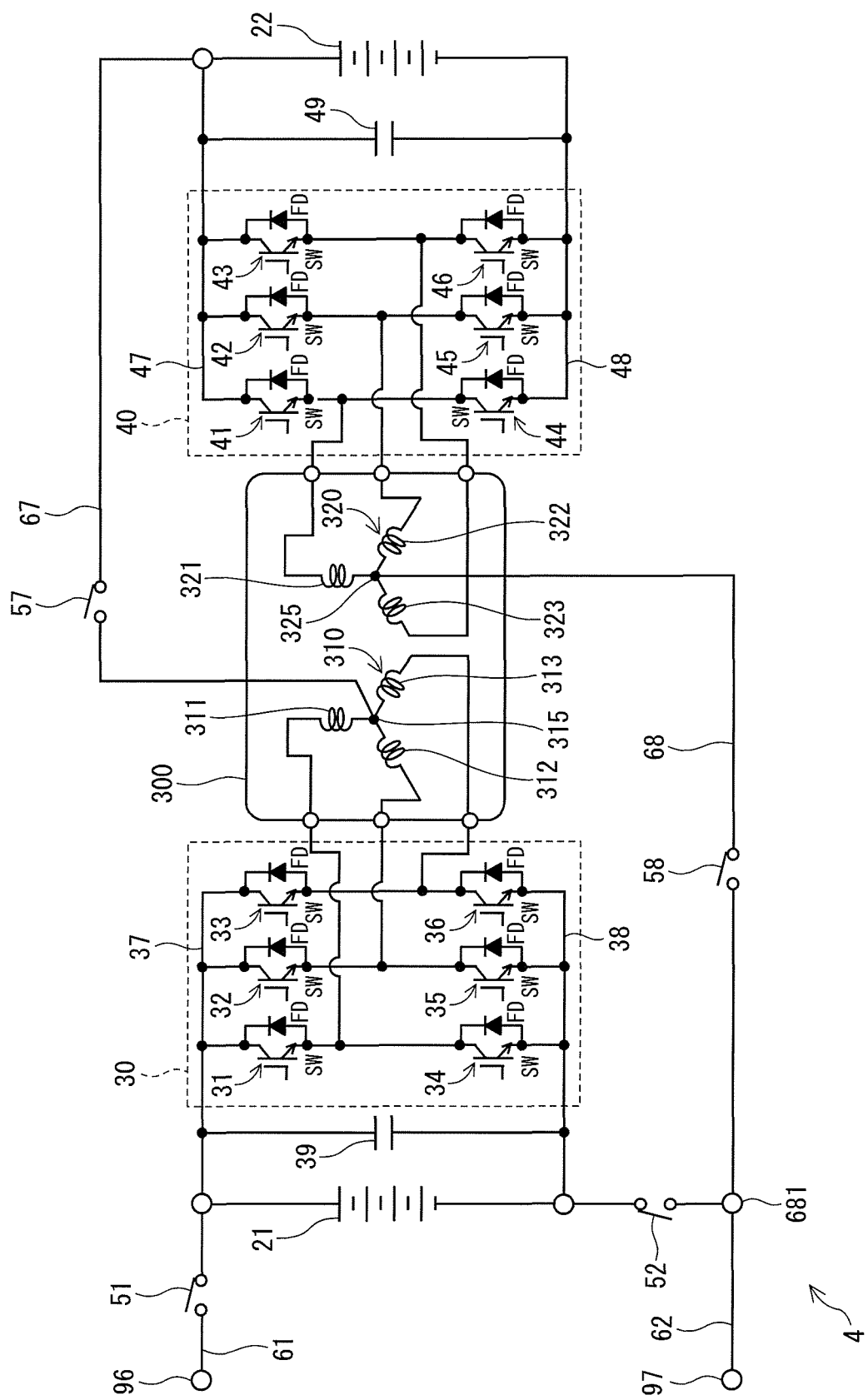
FIG. 25 is a circuit diagram of a charging system according to a fourth embodiment.

A fourth embodiment is shown in FIG. 25 to FIG. 28. As shown in FIG. 25, a charging system 4 according to the present embodiment includes the motor generator 300, the voltage sources 21 and 22, the inverters 30 and 40, the first high-potential-side switch 51, the first low-potential-side switch 52, inter-circuit switches 57 and 58, the first high-potential-side power supply line 61, the first low-potential-side power supply line 62, inter-circuit connection lines 67 and 68, the control unit 70, and the like.

The high-potential-side inter-circuit connection line 67 connects the connecting portion 315 of the first coil group 310 and a terminal 671. The terminal 671 is provided on the second high-potential-side wiring 47 in a portion that is further towards the second voltage source 22 side than a connecting portion of a capacitor 49. The high-potential-side inter-circuit connection line 67 is provided with the high-potential-side inter-circuit switch 57. The first coil group 310 and the second high-potential-side wiring 47 are connected by the control unit 70 closing the switch 57.

The low-potential-side inter-circuit connection line 68 connects the connecting portion 325 of the second coil group 320 and a terminal 681. The terminal 681 is provided between the switch 52 and the low-potential-side external connection terminal 97. The low-potential-side inter-circuit connection line 68 is provided with the low-potential-side inter-circuit switch 58. The second coil group 320 and the first low-potential-side wiring 38 are connected by the control unit 70 closing the switches 52 and 58.

According to the present embodiment, individual charging and simultaneous charging of the voltage sources 21 and 22 can be performed through the high-speed charger 100 by the control unit 70 controlling the switches 51, 52, 57, 58, and the inverters 30 and 40. Specifically, when individual charging of the first voltage source 21 is performed, the control unit 70 can perform individual charging of the first voltage source 21 without using the MG 300 and the inverters 30 and 40 as the power path, by closing the switches 51 and 52. Consequently, when individual charging of the first voltage source 21 is performed, occurrence of loss that is generated as a result of the MG 300 and the inverters 30 and 40 being used as the power path can be prevented.

When individual charging of the second voltage source 22 is performed, the control unit 70 closes the switches 51, 57, and 58, and sets the switch 51, the first upper arm elements 31 to 33, the first coil group 310, the switch 57, the second voltage source 22, the second lower arm elements 44 to 46, the second coil group 320, and the switch 58 as the energization path. At this time, the first upper arm elements 31 to 33 are made conductive such that a current is not sent to the first voltage source 21. The first upper arm elements 31 to 33 of all three phases are preferably turned on. In addition, in the second lower arm elements 44 to 46, the IGBTs of the switch units SW are turned off and the freewheeling diodes FD are energized.

When simultaneous charging of the voltage sources 21 and 22 is performed, the control unit 70 performs serial charging of the voltage sources 21 and 22 by closing the switches 51, 57, and 58, and setting the switch 51, the first voltage source 21, the first lower arm elements 34 to 36, the first coil group 310, the switch 57, the second voltage source 22, the second lower arm elements 44 to 46, the second coil group 320, and the switch 58 as the energization path. In the first lower arm elements 34 to 36, and the second upper arm elements 41 to 43, because the freewheeling diodes FD are made conductive, the IGBTs of the switch units SW are turned off.

Figure 26:
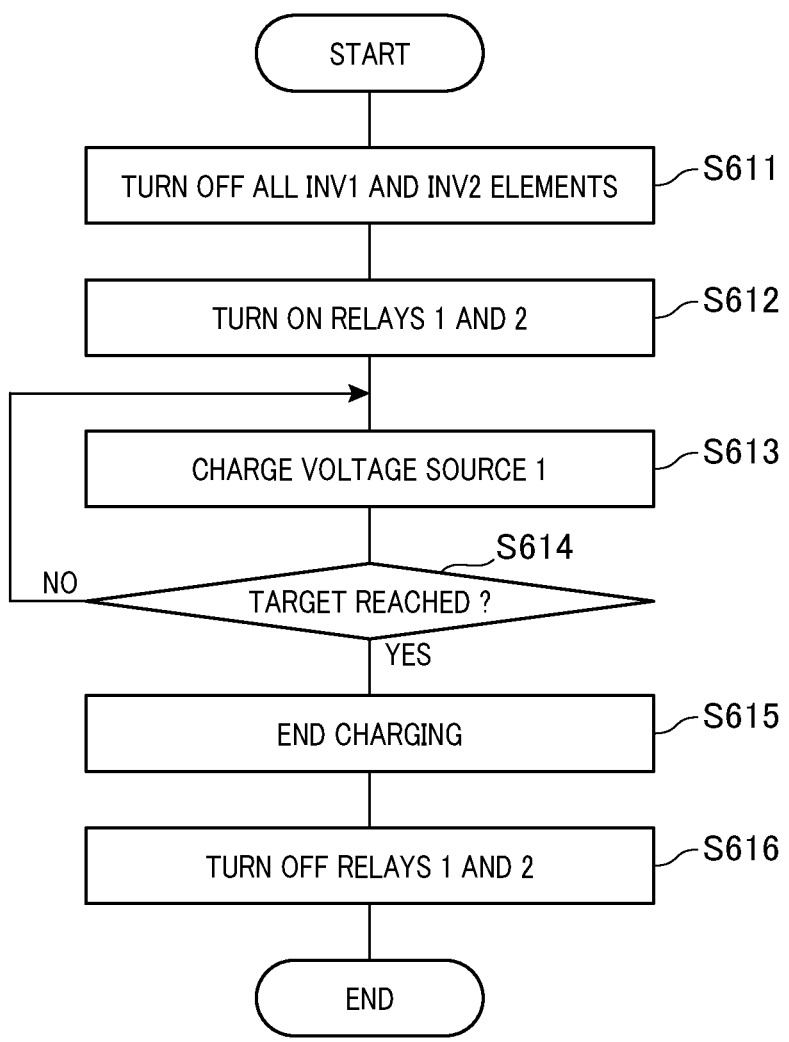
FIG. 26 is a flowchart of an individual charging process for a first voltage source in the charging system according to the fourth embodiment.

FIG. 26 is a flowchart of an individual charging process for the first voltage source 21 in the individual charging mode. In the flowchart in FIG. 26, the switch 57 is denoted by "relay 7", and the switch 58 is denoted by "relay 8".

At S611, the inverter control unit 71 turns off all elements 31 to 36 and 41 to 46 of the inverters 30 and 40 (INV1 and INV2). At S612, the relay control unit 72 closes (turns on) the switches 51 and 52 (relays 1 and 2). The processes at S613 to S615 are similar to those at S514 to S516 in FIG. 22. At S616, the relay control unit 72 opens (turns off) the switches 51 and 52 (relays 1 and 2).

Figure 27:
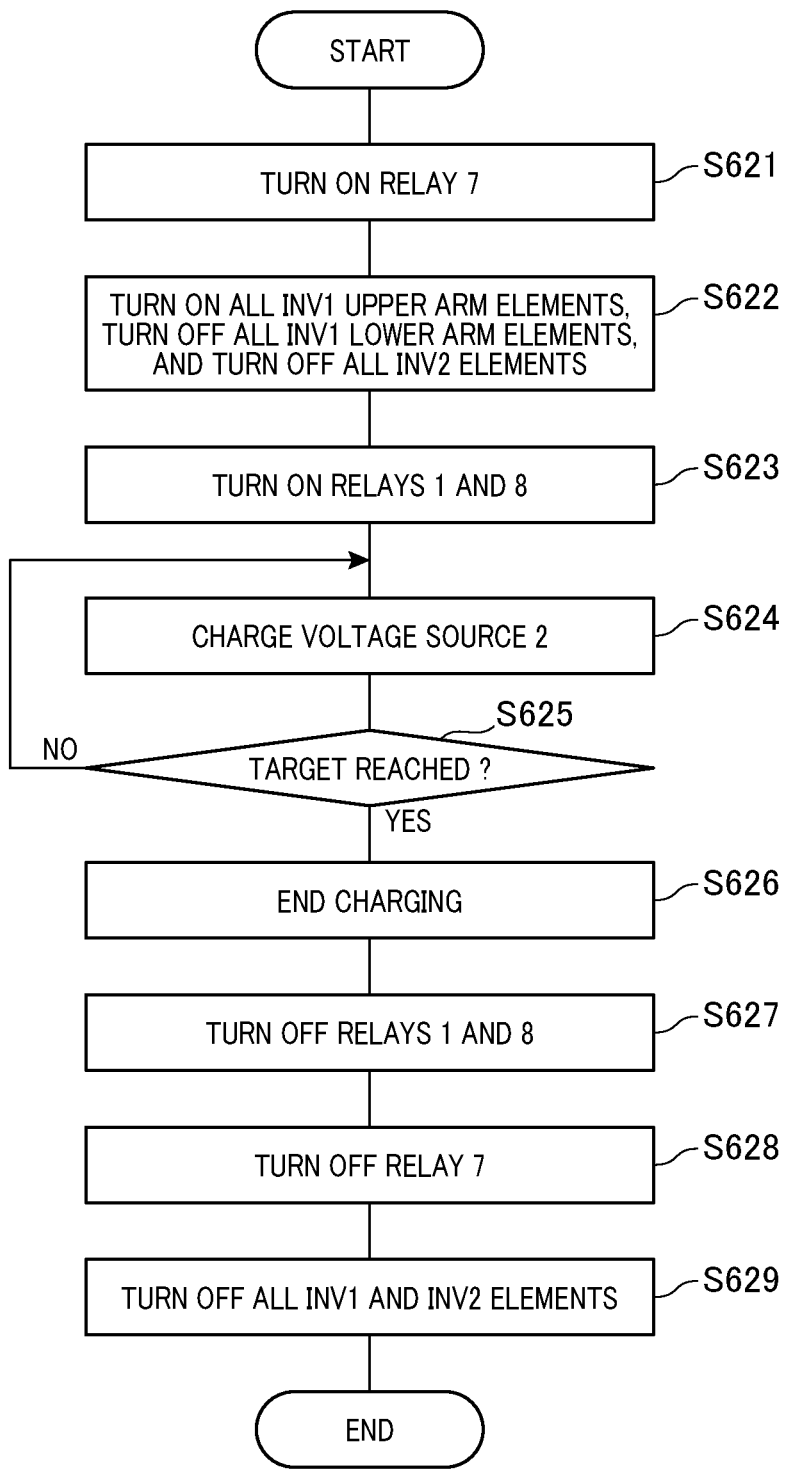
FIG. 27 is a flowchart of an individual charging process for a second voltage source in the charging system according to the fourth embodiment.

FIG. 27 is a flowchart of an individual charging process for the second voltage source 22 in the individual charging mode.

At S621, the relay control unit 72 closes (turns on) the switch 57 (relay 7). At S622, the inverter control unit 71 turns on the first upper arm elements 31 to 33 of the first inverter 30 (INV1), and turns off the first lower arm elements 34 to 36 of the first inverter 30 (INV1) and all elements 41 to 46 of the second inverter 40 (INV2). At S623, the relay control unit 72 closes (turns on) the switches 51 and 58 (relays 5 and 8).

The processes at S624 to S626 are similar to those at S522 to S526 in FIG. 23. At S627, the relay control unit 72 opens (turns off) the switches 51 and 58 (relays 1 and 8). At S628, the relay control unit 72 opens (turns off) the switch 57 (relay 7). At S629, in a manner similar to that at S529, the inverter control unit 71 turns off all elements 31 to 36 and 41 to 46 of the inverters 30 and 40 (INV1 and INV2).

Figure 28:
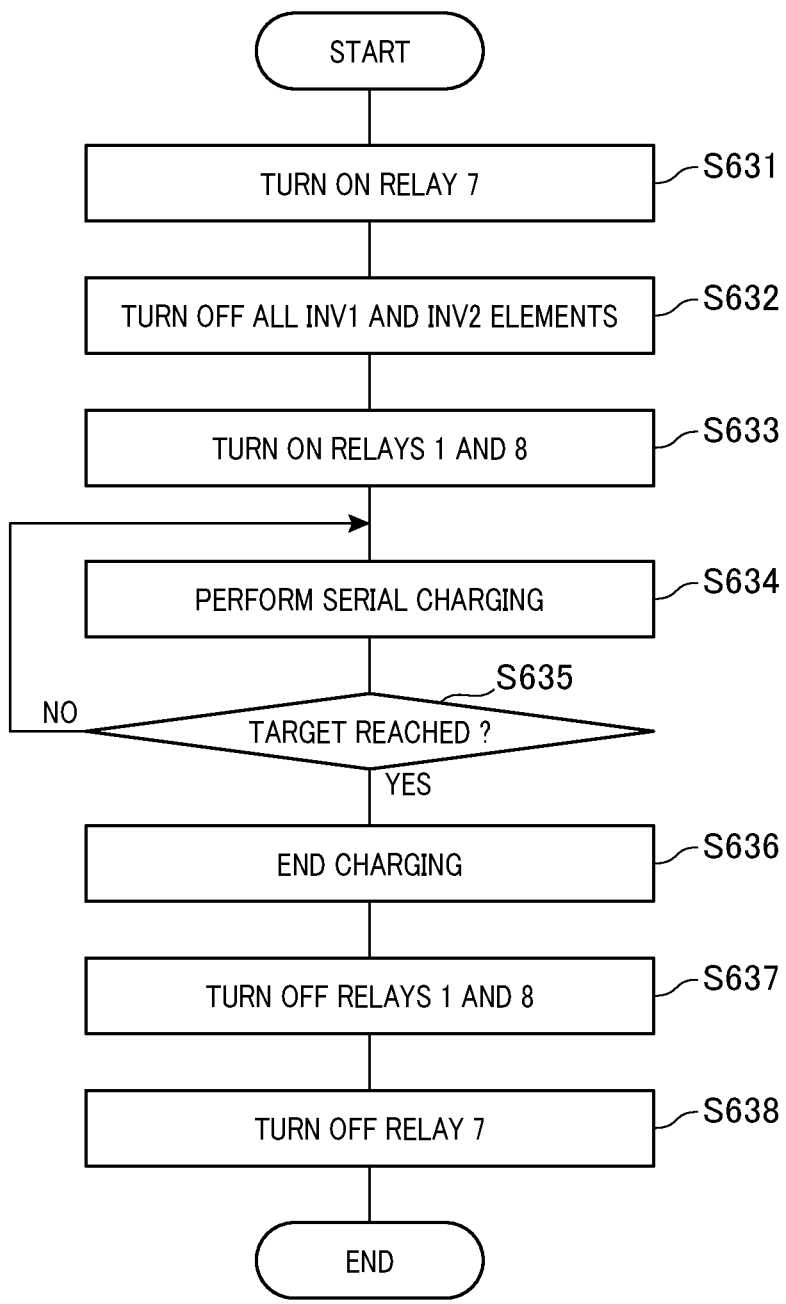
FIG. 28 is a flowchart of a serial charging process in the charging system according to the fourth embodiment.

FIG. 28 is a flowchart of a serial charging process.

The process at S631 is similar to that at S621 in FIG. 27. At S632, the inverter control unit 71 turns off all elements 31 to 36 and 41 to 46 of the inverters 30 and 40. The process at S633 is similar to that at S623 in FIG. 27. The processes at S634 to S638 are similar to those at S534 to S538 in FIG. 24.

According to the present embodiment, the switches include the first high-potential-side switch 51, the first low-potential-side switch 52, and the switches 57 and 58. The high-potential-side inter-circuit switch 57 is provided on the high-potential-side inter-circuit connection line 67 that connects the connecting portion 315 of the first coil group 310 and the high potential side of the second voltage source 22. The low-potential-side inter-circuit switch 58 is provided on the low-potential-side inter-circuit connection line 68. The low-potential-side inter-circuit connection line 68 connects the connecting portion 325 of the second coil group 320 and a portion on the low-potential-side power supply line 62 that is further towards the low-potential-side external connection terminal 96 side than the low-potential-side switch 52.

When individual charging of the first voltage source 21 is performed, the control unit 70 closes the switches 51 and 52, and opens the switches 57 and 58. When individual charging of the second voltage source 22 is performed, the control unit 70 closes the switches 51, 57, and 58, opens the switch 52, and turns on at least the first upper arm element 31, 32, or 33 of one phase. When serial charging of the first voltage source 21 and the second voltage source 22 is performed, the control unit 70 closes the switches 51, 57, and 58, and opens the switch 52. Consequently, even in a configuration in which the coil groups 310 and 320 are independently provided for the voltage sources 21 and 22, charging can be appropriately switched between individual charging and simultaneous charging of the voltage sources 21 and 22. In addition, effects similar to those according to the above-described embodiments are achieved.

Fifth Embodiment

Figure 29:
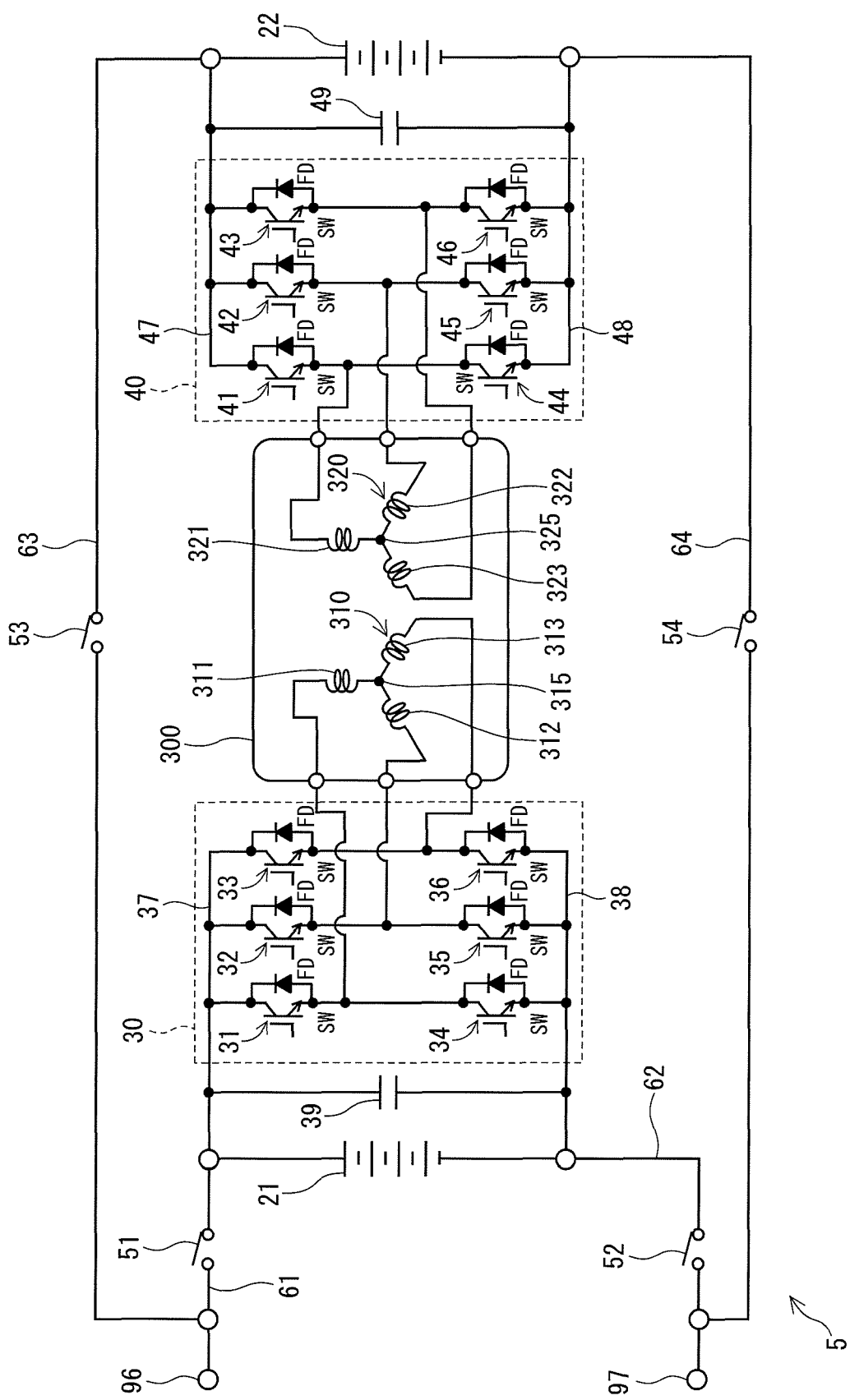
FIG. 29 is a circuit diagram of a charging system according to a fifth embodiment.
Figure 30:
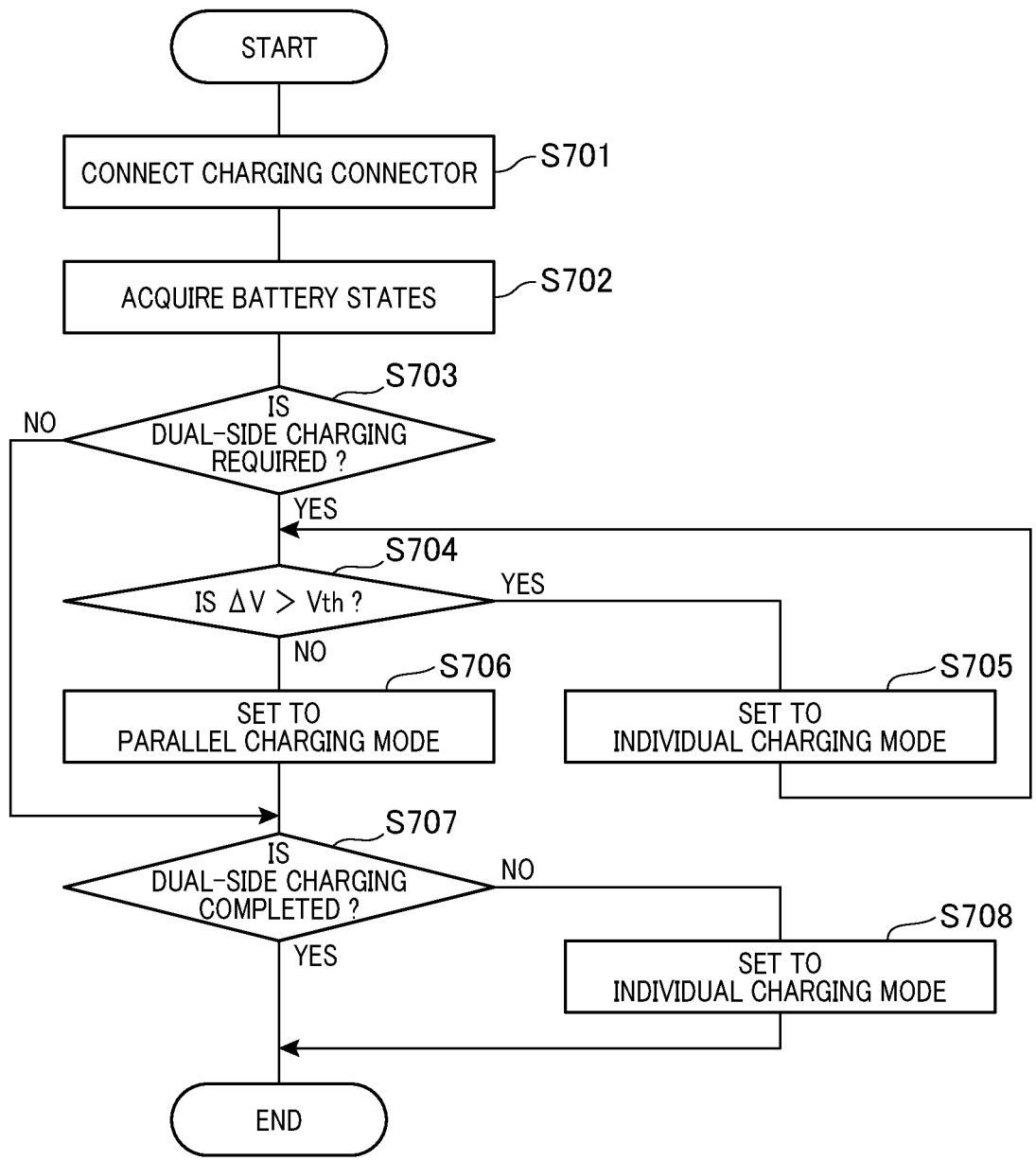
FIG. 30 is a flowchart of a charging control process in the charging system according to the fifth embodiment.

A fifth embodiment is shown in FIG. 29 and FIG. 30. As shown in FIG. 29, a charging system 5 according to the present embodiment includes the motor generator 300, the first voltage source 21, the second voltage source 22, the first inverter 30, the second inverter 40, the high-potential-side switches 51 and 53, the low-potential-side switches 52 and 54, the high-potential-side power supply lines 61 and 63, the low-potential-side power supply lines 62 and 64, the control unit 70, and the like.

According to the present embodiment, single-side individual charging and dual-side simultaneous charging of the voltage sources 21 and 22 can be performed by the control unit 70 operating the opening and closing of the four switches 51 to 54. According to the present embodiment, dual-side simultaneous charging is parallel charging.

A charging control process according to the present embodiment will be described with reference to a flowchart in FIG. 30.

The processes at S701 to S704 are similar to those at S101 to S104 in FIG. 6. Here, according to the present embodiment, the MG 300 and the inverters 30 and 40 are not used as the power path during charging. Therefore, the potential difference determination threshold Vth is preferably set to substantially zero to prevent instantaneous short-circuit overcurrent in the circuit caused by a potential difference between the voltage sources 21 and 22. When determined that the potential difference ΔV is greater than the potential difference determination threshold Vth (YES at S704), the control unit 70 proceeds to S705. When determined that the potential difference ΔV is equal to or less than the potential difference determination threshold Vth (NO at S704), the control unit 70 proceeds to S706.

At S705, the charging control unit 75 sets the charging mode to the individual charging mode. Here, individual charging of the voltage source 21 or 22 that has the lower voltage is performed. In the individual charging mode, when the first voltage source 21 is charged, the relay control unit 72 closes the switches 51 and 52, and opens the switches 53 and 54. In addition, in the individual charging mode, when the second voltage source 2 is charged, the relay control unit 72 closes the switches 53 and 54, and opens the switches 51 and 52. Then, the control unit 70 returns to S704 and continues the individual charging mode until the potential difference ΔV becomes equal to or less than the potential difference determination threshold Vth.

At S706, the charging control unit 75 sets the charging mode to the parallel charging mode. In the parallel charging mode, the switches 51 to 54 are closed. When determined that charging of at least either of the voltage sources 21 and 22 is completed, the control unit 70 ends parallel charging and proceeds to S707. The processes at S707 and S708 are similar to those at S109 and S110 in FIG. 6.

According to the present embodiment, the high-potential-side power supply lines include the first high-potential-side power supply line 61 and the second high-potential-side power supply line 63. The low-potential-side power supply lines include the first low-potential-side power supply line 62 and the second low-potential-side power supply line 64. In addition, the high-potential-side switches include the first high-potential-side switch 51 and the second high-potential-side switch 53. The low-potential-side switches include the first low-potential-side switch 52 and the second low-potential-side switch 54.

When individual charging of the first voltage source 21 is performed, the control unit 70 closes the switches 51 and 52, and opens the switches 53 and 54. When individual charging of the second voltage source 22 is performed, the control unit 70 opens the switches 51 and 52 and closes the switches 52 and 54. When parallel charging of the first voltage source 21 and the second voltage source 22 is performed, the control unit 70 closes the switches 51 to 54.

Consequently, even in a configuration in which the coil groups 310 and 320 are independently provided for the voltage sources 21 and 22, charging can be appropriately switched between individual charging and simultaneous charging of the voltage sources 21 and 22. According to the present embodiment, when the voltage sources 21 and 22 are charged, the inverters 30 and 40 and the MG 300 are not used as the power path. Therefore, the voltage sources 21 and 22 can be charged without the occurrence of loss in the inverters 30 and 40 and the MG 300. In addition, effects similar to those according to the above-described embodiments are achieved.

Sixth Embodiment

Figure 31:
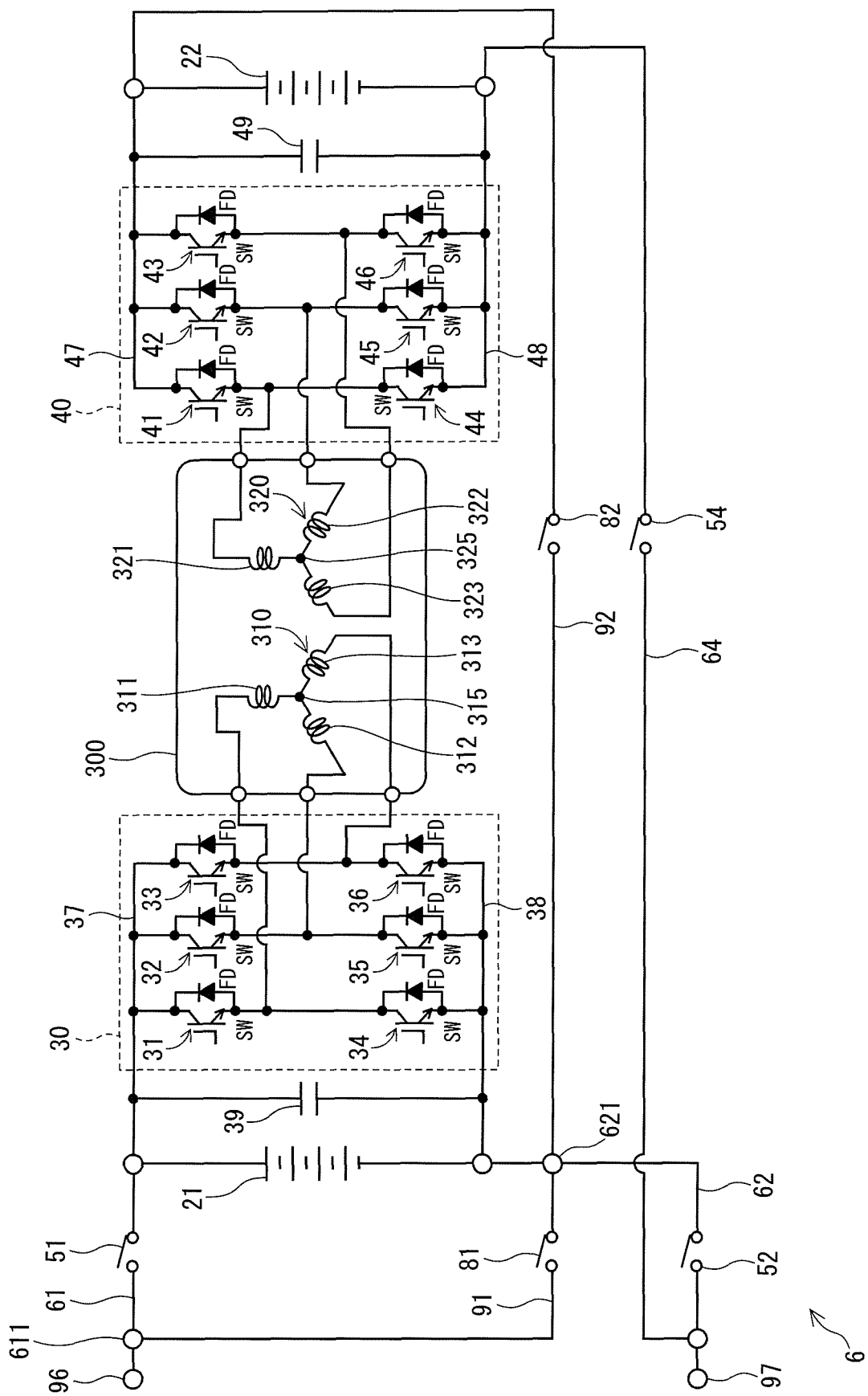
FIG. 31 is a circuit diagram of a charging system according to a sixth embodiment.
Figure 32:
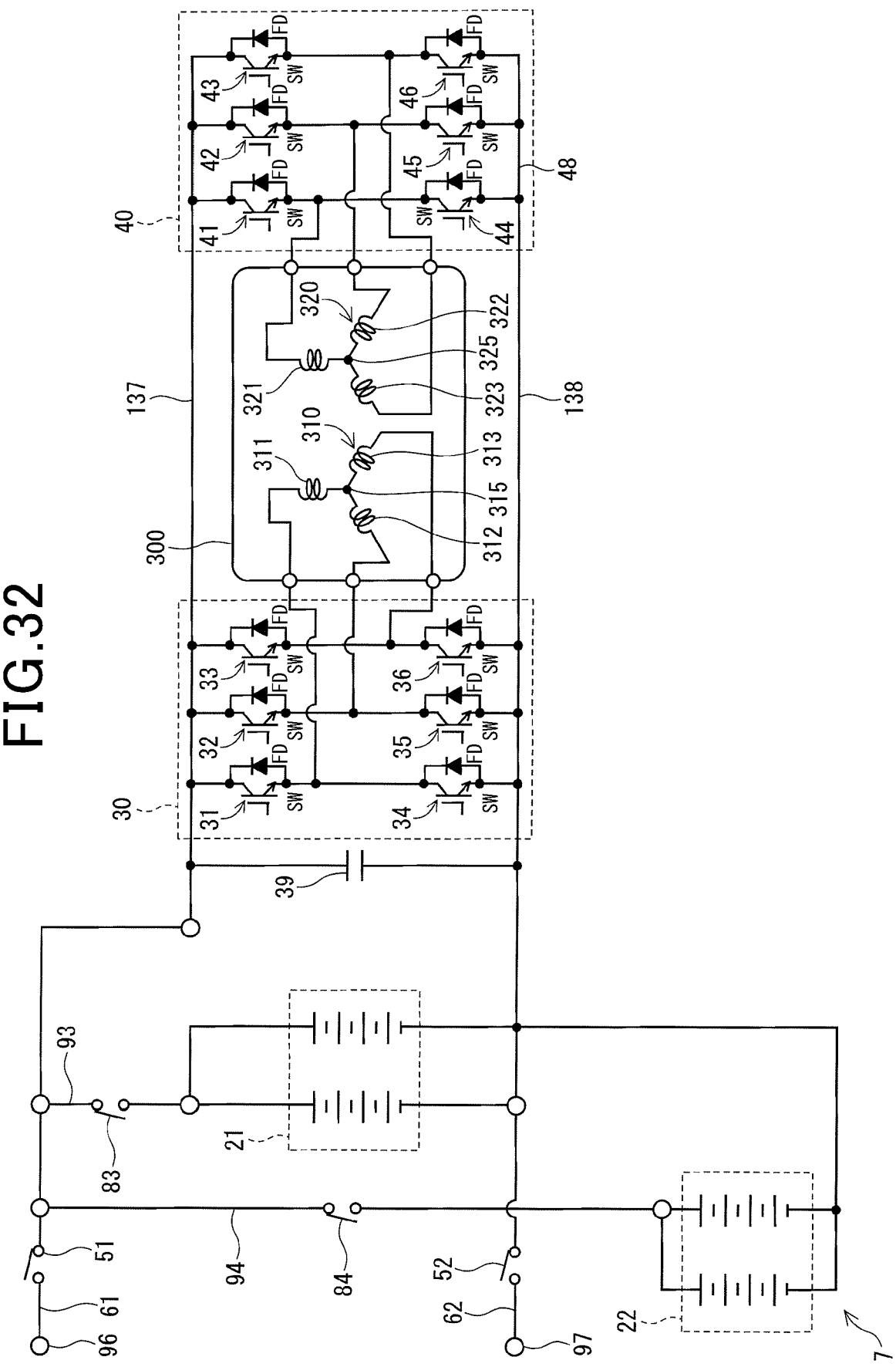
FIG. 32 is a circuit diagram of a charging system according to a seventh embodiment.

A sixth embodiment is shown in FIG. 31 and FIG. 32. As shown in FIG. 31, a charging system 6 according to the present embodiment includes the motor generator 300, the first voltage source 21, the second voltage source 22, the first inverter 30, the second inverter 40, the first high-potential-side switch 51, the low-potential-side switches 52 and 54, an inter-upper/lower switches 81 and 82, the first high-potential-side power supply line 51, the low-potential-side power supply lines 62 and 64, inter-upper/lower connection lines 91 and 92, the control unit 70, and the like.

The first inter-upper/lower connection line 91 connects the first high-potential-side power supply line 61 and the first low-potential-side power supply line 62. Specifically, the first inter-upper/lower connection line 91 connects a terminal 611 and a terminal 621. The terminal 611 is provided between the switch 51 on the first high-potential-side power supply line 61 and the high-potential-side external connection terminal 96. The terminal 621 is provided between the switch 52 on the first low-potential-side power supply line 62 and a connecting portion of the first inverter 30 to the low-potential-side wiring 38. The second inter-upper/lower connection line 92 connects the high potential side of the second voltage source 22 and the terminal 621. The first inter-upper/lower connection line 91 is provided with the switch 81. The second inter-upper/lower connection line 92 is provided with the switch 82.

According to the present embodiment, single-side individual charging and dual-side simultaneous charging of the voltage sources 21 and 22 can be performed by the control unit 70 operating the opening and closing of the switches 51, 52, 54, 81, and 82. According to the present embodiment, dual-side simultaneous charging is serial charging. In addition, single-side individual charging and parallel charging of the voltage sources 21 and 22 can be performed without the MG 300 and the inverters 30 and 40 being used as the power path. Therefore, during charging of the voltage sources 21 and 22, all switching elements 31 to 36 and 41 to 46 of the inverters 30 and 40 are turned off regardless of the charging mode.

A charging control process according to the present embodiment is similar to that according to the third embodiment, aside from differences in the switches to be opened and closed in each charging mode. According to the present embodiment, in individual charging mode, when the first voltage source 21 is charged, the switches 51 and 52 are closed, and the switches 54, 81, and 82 are opened. When the second voltage source 21 is charged, the switches 54, 81, and 82 are closed, and the switches 52 and 81 are opened.

In addition, in serial charging mode, the switches 51, 54, and 82 are closed, and the switches 52 and 81 are opened.

According to the present embodiment, the switches include the first high-potential-side switch 51, the first low-potential-side switch 52, the first inter-upper/lower switch 81, and the second inter-upper/lower switch 82. The first inter-upper/lower switch 81 is provided on the first inter-upper/lower connection line 91 that connects the first high-potential-side power supply line 61 and the first low-potential-side power supply line 62. The second inter-upper/lower switch 82 is provided on the second inter-upper/lower connection line 92 that connects the high potential side of the second voltage source 22 and the first low-potential-side power supply line 62.

When individual charging of the first voltage source 21 is performed, the control unit 70 closes the first high-potential-side switch 51 and the first low-potential-side switch 52, and opens the second low-potential-side switch 54, the first inter-upper/lower switch 81, and the second inter-upper/lower switch 82. When individual charging of the second voltage source 22 is performed, the control unit 70 closes the first inter-upper/lower switch 81, the second inter-upper/lower switch 82, and the second low-potential-side switch 54, and opens the first high-potential-side switch 51 and the first low-potential-side switch 52. In addition, when serial charging of the first voltage source 21 and the second voltage source 22 is performed, the control unit 70 closes the first high-potential-side switch 51, the second inter-upper/lower switch 82, and the second low-potential-side switch 54, and opens the first low-potential-side switch 52 and the first inter-upper/lower switch 81.

Consequently, even in a configuration in which the coil groups 310 and 320 are independently provided for the voltage sources 21 and 22, charging can be appropriately switched between individual charging and simultaneous charging of the voltage sources 21 and 22. According to the present embodiment, when the voltage sources 21 and 22 are charged, the inverters 30 and 40 and the MG 300 are not used as the power path. Therefore, the voltage sources 21 and 22 can be charged without the occurrence of loss in the inverters 30 and 40 and the MG 300. In addition, effects similar to those according to the above-described embodiments are achieved.

Seventh Embodiment

A seventh embodiment is shown in FIG. 32. As shown in FIG. 32, a charging system 7 according to the present embodiment includes the motor generator 300, the first voltage source 21, the second voltage source 22, the first inverter 30, the second inverter 40, the high-potential-side switch 51, the low-potential-side switch 52, the high-potential-side power supply line 61, the low-potential-side power supply line 62, upper-side switches 83 and 84, power lines 93 and 94, the control unit 70, and the like.

According to the present embodiment, the voltage sources 21 and 22 are both provided on the first inverter 30 side. In FIG. 32, the voltage sources 21 and 22 are each shown as having two batteries that are connected in parallel. However, any number of batteries may be connected in parallel. The high potential sides of the switching elements 31 to 33 and 41 to 43 are connected to a shared high-potential-side wiring 137. The low potential sides of the switching elements 34 to 36 and 44 to 46 are connected to a shared low-potential-side wiring 138. The high-potential-side wiring 137 is connected to the high-potential-side power supply line 61. The low-potential-side wiring 138 is connected to the low-potential-side power supply line 62.

The high potential side of the first voltage source 21 is connected to the high-potential-side power supply line 61 through the first power line 93. The low potential side of the first voltage source 21 is connected to the low-potential-side power supply line 62. The first power line 93 is provided with the switch 83. The high potential side of the second voltage source 22 is connected to the high-potential-side power supply line 61 through the second power line 94. The low potential side of the second voltage source 22 is connected to the low-potential-side power supply line 62. The second power line 93 is provided with the switch 84.

Connection portions of the first power line 93 and the second power line 94 on the high-potential-side power supply line 61 are further towards the first inverter 30 side than the switch 51. The connection portion of the second power line 94 on the high-potential-side power supply line 61 is further towards the switch 51 than the connection portion of the first voltage source 21.

According to the present embodiment, single-side individual charging and dual-side simultaneous charging of the voltage sources 21 and 22 can be performed by the opening and closing of the switches 51, 52, 83, and 83 being operated. According to the present embodiment, dual-side simultaneous charging is parallel charging. In addition, single-side individual charging and parallel charging of the voltage sources 21 and 22 can be performed without the MG 300 and the inverters 30 and 40 being used as the power path. Therefore, during charging of the voltage sources 21 and 22, all switching elements 31 to 36 and 41 to 46 of the inverters 30 and 40 are turned off regardless of the charging mode.

A charging control process according to the present embodiment is similar to that according to the third embodiment, aside from differences in the switches that are opened and closed in each charging mode. According to the present embodiment, in individual charging mode, when the first voltage source 21 is charged, the switches 51, 52, and 83 are closed, and the switch 84 is opened. When the second voltage source 22 is charged, the switches 51, 52, and 84 are closed, and the switch 83 is opened. In addition, in parallel charging mode, the switches 51, 52, 83, and 84 are closed. Consequently, even in a configuration in which a plurality of voltage sources 21 are connected in parallel to the external connection terminals 96 and 97, respective voltage sources 21 and 22 can be individually charged. Effects similar to those according to the above-described embodiments are achieved in a configuration such as this, as well.

According to the above-described embodiments, the MG 10 and 300 correspond to a "rotating electric machine". The freewheeling diodes FD of the switching elements 31 to 36 and 41 to 46 correspond to a "circulating unit". The high-speed charger 100 corresponds to an "external charger".

OTHER EMBODIMENTS

The rotating electric machine according to the above-described embodiment has three phases. According to another embodiment, the rotating electric machine may have four or more phases. According to the above-described embodiment, the rotating electric machine is used as the main machine motor of an electric vehicle. According to another embodiment, the rotating electric machine is not limited to the main machine motor. For example, the rotating electric machine may be a so-called integrated starter generator (ISG) that provides functions as both a starter and a generator, or an auxiliary motor. In addition, the power supply system may be applied to an apparatus other than a vehicle. The present disclosure is not limited in any way by the above-described embodiments. Various embodiments are possible without departing from the spirit of the disclosure.

What is claimed is:

1. A charging system that charges a first voltage source and a second voltage source through an external charger, the first voltage source and the second voltage source being two voltage sources that are capable of supplying electric power to a rotating electric machine that includes a coil group configured by multiphase coils, the charging system comprising:
   a first inverter that includes a plurality of first switching elements that correspond to the multiphase coils;
   a second inverter that includes a plurality of second switching elements that correspond to the multiphase coils;
   a high-potential side external connection terminal that is capable of connecting to a high potential side of the external charger;
   at least one high-potential side power supply line that connects the high-potential-side external connection terminal and a high potential side of the first voltage source or the second voltage source;
   a low-potential side external connection terminal that is capable of connecting to a low potential side of the external charger;
   at least one low-potential side power supply line that connects the low-potential-side external connection terminal and a low potential side of the first voltage source or the second voltage source;
   at least three switches that include at least one high-potential side switch that is provided on the high-potential-side power supply line and at least one low-potential side switch that is provided on the low-potential-side power supply line; and
   a control unit that is capable of switching charging between individual charging in which either of the first voltage source and the second voltage source is charged, and simultaneous charging in which the first voltage source and the second voltage source are both simultaneously charged, by controlling operations of the plurality of first switching elements, the plurality of second switching elements, and the at least three switches, wherein:
   a first end of the coil is connected to the first voltage source with the first inverter therebetween;
   a second end of the coil is connected to the second voltage source with the second inverter therebetween;

the high-potential-side power supply line includes a first high-potential side power supply line that connects the high-potential-side external connection terminal and the high potential side of the first voltage source, and a second high-potential-side power supply line that connects the high-potential-side external connection terminal and the high potential side of the second voltage source;

the low-potential-side power supply line includes a first low-potential side power supply line that connects the low-potential-side external connection terminal and the low potential side of the first voltage source, and a second low-potential-side power supply line that connects the low-potential-side external connection terminal and the low potential side of the second voltage source;

the high-potential-side switch includes a first high-potential-side switch that is provided on the first high-potential-side power supply line and a second high-potential-side switch that is provided on the second high-potential-side power supply line; and the low-potential-side switch includes a first low-potential-side switch that is provided on the first low-potential-side power supply line and a second low-potential-side switch that is provided on the second low-potential-side power supply line.

2. The charging system according to claim 1, wherein:
the control unit closes the first high-potential-side switch, the first low-potential-side switch, the second high-potential-side switch, and the second low-potential-side switch, when parallel charging of the first voltage source and the second voltage source is performed.

3. The charging system according to claim 1, wherein:
the control unit
closes the first high-potential-side switch and the first low-potential-side switch, and opens the second high-potential-side switch and the second low-potential-side switch, when individual charging of the first voltage source is performed, and
opens the first high-potential-side switch and the first low-potential-side switch, and closes the second high-potential-side switch and the second low-potential-side switch, when individual charging of the second voltage source is performed.

4. The charging system according to claim 1, wherein:
each of the first switching elements and the second switching elements includes a switch unit that is capable of switching between conducting and blocking a current based on a command from the control unit, and a circulating unit that allows a current to be circulated from the low potential side to the high potential side through the circulating unit; and
when parallel charging of the first voltage source and the second voltage source is performed, the control unit
closes the first high-potential-side switch and the second low-potential-side switch, and opens the first low-potential-side switch and the second high-potential-side switch, or
opens the first high-potential-side switch and the second low-potential-side switch, and closes the first low-potential-side switch and the second high-potential-side switch.

5. A charging system that charges a first voltage source and a second voltage source through an external charger, the first voltage source and the second voltage source being two voltage sources that are capable of supplying electric power to a rotating electric machine that includes a coil group configured by multiphase coils, the charging system comprising:
a first inverter that includes a plurality of first switching elements that correspond to the multiphase coils;
a second inverter that includes a plurality of second switching elements that correspond to the multiphase coils;
a high-potential side external connection terminal that is capable of connecting to a high potential side of the external charger;
at least one high-potential side power supply line that connects the high-potential-side external connection terminal and a high potential side of the first voltage source or the second voltage source;
a low-potential side external connection terminal that is capable of connecting to a low potential side of the external charger;
at least one low-potential side power supply line that connects the low-potential-side external connection terminal and a low potential side of the first voltage source or the second voltage source;
at least three switches that include at least one high-potential side switch that is provided on the high-potential-side power supply line and at least one low-potential side switch that is provided on the low-potential-side power supply line; and
a control unit that is capable of switching charging between individual charging in which either of the first voltage source and the second voltage source is charged, and simultaneous charging in which the first voltage source and the second voltage source are both simultaneously charged, by controlling operations of the plurality of first switching elements, the plurality of second switching elements, and the at least three switches, wherein:
a first end of the coil is connected to the first voltage source with the first inverter therebetween;
a second end of the coil is connected to the second voltage source with the second inverter therebetween;
the high-potential-side power supply line connects the high-potential-side external connection terminal and the high potential side of the first voltage source;
the low-potential-side power supply line connects the low-potential-side external connection terminal and the low potential side of the second voltage source; and
the at least three switches include the high-potential-side switch, the low-potential-side switch, and an inter-power-supply switch that is provided on an inter-power-supply connection line that connects the low potential side of the first voltage source and the high potential side of the second voltage source.

6. The charging system according to claim 5, wherein:
the control unit closes the high-potential-side switch, the low-potential-side switch, and the inter-power-supply switch when serial charging of the first voltage source and the second voltage source is performed.

7. The charging system according to claim 5, wherein:
each of the plurality of first switching elements and each of the plurality of second switching elements include a switch unit that is capable of switching between conducting and blocking a current based on a command from the control unit, and a circulating unit that allows a current to be circulated from the low potential side to the high potential side through the circulating unit;
each of the plurality of first switching elements includes a first upper arm element that is connected to a high potential side of the first inverter, and a first lower arm element that is connected to a lower potential side of the first inverter and a lower potential side of the first upper arm element;

each of the plurality of second switching elements includes a second upper arm element that is connected to a high potential side of the second inverter, and a second lower arm element that is connected to a lower potential side of the second inverter and a lower potential side of the second upper arm element; and when parallel charging of the first voltage source and the second voltage source is performed, the control unit
 closes the high-potential-side switch and the low-potential-side switch, opens the inter-power-supply switch, and
 turns on at least the first upper arm element of one phase and at least the second lower arm element one phase that differs from the phase of which the first upper arm element is turned on.

8. The charging system according to claim 5, wherein:
each of the plurality of first switching elements and each of the plurality of second switching elements include a switch unit that is capable of switching between conducting and blocking a current based on a command from the control unit, and a circulating unit that allows a current to be circulated from the low potential side to the high potential side through the circulating unit;

each of the plurality of first switching elements includes a first upper arm element that is connected to a high potential side of the first inverter, and a first lower arm element that is connected to a lower potential side of the first inverter and a lower potential side of the first upper arm element;

each of the plurality of second switching elements includes a second upper arm element that is connected to a high potential side of the second inverter, and a second lower arm element that is connected to a lower potential side of the second inverter and a lower potential side of the second upper arm element; and the control unit
 closes the high-potential-side switch and the low-potential-side switch, opens the inter-power-supply switch, and turns on at least the second lower arm element of one phase, when individual charging of the first voltage source is performed, and
 closes the high-potential-side switch and the low-potential-side switch, opens the inter-power-supply switch, and turns on at least the first upper arm element of one phase, when individual charging of the second voltage source is performed.

9. A charging system that charges a first voltage source and a second voltage source through an external charger, the first voltage source and the second voltage source being two voltage sources that are capable of supplying electric power to a rotating electric machine that includes a coil group configured by multiphase coils, the charging system comprising:

a first inverter that includes a plurality of first switching elements that correspond to the multiphase coils;

a second inverter that includes a plurality of second switching elements that correspond to the multiphase coils;

a high-potential side external connection terminal that is capable of connecting to a high potential side of the external charger;

at least one high-potential side power supply line that connects the high-potential-side external connection terminal and a high potential side of the first voltage source or the second voltage source;

a low-potential side external connection terminal that is capable of connecting to a low potential side of the external charger;

at least one low-potential side power supply line that connects the low-potential-side external connection terminal and a low potential side of the first voltage source or the second voltage source;

at least three switches that include at least one high-potential side switch that is provided on the high-potential-side power supply line and at least one low-potential side switch that is provided on the low-potential-side power supply line; and a control unit that is capable of switching charging between individual charging in which either of the first voltage source and the second voltage source is charged, and simultaneous charging in which the first voltage source and the second voltage source are both simultaneously charged, by controlling operations of the plurality of first switching elements, the plurality of second switching elements, and the at least three switches, wherein:

the coil group includes a first coil group that is connected to the first voltage source with the first inverter therebetween, and a second coil group that is connected to the second voltage source with the second inverter therebetween;

the high-potential-side power supply line connects the high-potential-side external connection terminal and the high potential side of the first voltage source;

the low-potential-side power supply line connects the low-potential-side external connection terminal and the low potential side of the second voltage source; and the at least three switches include the high-potential-side switch, the low-potential-side switch, and an inter-coil switch that is provided on an inter-coil connection line that connects a connecting portion of the first coil group and a connecting portion of the second coil group.

10. The charging system according to claim 9, wherein:
each of the plurality of first switching elements and each of the plurality of second switching elements include a switch unit that is capable of switching between conducting and blocking a current based on a command from the control unit, and a circulating unit that allows a current to be circulated from the low potential side to the high potential side through the circulating unit;

each of the plurality of first switching elements includes a first upper arm element that is connected to a high potential side of the first inverter, and a first lower arm element that is connected to a lower potential side of the first inverter and a lower potential side of the first upper arm element;

each of the plurality of second switching elements includes a second upper arm element that is connected to a high potential side of the second inverter, and a second lower arm element that is connected to a lower potential side of the second inverter and a lower potential side of the second upper arm element; and the control unit
 closes the high-potential-side switch, the low-potential-side switch, and the inter-coil switch, and turns on at least the second lower arm element of one phase, when individual charging of the first voltage source is performed,
 closes the high-potential-side switch, the low-potential-side switch, and the inter-coil switch, and turns on at least the first upper arm element of one phase, when individual charging of the second voltage source is performed, and closes the high-potential-side switch, the low-potential-side switch, and the inter-coil switch, when serial charging of the first voltage source and the second voltage source are performed.

11. A charging system that charges a first voltage source and a second voltage source through an external charger, the first voltage source and the second voltage source being two voltage sources that are capable of supplying electric power to a rotating electric machine that includes a coil group configured by multiphase coils, the charging system comprising:

a first inverter that includes a plurality of first switching elements that correspond to the multiphase coils;

a second inverter that includes a plurality of second switching elements that correspond to the multiphase coils;

a high-potential side external connection terminal that is capable of connecting to a high potential side of the external charger;

at least one high-potential side power supply line that connects the high-potential-side external connection terminal and a high potential side of the first voltage source or the second voltage source;

a low-potential side external connection terminal that is capable of connecting to a low potential side of the external charger;

at least one low-potential side power supply line that connects the low-potential-side external connection terminal and a low potential side of the first voltage source or the second voltage source;

at least three switches that include at least one high-potential side switch that is provided on the high-potential-side power supply line and at least one low-potential side switch that is provided on the low-potential-side power supply line; and a control unit that is capable of switching charging between individual charging in which either of the first voltage source and the second voltage source is charged, and simultaneous charging in which the first voltage source and the second voltage source are both simultaneously charged, by controlling operations of the plurality of first switching elements, the plurality of second switching elements, and the at least three switches, wherein:

the coil group includes a first coil group that is connected to the first voltage source with the first inverter therebetween, and a second coil group that is connected to the second voltage source with the second inverter therebetween;

the high-potential-side power supply line connects the high-potential-side external connection terminal and the high potential side of the first voltage source;

the low-potential-side power supply line connects the low-potential-side external connection terminal and the low potential side of the second voltage source; and the at least three switches include the high-potential-side switch, the low-potential-side switch, a high-potential-side inter-circuit switch that is provided on a high-potential-side inter-circuit connection line that connects the connecting portion of the first coil group and the connecting portion of the second coil group, and a low-potential-side inter-circuit switch that is provided on a low-potential-side inter-circuit connection line that connects the connecting portion of the second coil group and a portion on the low-potential-side power supply line that is further towards the low-potential-side external connection terminal side than the low-potential-side switch.

12. The charging system according to claim 11, wherein:

each of the plurality of first switching elements and each of the plurality of second switching elements include a switch unit that is capable of switching between conducting and blocking a current based on a command from the control unit, and a circulating unit that allows a current to be circulated from the low potential side to the high potential side through the circulating unit;

each of the plurality of first switching elements includes a first upper arm element that is connected to a high potential side of the first inverter, and a first lower arm element that is connected to a lower potential side of the first inverter and a lower potential side of the first upper arm element;

each of the plurality of second switching elements includes a second upper arm element that is connected to a high potential side of the second inverter, and a second lower arm element that is connected to a lower potential side of the second inverter and a lower potential side of the second upper arm element; and the control unit closes the high-potential-side switch and the low-potential-side switch, and opens the high-potential-side inter-circuit switch and the low-potential-side inter-circuit switch, when individual charging of the first voltage source is performed, closes the high-potential-side switch, the high-potential-side inter-circuit switch, and the low-potential-side inter-circuit switch, opens the low-potential-side switch, and turns on at least the first upper arm element of one phase, when individual charging of the second voltage source is performed, and closes the high-potential-side switch, the high-potential-side inter-circuit switch, and the low-potential-side inter-circuit switch, and opens the low-potential-side switch, when serial charging of the first voltage source and the second voltage source is performed.

13. A charging system that charges a first voltage source and a second voltage source through an external charger, the first voltage source and the second voltage source being two voltage sources that are capable of supplying electric power to a rotating electric machine that includes a coil group configured by multiphase coils, the charging system comprising:

a first inverter that includes a plurality of first switching elements that correspond to the multiphase coils;

a second inverter that includes a plurality of second switching elements that correspond to the multiphase coils;

a high-potential side external connection terminal that is capable of connecting to a high potential side of the external charger;

at least one high-potential side power supply line that connects the high-potential-side external connection terminal and a high potential side of the first voltage source or the second voltage source;

a low-potential side external connection terminal that is capable of connecting to a low potential side of the external charger;

at least one low-potential side power supply line that connects the low-potential-side external connection terminal and a low potential side of the first voltage source or the second voltage source;

at least three switches that include at least one high-potential side switch that is provided on the high-potential-side power supply line and at least one low-potential side switch that is provided on the low-potential-side power supply line; and a control unit that is capable of switching charging between individual charging in which either of the first voltage source and the second voltage source is charged, and simultaneous charging in which the first voltage source and the second voltage source are both simultaneously charged, by controlling operations of the plurality of first switching elements, the plurality of second switching elements, and the at least three switches, wherein:

the coil group includes a first coil group that is connected to the first voltage source with the first inverter therebetween, and a second coil group that is connected to the second voltage source with the second inverter therebetween;

the high-potential-side power supply line includes a first high-potential side power supply line that connects the high-potential-side external connection terminal and the high potential side of the first voltage source, and a second high-potential-side power supply line that connects the high-potential-side external connection terminal and the high potential side of the second voltage source;

the low-potential-side power supply line includes a first low-potential side power supply line that connects the low-potential-side external connection terminal and the low potential side of the first voltage source, and a second low-potential-side power supply line that connects the low-potential-side external connection terminal and the low potential side of the second voltage source;

the high-potential-side switch includes a first high-potential-side switch that is provided on the first high-potential-side power supply line and a second high-potential-side switch that is provided on the second high-potential-side power supply line; and the low-potential-side switch includes a first low-potential-side switch that is provided on the first low-potential-side power supply line and a second low-potential-side switch that is provided on the second low-potential-side power supply line.

14. The charging system according to claim 13, wherein: the control unit closes the first high-potential-side switch and the first low-potential-side switch, and opens the second high-potential-side switch and the second low-potential-side switch, when individual charging of the first voltage source is performed;

opens the first high-potential-side switch and the first low-potential-side switch, and closes the second high-potential-side switch and the second low-potential-side switch, when individual charging of the second voltage source is performed; and closes first high-potential-side switch, the second high-potential-side switch, the first low-potential-side switch, and the second low-potential-side switch, when serial charging of the first voltage source and the second voltage source is performed.

15. A charging system that charges a first voltage source and a second voltage source through an external charger, the first voltage source and the second voltage source being two voltage sources that are capable of supplying electric power to a rotating electric machine that includes a coil group configured by multiphase coils, the charging system comprising:

a first inverter that includes a plurality of first switching elements that correspond to the multiphase coils;

a second inverter that includes a plurality of second switching elements that correspond to the multiphase coils;

a high-potential side external connection terminal that is capable of connecting to a high potential side of the external charger;

at least one high-potential side power supply line that connects the high-potential-side external connection terminal and a high potential side of the first voltage source or the second voltage source;

a low-potential side external connection terminal that is capable of connecting to a low potential side of the external charger;

at least one low-potential side power supply line that connects the low-potential-side external connection terminal and a low potential side of the first voltage source or the second voltage source;

at least three switches that include at least one high-potential side switch that is provided on the high-potential-side power supply line and at least one low-potential side switch that is provided on the low-potential-side power supply line; and a control unit that is capable of switching charging between individual charging in which either of the first voltage source and the second voltage source is charged, and simultaneous charging in which the first voltage source and the second voltage source are both simultaneously charged, by controlling operations of the plurality of first switching elements, the plurality of second switching elements, and the at least three switches, wherein:

the coil group includes a first coil group that is connected to the first voltage source with the first inverter therebetween, and a second coil group that is connected to the second voltage source with the second inverter therebetween;

the high-potential-side power supply line connects the high-potential-side external connection terminal and the high potential side of the first voltage source;

the low-potential-side power supply line includes a first low-potential side power supply line that connects the low-potential-side external connection terminal and the low potential side of the first voltage source, and a second low-potential-side power supply line that connects the low-potential-side external connection terminal and the low potential side of the second voltage source;

the low-potential-side switch includes a first low-potential-side switch that is provided on the first low-potential-side power supply line and a second low-potential-side switch that is provided on the second low-potential-side power supply line; and the at least three switches include the high-potential-side switch, the first low-potential-side switch, the second low-potential-side switch, a first inter-upper/lower switch that is provided on a first inter-upper/lower connection line that connects the high-potential-side power supply line and the first lower-potential-side power supply line, and a second inter-upper/lower switch that is provided on a second inter-upper/lower connection line that connects the high potential side of the second voltage source and the first lower-potential-side power supply line.

16. The charging system according to claim 15, wherein: the control unit
- closes the high-potential-side switch and the first low-potential-side switch, and opens the second low-potential-side switch, the first inter-upper/lower switch, and the second inter-upper/lower switch, when individual charging of the first voltage source is performed,
- closes the first inter-upper/lower switch, the second inter-upper/lower switch, and the second low-potential-side switch, and opens the high-potential-side switch and the first low-potential-side switch, when individual charging of the second voltage source is performed, and
- closes the high-potential-side switch, the second inter-upper/lower switch, and the second low-potential-side switch, when serial charging of the first voltage source and the second voltage source is performed.

* * * * *